(12) United States Patent
Marbach-Bar et al.

(10) Patent No.: US 12,454,693 B1
(45) Date of Patent: Oct. 28, 2025

(54) NUCLEIC ACIDS FOR INHIBITING EXPRESSION OF TRANSFERRIN RECEPTOR 2

(71) Applicant: Dexcel Pharma Technologies Ltd., Jerusalem (IL)

(72) Inventors: Nadav Marbach-Bar, Jerusalem (IL); Elena Feinstein, Jerusalem (IL); Noa Madar-Balakirski, Jerusalem (IL)

(73) Assignee: Dexcel Pharma Technologies Ltd., Jerusalem (IL)

(*) Notice: Subject to any disclaimer, the term of this patent is extended or adjusted under 35 U.S.C. 154(b) by 0 days.

(21) Appl. No.: 18/898,720

(22) Filed: Sep. 27, 2024

(51) Int. Cl.
*C12N 15/113* (2010.01)

(52) U.S. Cl.
CPC ...... *C12N 15/1138* (2013.01); *C12N 2310/14* (2013.01); *C12N 2310/321* (2013.01); *C12N 2310/351* (2013.01)

(58) Field of Classification Search
None
See application file for complete search history.

(56) References Cited

U.S. PATENT DOCUMENTS

| 9,228,188 | B2 | 1/2016 | Bettencourt | |
|---|---|---|---|---|
| 11,492,623 | B2 * | 11/2022 | Jadhav | A61P 31/20 |
| 2025/0188478 | A1 * | 6/2025 | Koizumi | A61P 7/06 |

FOREIGN PATENT DOCUMENTS

| AU | 2023234185 | | 10/2024 | |
|---|---|---|---|---|
| WO | WO-2009014887 | A2 * | 1/2009 | ......... A61K 31/7105 |
| WO | WO-2019222479 | A1 * | 11/2019 | ........... C12N 15/111 |
| WO | WO-2023245126 | A2 * | 12/2023 | ........... C12N 15/113 |

OTHER PUBLICATIONS

Vickers ( et al. 2000. Effects of RNA secondary structure on cellular antisense activity. Nuc. Acid Res. 28[6]:1340-1347) (Year: 2000 ).*
Strausberg ( et al. 2002/2007. Generation and initial analysis of more than 15,000 full-length human and mouse cDNA sequences. PNAS 99[26]:16899-16903, submitted to NIH Jul. 2007) (Year: 2007).*
Prakash ( et al. 2016. Synergistic effect of phosphorothioate, 50-vinylphosphonate and GalNAc modifications for enhancing activity of synthetic siRNA. Bioorg. Medicin. Chem. Lett. 26:2817-2820) (Year: 2016).*
Glen Research (2'-5' Linked Oligonucleotides. Version of page archived on Wayback Machine on Aug. 14, 2024. Available online at: web.archive.org. Accessed on Jan. 16, 2025) (Year: 2024).*
Akinc (et al. 2011. Targeting the Hepcidin Pathway with RNAi Therapeutics for the Treatment of Anemia. Blood 118[21]:688 (Year: 2011).*

* cited by examiner

*Primary Examiner* — Nancy J Leith
*Assistant Examiner* — Ruth Sophia Arieti
(74) *Attorney, Agent, or Firm* — JMB Davis Ben-David

(57) ABSTRACT

Provided herein are nucleic acids and compositions thereof for inhibiting expression of transferrin receptor 2 (TFR2). Also described are methods for treatment of TFR2-associated diseases, such as anemia, with the disclosed nucleic acids.

9 Claims, 3 Drawing Sheets

Specification includes a Sequence Listing.

SEQUENCE LISTING

```
Sequence total quantity: 316
SEQ ID NO: 1            moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 1
caagcatgga gcggcttta                                                    19

SEQ ID NO: 2            moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 2
taaagccgct ccatgcttgt g                                                 21

SEQ ID NO: 3            moltype = RNA   length = 19
```

```
FEATURE                 Location/Qualifiers
source                  1..19
                        mol_type = other RNA
                        organism = synthetic construct
misc_feature            1..19
                        note = siRNA strand - modified as per Table 2
SEQUENCE: 3
ttccagagag cgcaacaaa                                                 19

SEQ ID NO: 4            moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 4
tttgttgcgc tctctggaat a                                              21

SEQ ID NO: 5            moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 5
tccagagagc gcaacaaca                                                 19

SEQ ID NO: 6            moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 6
tgttgttgcg ctctctggaa t                                              21

SEQ ID NO: 7            moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 7
ccagagagcg caacaacta                                                 19

SEQ ID NO: 8            moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 8
tagttgttgc gctctctgga a                                              21

SEQ ID NO: 9            moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 9
cagagagcgc aacaactga                                                 19

SEQ ID NO: 10           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 10
tcagttgttg cgctctctgg a                                              21
```

-continued

```
SEQ ID NO: 11            moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 11
agagagcgca acaactgta                                                      19

SEQ ID NO: 12            moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 12
tacagttgtt gcgctctctg g                                                   21

SEQ ID NO: 13            moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 13
cccaagatcc tctcagaca                                                      19

SEQ ID NO: 14            moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 14
tgtctgagag gatcttgggg a                                                   21

SEQ ID NO: 15            moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 15
agatcctctc agaccgtca                                                      19

SEQ ID NO: 16            moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 16
tgacggtctg agaggatctt g                                                   21

SEQ ID NO: 17            moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 17
ctctcagacc gtctaccaa                                                      19

SEQ ID NO: 18            moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 18
ttggtagacg gtctgagagg a                                                   21
```

```
SEQ ID NO: 19            moltype = RNA  length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 19
tctcagaccg tctaccaga                                                  19

SEQ ID NO: 20            moltype = RNA  length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 20
tctggtagac ggtctgagag g                                               21

SEQ ID NO: 21            moltype = RNA  length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 21
ctcagaccgt ctaccagca                                                  19

SEQ ID NO: 22            moltype = RNA  length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 22
tgctggtaga cggtctgaga g                                               21

SEQ ID NO: 23            moltype = RNA  length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 23
caggcagcca aacctcata                                                  19

SEQ ID NO: 24            moltype = RNA  length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 24
tatgaggttt ggctgcctgg g                                               21

SEQ ID NO: 25            moltype = RNA  length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 25
tgttggtggt cagtgagga                                                  19

SEQ ID NO: 26            moltype = RNA  length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 26
```
tcctcactga ccaccaacac a                                               21

SEQ ID NO: 27          moltype = RNA   length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 27
tgtcaactat gagcctgaa                                                  19

SEQ ID NO: 28          moltype = RNA   length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 28
ttcaggctca tagttgacat c                                               21

SEQ ID NO: 29          moltype = RNA   length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 29
caactatgag cctgaccta                                                  19

SEQ ID NO: 30          moltype = RNA   length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 30
taggtcaggc tcatagttga c                                               21

SEQ ID NO: 31          moltype = RNA   length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 31
ctatgagcct gacctggaa                                                  19

SEQ ID NO: 32          moltype = RNA   length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 32
ttccaggtca ggctcatagt t                                               21

SEQ ID NO: 33          moltype = RNA   length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 33
ggaggaccct gacgtctaa                                                  19

SEQ ID NO: 34          moltype = RNA   length = 21
FEATURE                Location/Qualifiers
source                 1..21
                       mol_type = other RNA
                       organism = synthetic construct
misc_feature           1..21
                       note = siRNA strand - modified as per Table 2

```
SEQUENCE: 34
ttagacgtca gggtcctcca g                                              21

SEQ ID NO: 35          moltype = RNA  length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 35
ggtgatcagc ttcgcccaa                                                 19

SEQ ID NO: 36          moltype = RNA  length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 36
ttgggcgaag ctgatcaccc c                                              21

SEQ ID NO: 37          moltype = RNA  length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 37
cccagaaggt gaccaatga                                                 19

SEQ ID NO: 38          moltype = RNA  length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 38
tcattggtca ccttctgggc g                                              21

SEQ ID NO: 39          moltype = RNA  length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 39
agaaggtgac caatgctca                                                 19

SEQ ID NO: 40          moltype = RNA  length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 40
tgagcattgg tcaccttctg g                                              21

SEQ ID NO: 41          moltype = RNA  length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 41
ggtgaccaat gctcaggaa                                                 19

SEQ ID NO: 42          moltype = RNA  length = 21
FEATURE                Location/Qualifiers
source                 1..21
                       mol_type = other RNA
                       organism = synthetic construct
misc_feature           1..21
```

```
                        note = siRNA strand - modified as per Table 2
SEQUENCE: 42
ttcctgagca ttggtcacct t                                              21

SEQ ID NO: 43           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 43
gaccaatgct caggactta                                                 19

SEQ ID NO: 44           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 44
taagtcctga gcattggtca c                                              21

SEQ ID NO: 45           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 45
agtgtatgga catgtgcaa                                                 19

SEQ ID NO: 46           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 46
ttgcacatgt ccatacactg c                                              21

SEQ ID NO: 47           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 47
ttccttcaat caaacccaa                                                 19

SEQ ID NO: 48           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 48
ttgggtttga ttgaaggaag g                                              21

SEQ ID NO: 49           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 49
gtccttcaat caaacccaa                                                 19

SEQ ID NO: 50           moltype = RNA   length = 21
FEATURE                 Location/Qualifiers
source                  1..21
                        mol_type = other RNA
                        organism = synthetic construct
```

```
misc_feature            1..21
                        note = siRNA strand - modified as per Table 2
SEQUENCE: 50
ttgggtttga ttgaaggacg g                                              21

SEQ ID NO: 51           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 51
ccttcaatca aacccagta                                                 19

SEQ ID NO: 52           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 52
tactgggttt gattgaagga a                                              21

SEQ ID NO: 53           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 53
cttcaatcaa acccagtta                                                 19

SEQ ID NO: 54           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 54
taactgggtt tgattgaagg a                                              21

SEQ ID NO: 55           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 55
ttcaatcaaa cccagttca                                                 19

SEQ ID NO: 56           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 56
tgaactgggt ttgattgaag g                                              21

SEQ ID NO: 57           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 57
ctcagagcca gatcactaa                                                 19

SEQ ID NO: 58           moltype = RNA   length = 21
FEATURE                 Location/Qualifiers
source                  1..21
                        mol_type = other RNA
```

```
                                  organism = synthetic construct
misc_feature                      1..21
                                  note = siRNA strand - modified as per Table 2
SEQUENCE: 58
ttagtgatct ggctctgagc g                                              21

SEQ ID NO: 59           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 59
cgcagaagtc tcctcttca                                                 19

SEQ ID NO: 60           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 60
tgaagaggag acttctgcgg g                                              21

SEQ ID NO: 61           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 61
agaagtctcc tcttcatca                                                 19

SEQ ID NO: 62           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 62
tgatgaagag gagacttctg c                                              21

SEQ ID NO: 63           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 63
gctgcacctc aaagccgta                                                 19

SEQ ID NO: 64           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 64
tacggctttg aggtgcagca c                                              21

SEQ ID NO: 65           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 65
gcacctcaaa gccgtagta                                                 19

SEQ ID NO: 66           moltype = RNA   length = 21
FEATURE                 Location/Qualifiers
source                  1..21
```

```
                        mol_type = other RNA
                        organism = synthetic construct
misc_feature            1..21
                        note = siRNA strand - modified as per Table 2
SEQUENCE: 66
tactacggct ttgaggtgca g                                              21

SEQ ID NO: 67           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 67
acctcaaagc cgtagtgta                                                 19

SEQ ID NO: 68           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 68
tacactacgg ctttgaggtg c                                              21

SEQ ID NO: 69           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 69
cctcaaagcc gtagtgtaa                                                 19

SEQ ID NO: 70           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 70
ttacactacg ctttgaggt g                                               21

SEQ ID NO: 71           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 71
tcaaagccgt agtgtacga                                                 19

SEQ ID NO: 72           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 72
tcgtacacta cggctttgag g                                              21

SEQ ID NO: 73           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 73
aagccgtagt gtacgtgaa                                                 19

SEQ ID NO: 74           moltype = RNA   length = 21
FEATURE                 Location/Qualifiers
```

```
source                    1..21
                          mol_type = other RNA
                          organism = synthetic construct
misc_feature              1..21
                          note = siRNA strand - modified as per Table 2
SEQUENCE: 74
ttcacgtaca ctacggcttt g                                              21

SEQ ID NO: 75             moltype = RNA   length = 19
FEATURE                   Location/Qualifiers
source                    1..19
                          mol_type = other RNA
                          organism = synthetic construct
misc_feature              1..19
                          note = siRNA strand - modified as per Table 2
SEQUENCE: 75
cgtagtgtac gtgagccta                                                 19

SEQ ID NO: 76             moltype = RNA   length = 21
FEATURE                   Location/Qualifiers
source                    1..21
                          mol_type = other RNA
                          organism = synthetic construct
misc_feature              1..21
                          note = siRNA strand - modified as per Table 2
SEQUENCE: 76
taggctcacg tacactacgg c                                              21

SEQ ID NO: 77             moltype = RNA   length = 19
FEATURE                   Location/Qualifiers
source                    1..19
                          mol_type = other RNA
                          organism = synthetic construct
misc_feature              1..19
                          note = siRNA strand - modified as per Table 2
SEQUENCE: 77
agtgtacgtg agcctggaa                                                 19

SEQ ID NO: 78             moltype = RNA   length = 21
FEATURE                   Location/Qualifiers
source                    1..21
                          mol_type = other RNA
                          organism = synthetic construct
misc_feature              1..21
                          note = siRNA strand - modified as per Table 2
SEQUENCE: 78
ttccaggctc acgtacacta c                                              21

SEQ ID NO: 79             moltype = RNA   length = 19
FEATURE                   Location/Qualifiers
source                    1..19
                          mol_type = other RNA
                          organism = synthetic construct
misc_feature              1..19
                          note = siRNA strand - modified as per Table 2
SEQUENCE: 79
gggatgacaa gtttcatga                                                 19

SEQ ID NO: 80             moltype = RNA   length = 21
FEATURE                   Location/Qualifiers
source                    1..21
                          mol_type = other RNA
                          organism = synthetic construct
misc_feature              1..21
                          note = siRNA strand - modified as per Table 2
SEQUENCE: 80
tcatgaaact tgtcatcccc c                                              21

SEQ ID NO: 81             moltype = RNA   length = 19
FEATURE                   Location/Qualifiers
source                    1..19
                          mol_type = other RNA
                          organism = synthetic construct
misc_feature              1..19
                          note = siRNA strand - modified as per Table 2
SEQUENCE: 81
caagtttcat gccaagaca                                                 19

SEQ ID NO: 82             moltype = RNA   length = 21
```

```
FEATURE                 Location/Qualifiers
source                  1..21
                        mol_type = other RNA
                        organism = synthetic construct
misc_feature            1..21
                        note = siRNA strand - modified as per Table 2
SEQUENCE: 82
tgtcttggca tgaaacttgt c                                              21

SEQ ID NO: 83           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 83
ctgacaagtc tcattgaga                                                 19

SEQ ID NO: 84           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 84
tctcaatgag acttgtcaga a                                              21

SEQ ID NO: 85           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 85
tgacaagtct cattgagaa                                                 19

SEQ ID NO: 86           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 86
ttctcaatga gacttgtcag a                                              21

SEQ ID NO: 87           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 87
acaagtctca ttgagagta                                                 19

SEQ ID NO: 88           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 88
tactctcaat gagacttgtc a                                              21

SEQ ID NO: 89           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 89
tcattgagag tgtcctgaa                                                 19
```

```
SEQ ID NO: 90            moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 90
ttcaggacac tctcaatgag a                                             21

SEQ ID NO: 91            moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 91
cattgagagt gtcctgaaa                                                19

SEQ ID NO: 92            moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 92
tttcaggaca ctctcaatga g                                             21

SEQ ID NO: 93            moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 93
gggcagactc tctatgaaa                                                19

SEQ ID NO: 94            moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 94
tttcatagag agtctgccca c                                             21

SEQ ID NO: 95            moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 95
ggcagactct ctatgaaca                                                19

SEQ ID NO: 96            moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 96
tgttcataga gagtctgccc a                                             21

SEQ ID NO: 97            moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 97
gactctctat gaacaggta                                                19
```

```
SEQ ID NO: 98           moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 98
tacctgttca tagagagtct g                                                  21

SEQ ID NO: 99           moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 99
aacaggtggt gttcaccaa                                                     19

SEQ ID NO: 100          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 100
ttggtgaaca ccacctgttc a                                                  21

SEQ ID NO: 101          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 101
acacaaagga ggacactta                                                     19

SEQ ID NO: 102          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 102
taagtgtcct cctttgtgtg c                                                  21

SEQ ID NO: 103          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 103
cacaaaggag gacacttaa                                                     19

SEQ ID NO: 104          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 104
ttaagtgtcc tcctttgtgt g                                                  21

SEQ ID NO: 105          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 105
```

```
aaaggaggac acttatgaa                                                    19

SEQ ID NO: 106          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 106
ttcataagtg tcctcctttg t                                                 21

SEQ ID NO: 107          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 107
gaaggaggac acttatgaa                                                    19

SEQ ID NO: 108          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 108
ttcataagtg tcctccttcg t                                                 21

SEQ ID NO: 109          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 109
gcacatcggg aacctcaaa                                                    19

SEQ ID NO: 110          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 110
tttgaggttc ccgatgtgcc t                                                 21

SEQ ID NO: 111          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 111
tcgggaacct caacgagta                                                    19

SEQ ID NO: 112          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 112
tactcgttga ggttcccgat g                                                 21

SEQ ID NO: 113          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
```

-continued

```
SEQUENCE: 113
gcaggagatc tacagctca                                          19

SEQ ID NO: 114          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 114
tgagctgtag atctcctgcc g                                       21

SEQ ID NO: 115          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 115
gagagacgag cgactgaca                                          19

SEQ ID NO: 116          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 116
tgtcagtcgc tcgtctctct c                                       21

SEQ ID NO: 117          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 117
agagacgagc gactgacaa                                          19

SEQ ID NO: 118          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 118
ttgtcagtcg ctcgtctctc t                                       21

SEQ ID NO: 119          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 119
gagacgagcg actgacaca                                          19

SEQ ID NO: 120          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 120
tgtgtcagtc gctcgtctct c                                       21

SEQ ID NO: 121          moltype = RNA  length = 19
FEATURE                 Location/Qualifiers
source                  1..19
                        mol_type = other RNA
                        organism = synthetic construct
misc_feature            1..19
```

```
                        note = siRNA strand - modified as per Table 2
SEQUENCE: 121
tgacacgcat gtacaacga                                                19

SEQ ID NO: 122          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 122
tcgttgtaca tgcgtgtcag t                                             21

SEQ ID NO: 123          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 123
gcatgtacaa cgtgcgcaa                                                19

SEQ ID NO: 124          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 124
ttgcgcacgt tgtacatgcg t                                             21

SEQ ID NO: 125          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 125
tgtacaacgt gcgcataaa                                                19

SEQ ID NO: 126          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 126
tttatgcgca cgttgtacat g                                             21

SEQ ID NO: 127          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 127
gtacaacgtg cgcataata                                                19

SEQ ID NO: 128          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 128
tattatgcgc acgttgtaca t                                             21

SEQ ID NO: 129          moltype = RNA   length = 19
FEATURE                 Location/Qualifiers
source                  1..19
                        mol_type = other RNA
                        organism = synthetic construct
```

```
                          -continued misc_feature              1..19
                          note = siRNA strand - modified as per Table 2
SEQUENCE: 129
cgcataatgc gggtggaga                                                 19

SEQ ID NO: 130            moltype = RNA  length = 21
FEATURE                   Location/Qualifiers
source                    1..21
                          mol_type = other RNA
                          organism = synthetic construct
misc_feature              1..21
                          note = siRNA strand - modified as per Table 2
SEQUENCE: 130
tctccacccg cattatgcgc a                                              21

SEQ ID NO: 131            moltype = RNA  length = 19
FEATURE                   Location/Qualifiers
source                    1..19
                          mol_type = other RNA
                          organism = synthetic construct
misc_feature              1..19
                          note = siRNA strand - modified as per Table 2
SEQUENCE: 131
gcataatgcg ggtggagta                                                 19

SEQ ID NO: 132            moltype = RNA  length = 21
FEATURE                   Location/Qualifiers
source                    1..21
                          mol_type = other RNA
                          organism = synthetic construct
misc_feature              1..21
                          note = siRNA strand - modified as per Table 2
SEQUENCE: 132
tactccaccc gcattatgcg c                                              21

SEQ ID NO: 133            moltype = RNA  length = 19
FEATURE                   Location/Qualifiers
source                    1..19
                          mol_type = other RNA
                          organism = synthetic construct
misc_feature              1..19
                          note = siRNA strand - modified as per Table 2
SEQUENCE: 133
taatgcgggt ggagttcta                                                 19

SEQ ID NO: 134            moltype = RNA  length = 21
FEATURE                   Location/Qualifiers
source                    1..21
                          mol_type = other RNA
                          organism = synthetic construct
misc_feature              1..21
                          note = siRNA strand - modified as per Table 2
SEQUENCE: 134
tagaactcca cccgcattat g                                              21

SEQ ID NO: 135            moltype = RNA  length = 19
FEATURE                   Location/Qualifiers
source                    1..19
                          mol_type = other RNA
                          organism = synthetic construct
misc_feature              1..19
                          note = siRNA strand - modified as per Table 2
SEQUENCE: 135
tgcgggtgga gttctacta                                                 19

SEQ ID NO: 136            moltype = RNA  length = 21
FEATURE                   Location/Qualifiers
source                    1..21
                          mol_type = other RNA
                          organism = synthetic construct
misc_feature              1..21
                          note = siRNA strand - modified as per Table 2
SEQUENCE: 136
tagtagaact ccacccgcat t                                              21

SEQ ID NO: 137            moltype = RNA  length = 19
FEATURE                   Location/Qualifiers
source                    1..19
                          mol_type = other RNA
```

-continued

```
                        organism = synthetic construct
misc_feature            1..19
                        note = siRNA strand - modified as per Table 2
SEQUENCE: 137
gcgggtggag ttctactta                                                19

SEQ ID NO: 138          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 138
taagtagaac tccacccgca t                                             21

SEQ ID NO: 139          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 139
cgggtggagt tctacttca                                                19

SEQ ID NO: 140          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 140
tgaagtagaa ctccacccgc a                                             21

SEQ ID NO: 141          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 141
tggagttcta cttccttta                                                19

SEQ ID NO: 142          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 142
taaaggaagt agaactccac c                                             21

SEQ ID NO: 143          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 143
ctacttcctt tcccagtaa                                                19

SEQ ID NO: 144          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 144
ttactgggaa aggaagtaga a                                             21

SEQ ID NO: 145          moltype = RNA   length = 19
FEATURE                 Location/Qualifiers
source                  1..19
```

```
                              mol_type = other RNA
                              organism = synthetic construct
misc_feature                  1..19
                              note = siRNA strand - modified as per Table 2
SEQUENCE: 145
ttcctttccc agtacgtga                                                        19

SEQ ID NO: 146                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 2
SEQUENCE: 146
tcacgtactg ggaaaggaag t                                                     21

SEQ ID NO: 147                moltype = RNA   length = 19
FEATURE                       Location/Qualifiers
source                        1..19
                              mol_type = other RNA
                              organism = synthetic construct
misc_feature                  1..19
                              note = siRNA strand - modified as per Table 2
SEQUENCE: 147
gtcctttccc agtacgtga                                                        19

SEQ ID NO: 148                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 2
SEQUENCE: 148
tcacgtactg ggaaaggacg t                                                     21

SEQ ID NO: 149                moltype = RNA   length = 19
FEATURE                       Location/Qualifiers
source                        1..19
                              mol_type = other RNA
                              organism = synthetic construct
misc_feature                  1..19
                              note = siRNA strand - modified as per Table 2
SEQUENCE: 149
tcctttccca gtacgtgta                                                        19

SEQ ID NO: 150                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 2
SEQUENCE: 150
tacacgtact gggaaaggaa g                                                     21

SEQ ID NO: 151                moltype = RNA   length = 19
FEATURE                       Location/Qualifiers
source                        1..19
                              mol_type = other RNA
                              organism = synthetic construct
misc_feature                  1..19
                              note = siRNA strand - modified as per Table 2
SEQUENCE: 151
agccaatgcg cttagcgga                                                        19

SEQ ID NO: 152                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 2
SEQUENCE: 152
tccgctaagc gcattggctg c                                                     21

SEQ ID NO: 153                moltype = RNA   length = 19
FEATURE                       Location/Qualifiers
```

```
source                  1..19
                        mol_type = other RNA
                        organism = synthetic construct
misc_feature            1..19
                        note = siRNA strand - modified as per Table 2
SEQUENCE: 153
tctggaacat tgataacaa                                                    19

SEQ ID NO: 154          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 154
ttgttatcaa tgttccagac a                                                 21

SEQ ID NO: 155          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 155
ctggaacatt gataacaaa                                                    19

SEQ ID NO: 156          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 156
tttgttatca atgttccaga c                                                 21

SEQ ID NO: 157          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 157
ggaacattga taacaacta                                                    19

SEQ ID NO: 158          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 158
tagttgttat caatgttcca g                                                 21

SEQ ID NO: 159          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 159
aacattgata acaacttca                                                    19

SEQ ID NO: 160          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 160
tgaagttgtt atcaatgttc c                                                 21

SEQ ID NO: 161          moltype = RNA  length = 19
```

```
FEATURE                 Location/Qualifiers
source                  1..19
                        mol_type = other RNA
                        organism = synthetic construct
misc_feature            1..19
                        note = siRNA strand - modified as per Table 2
SEQUENCE: 161
gacattgata acaacttca                                                    19

SEQ ID NO: 162          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 162
tgaagttgtt atcaatgtcc c                                                 21

SEQ ID NO: 163          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 163
acattgataa caacttcta                                                    19

SEQ ID NO: 164          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 164
tagaagttgt tatcaatgtt c                                                 21

SEQ ID NO: 165          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 165
attgataaca acttctgaa                                                    19

SEQ ID NO: 166          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 166
ttcagaagtt gttatcaatg t                                                 21

SEQ ID NO: 167          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 2
SEQUENCE: 167
gttgataaca acttctgaa                                                    19

SEQ ID NO: 168          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 2
SEQUENCE: 168
ttcagaagtt gttatcaacg t                                                 21
```

```
SEQ ID NO: 169         moltype = RNA   length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 169
ttgataacaa cttctgaga                                                   19

SEQ ID NO: 170         moltype = RNA   length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 170
tctcagaagt tgttatcaat g                                                21

SEQ ID NO: 171         moltype = RNA   length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 171
gtgataacaa cttctgaga                                                   19

SEQ ID NO: 172         moltype = RNA   length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 172
tctcagaagt tgttatcact g                                                21

SEQ ID NO: 173         moltype = RNA   length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 173
acctctcatt gctgatcaa                                                   19

SEQ ID NO: 174         moltype = RNA   length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 174
ttgatcagca atgagaggtg g                                                21

SEQ ID NO: 175         moltype = RNA   length = 19
FEATURE                Location/Qualifiers
source                 1..19
                       mol_type = other RNA
                       organism = synthetic construct
misc_feature           1..19
                       note = siRNA strand - modified as per Table 2
SEQUENCE: 175
agcacagata tccacacaa                                                   19

SEQ ID NO: 176         moltype = RNA   length = 21
FEATURE                Location/Qualifiers
source                 1..21
                       mol_type = other RNA
                       organism = synthetic construct
misc_feature           1..21
                       note = siRNA strand - modified as per Table 2
SEQUENCE: 176
ttgtgtggat atctgtgctg g                                                21
```

```
SEQ ID NO: 177           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 177
cggtcatact gtcggttaa                                                    19

SEQ ID NO: 178           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 178
ttaaccgaca gtatgaccgt c                                                 21

SEQ ID NO: 179           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 179
tactgtcggt taatcagaa                                                    19

SEQ ID NO: 180           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 180
ttctgattaa ccgacagtat g                                                 21

SEQ ID NO: 181           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 181
gactgtcggt taatcagaa                                                    19

SEQ ID NO: 182           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 182
ttctgattaa ccgacagtct g                                                 21

SEQ ID NO: 183           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 183
gggtcctcca tacctagaa                                                    19

SEQ ID NO: 184           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 184
```

```
ttctaggtat ggaggacccc a                                         21

SEQ ID NO: 185           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 185
agagatcgct ggcaccata                                            19

SEQ ID NO: 186           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 186
tatggtgcca gcgatctctc c                                         21

SEQ ID NO: 187           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 187
gagatcgctg gcaccataa                                            19

SEQ ID NO: 188           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 188
ttatggtgcc agcgatctct c                                         21

SEQ ID NO: 189           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 189
ctggcaccat agccttata                                            19

SEQ ID NO: 190           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
SEQUENCE: 190
tataaggcta tggtgccagc g                                         21

SEQ ID NO: 191           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 2
SEQUENCE: 191
ccatagcctt atggccaaa                                            19

SEQ ID NO: 192           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 2
```

-continued

```
SEQUENCE: 192
tttggccata aggctatggt g                                              21

SEQ ID NO: 193           moltype = RNA   length = 19
FEATURE                  Location/Qualifiers
source                   1..19
                         mol_type = other RNA
                         organism = synthetic construct
misc_feature             1..19
                         note = siRNA strand - modified as per Table 5
SEQUENCE: 193
caggcagcca aacctcata                                                 19

SEQ ID NO: 194           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 194
tatgaggttt ggctgcctgg g                                              21

SEQ ID NO: 195           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 195
tatgaggttt ggctgcctgg g                                              21

SEQ ID NO: 196           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 196
tatgaggttt ggctgcctgg g                                              21

SEQ ID NO: 197           moltype = RNA   length = 22
FEATURE                  Location/Qualifiers
source                   1..22
                         mol_type = other RNA
                         organism = synthetic construct
misc_feature             1..22
                         note = siRNA strand - modified as per Table 5
SEQUENCE: 197
tatgaggttt tggctgcctg gg                                             22

SEQ ID NO: 198           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 198
tatgaggttt ggctgcctgg g                                              21

SEQ ID NO: 199           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 199
tatgaggttt ggctgcctgg g                                              21

SEQ ID NO: 200           moltype = RNA   length = 21
FEATURE                  Location/Qualifiers
source                   1..21
                         mol_type = other RNA
                         organism = synthetic construct
misc_feature             1..21
```

-continued

```
                        note = siRNA strand - modified as per Table 5
SEQUENCE: 200
tatgaggttt ggctgcctgg g                                             21

SEQ ID NO: 201          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 201
tatgaggttt tggctgcctg gg                                            22

SEQ ID NO: 202          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 202
tatgaggttt ggctgcctgg g                                             21

SEQ ID NO: 203          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 203
tatgaggttt ggctgcctgg g                                             21

SEQ ID NO: 204          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 204
tatgaggttt ggctgcctgg g                                             21

SEQ ID NO: 205          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 205
tatgaggttt tggctgcctg gg                                            22

SEQ ID NO: 206          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 206
tatgaggttt ggctgcctgg g                                             21

SEQ ID NO: 207          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 207
ctatgagcct gacctggaa                                                19

SEQ ID NO: 208          moltype = RNA   length = 21
FEATURE                 Location/Qualifiers
source                  1..21
                        mol_type = other RNA
                        organism = synthetic construct
```

```
misc_feature         1..21
                     note = siRNA strand - modified as per Table 5
SEQUENCE: 208
ttccaggtca ggctcatagt t                                              21

SEQ ID NO: 209       moltype = RNA  length = 21
FEATURE              Location/Qualifiers
source               1..21
                     mol_type = other RNA
                     organism = synthetic construct
misc_feature         1..21
                     note = siRNA strand - modified as per Table 5
SEQUENCE: 209
ttccaggtca ggctcatagt t                                              21

SEQ ID NO: 210       moltype = RNA  length = 21
FEATURE              Location/Qualifiers
source               1..21
                     mol_type = other RNA
                     organism = synthetic construct
misc_feature         1..21
                     note = siRNA strand - modified as per Table 5
SEQUENCE: 210
ttccaggtca ggctcatagt t                                              21

SEQ ID NO: 211       moltype = RNA  length = 22
FEATURE              Location/Qualifiers
source               1..22
                     mol_type = other RNA
                     organism = synthetic construct
misc_feature         1..22
                     note = siRNA strand - modified as per Table 5
SEQUENCE: 211
ttccaggttc aggctcatag tt                                             22

SEQ ID NO: 212       moltype = RNA  length = 21
FEATURE              Location/Qualifiers
source               1..21
                     mol_type = other RNA
                     organism = synthetic construct
misc_feature         1..21
                     note = siRNA strand - modified as per Table 5
SEQUENCE: 212
ttccaggtca ggctcatagt t                                              21

SEQ ID NO: 213       moltype = RNA  length = 21
FEATURE              Location/Qualifiers
source               1..21
                     mol_type = other RNA
                     organism = synthetic construct
misc_feature         1..21
                     note = siRNA strand - modified as per Table 5
SEQUENCE: 213
ttccaggtca ggctcatagt t                                              21

SEQ ID NO: 214       moltype = RNA  length = 21
FEATURE              Location/Qualifiers
source               1..21
                     mol_type = other RNA
                     organism = synthetic construct
misc_feature         1..21
                     note = siRNA strand - modified as per Table 5
SEQUENCE: 214
ttccaggtca ggctcatagt t                                              21

SEQ ID NO: 215       moltype = RNA  length = 22
FEATURE              Location/Qualifiers
source               1..22
                     mol_type = other RNA
                     organism = synthetic construct
misc_feature         1..22
                     note = siRNA strand - modified as per Table 5
SEQUENCE: 215
ttccaggttc aggctcatag tt                                             22

SEQ ID NO: 216       moltype = RNA  length = 21
FEATURE              Location/Qualifiers
source               1..21
                     mol_type = other RNA
```

```
                        organism = synthetic construct
misc_feature            1..21
                        note = siRNA strand - modified as per Table 5
SEQUENCE: 216
ttccaggtca ggctcatagt t                                              21

SEQ ID NO: 217          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 217
ttccaggtca ggctcatagt t                                              21

SEQ ID NO: 218          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 218
ttccaggtca ggctcatagt t                                              21

SEQ ID NO: 219          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 219
ttccaggttc aggctcatag tt                                             22

SEQ ID NO: 220          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 220
ttccaggtca ggctcatagt t                                              21

SEQ ID NO: 221          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 221
ttccttcaat caaacccaa                                                 19

SEQ ID NO: 222          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 222
ttgggtttga ttgaaggaag g                                              21

SEQ ID NO: 223          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 223
ttgggtttga ttgaaggaag g                                              21

SEQ ID NO: 224          moltype = RNA   length = 21
FEATURE                 Location/Qualifiers
source                  1..21
```

```
                              mol_type = other RNA
                              organism = synthetic construct
misc_feature                  1..21
                              note = siRNA strand - modified as per Table 5
SEQUENCE: 224
ttgggtttga ttgaaggaag g                                                   21

SEQ ID NO: 225                moltype = RNA   length = 22
FEATURE                       Location/Qualifiers
source                        1..22
                              mol_type = other RNA
                              organism = synthetic construct
misc_feature                  1..22
                              note = siRNA strand - modified as per Table 5
SEQUENCE: 225
ttgggttttg attgaaggaa gg                                                  22

SEQ ID NO: 226                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 5
SEQUENCE: 226
ttgggtttga ttgaaggaag g                                                   21

SEQ ID NO: 227                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 5
SEQUENCE: 227
ttgggtttga ttgaaggaag g                                                   21

SEQ ID NO: 228                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 5
SEQUENCE: 228
ttgggtttga ttgaaggaag g                                                   21

SEQ ID NO: 229                moltype = RNA   length = 22
FEATURE                       Location/Qualifiers
source                        1..22
                              mol_type = other RNA
                              organism = synthetic construct
misc_feature                  1..22
                              note = siRNA strand - modified as per Table 5
SEQUENCE: 229
ttgggttttg attgaaggaa gg                                                  22

SEQ ID NO: 230                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 5
SEQUENCE: 230
ttgggtttga ttgaaggaag g                                                   21

SEQ ID NO: 231                moltype = RNA   length = 21
FEATURE                       Location/Qualifiers
source                        1..21
                              mol_type = other RNA
                              organism = synthetic construct
misc_feature                  1..21
                              note = siRNA strand - modified as per Table 5
SEQUENCE: 231
ttgggtttga ttgaaggaag g                                                   21

SEQ ID NO: 232                moltype = RNA   length = 21
FEATURE                       Location/Qualifiers
```

```
source                  1..21
                        mol_type = other RNA
                        organism = synthetic construct
misc_feature            1..21
                        note = siRNA strand - modified as per Table 5
SEQUENCE: 232
ttgggtttga ttgaaggaag g                                              21

SEQ ID NO: 233          moltype = RNA  length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 233
ttgggttttg attgaaggaa gg                                             22

SEQ ID NO: 234          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 234
ttgggtttga ttgaaggaag g                                              21

SEQ ID NO: 235          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 235
agaagtctcc tcttcatca                                                 19

SEQ ID NO: 236          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 236
tgatgaagag gagacttctg c                                              21

SEQ ID NO: 237          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 237
tgatgaagag gagacttctg c                                              21

SEQ ID NO: 238          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 238
tgatgaagag gagacttctg c                                              21

SEQ ID NO: 239          moltype = RNA  length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 239
tgatgaatga ggagacttct gc                                             22

SEQ ID NO: 240          moltype = RNA  length = 21
```

```
FEATURE                 Location/Qualifiers
source                  1..21
                        mol_type = other RNA
                        organism = synthetic construct
misc_feature            1..21
                        note = siRNA strand - modified as per Table 5
SEQUENCE: 240
tgatgaagag gagacttctg c                                              21

SEQ ID NO: 241          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 241
tgatgaagag gagacttctg c                                              21

SEQ ID NO: 242          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 242
tgatgaagag gagacttctg c                                              21

SEQ ID NO: 243          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 243
tgatgaatga ggagacttct gc                                             22

SEQ ID NO: 244          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 244
tgatgaagag gagacttctg c                                              21

SEQ ID NO: 245          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 245
tgatgaagag gagacttctg c                                              21

SEQ ID NO: 246          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 246
tgatgaagag gagacttctg c                                              21

SEQ ID NO: 247          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 247
tgatgaatga ggagacttct gc                                             22
```

```
SEQ ID NO: 248          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 248
tgatgaagag gagacttctg c                                                 21

SEQ ID NO: 249          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 249
cattgagagt gtcctgaaa                                                    19

SEQ ID NO: 250          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 250
tttcaggaca ctctcaatga g                                                 21

SEQ ID NO: 251          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 251
tttcaggaca ctctcaatga g                                                 21

SEQ ID NO: 252          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 252
tttcaggaca ctctcaatga g                                                 21

SEQ ID NO: 253          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 253
tttcaggtac actctcaatg ag                                                22

SEQ ID NO: 254          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 254
tttcaggaca ctctcaatga g                                                 21

SEQ ID NO: 255          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 255
tttcaggaca ctctcaatga g                                                 21
```

```
SEQ ID NO: 256          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 256
tttcaggaca ctctcaatga g                                              21

SEQ ID NO: 257          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 257
tttcaggtac actctcaatg ag                                             22

SEQ ID NO: 258          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 258
tttcaggaca ctctcaatga g                                              21

SEQ ID NO: 259          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 259
tttcaggaca ctctcaatga g                                              21

SEQ ID NO: 260          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 260
tttcaggaca ctctcaatga g                                              21

SEQ ID NO: 261          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 261
tttcaggtac actctcaatg ag                                             22

SEQ ID NO: 262          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 262
tttcaggaca ctctcaatga g                                              21

SEQ ID NO: 263          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 263
```

```
aaaggaggac acttatgaa                                                    19

SEQ ID NO: 264          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 264
ttcataagtg tcctcctttg t                                                 21

SEQ ID NO: 265          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 265
ttcataagtg tcctcctttg t                                                 21

SEQ ID NO: 266          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 266
ttcataagtg tcctcctttg t                                                 21

SEQ ID NO: 267          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 267
ttcataatgt gtcctccttt gt                                                22

SEQ ID NO: 268          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 268
ttcataagtg tcctcctttg t                                                 21

SEQ ID NO: 269          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 269
ttcataagtg tcctcctttg t                                                 21

SEQ ID NO: 270          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 270
ttcataagtg tcctcctttg t                                                 21

SEQ ID NO: 271          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
```

-continued

```
SEQUENCE: 271
ttcataatgt gtcctccttt gt                                              22

SEQ ID NO: 272         moltype = RNA   length = 21
FEATURE                Location/Qualifiers
source                 1..21
                       mol_type = other RNA
                       organism = synthetic construct
misc_feature           1..21
                       note = siRNA strand - modified as per Table 5
SEQUENCE: 272
ttcataagtg tcctcctttg t                                               21

SEQ ID NO: 273         moltype = RNA   length = 21
FEATURE                Location/Qualifiers
source                 1..21
                       mol_type = other RNA
                       organism = synthetic construct
misc_feature           1..21
                       note = siRNA strand - modified as per Table 5
SEQUENCE: 273
ttcataagtg tcctcctttg t                                               21

SEQ ID NO: 274         moltype = RNA   length = 21
FEATURE                Location/Qualifiers
source                 1..21
                       mol_type = other RNA
                       organism = synthetic construct
misc_feature           1..21
                       note = siRNA strand - modified as per Table 5
SEQUENCE: 274
ttcataagtg tcctcctttg t                                               21

SEQ ID NO: 275         moltype = RNA   length = 22
FEATURE                Location/Qualifiers
source                 1..22
                       mol_type = other RNA
                       organism = synthetic construct
misc_feature           1..22
                       note = siRNA strand - modified as per Table 5
SEQUENCE: 275
ttcataatgt gtcctccttt gt                                              22

SEQ ID NO: 276         moltype = RNA   length = 21
FEATURE                Location/Qualifiers
source                 1..21
                       mol_type = other RNA
                       organism = synthetic construct
misc_feature           1..21
                       note = siRNA strand - modified as per Table 5
SEQUENCE: 276
ttcataagtg tcctcctttg t                                               21

SEQ ID NO: 277         moltype = RNA   length = 19
FEATURE                Location/Qualifiers
source                 1..19
                       mol_type = other RNA
                       organism = synthetic construct
misc_feature           1..19
                       note = siRNA strand - modified as per Table 5
SEQUENCE: 277
tgtacaacgt gcgcataaa                                                  19

SEQ ID NO: 278         moltype = RNA   length = 21
FEATURE                Location/Qualifiers
source                 1..21
                       mol_type = other RNA
                       organism = synthetic construct
misc_feature           1..21
                       note = siRNA strand - modified as per Table 5
SEQUENCE: 278
tttatgcgca cgttgtacat g                                               21

SEQ ID NO: 279         moltype = RNA   length = 21
FEATURE                Location/Qualifiers
source                 1..21
                       mol_type = other RNA
                       organism = synthetic construct
misc_feature           1..21
```

```
                        note = siRNA strand - modified as per Table 5
SEQUENCE: 279
tttatgcgca cgttgtacat g                                          21

SEQ ID NO: 280          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 280
tttatgcgca cgttgtacat g                                          21

SEQ ID NO: 281          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 281
tttatgctgc acgttgtaca tg                                         22

SEQ ID NO: 282          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 282
tttatgcgca cgttgtacat g                                          21

SEQ ID NO: 283          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 283
tttatgcgca cgttgtacat g                                          21

SEQ ID NO: 284          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 284
tttatgcgca cgttgtacat g                                          21

SEQ ID NO: 285          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 285
tttatgctgc acgttgtaca tg                                         22

SEQ ID NO: 286          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 286
tttatgcgca cgttgtacat g                                          21

SEQ ID NO: 287          moltype = RNA   length = 21
FEATURE                 Location/Qualifiers
source                  1..21
                        mol_type = other RNA
                        organism = synthetic construct
```

```
misc_feature            1..21
                        note = siRNA strand - modified as per Table 5
SEQUENCE: 287
tttatgcgca cgttgtacat g                                              21

SEQ ID NO: 288          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 288
tttatgcgca cgttgtacat g                                              21

SEQ ID NO: 289          moltype = RNA   length = 22
FEATURE                 Location/Qualifiers
source                  1..22
                        mol_type = other RNA
                        organism = synthetic construct
misc_feature            1..22
                        note = siRNA strand - modified as per Table 5
SEQUENCE: 289
tttatgctgc acgttgtaca tg                                             22

SEQ ID NO: 290          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 290
tttatgcgca cgttgtacat g                                              21

SEQ ID NO: 291          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 291
cggtcatact gtcggttaa                                                 19

SEQ ID NO: 292          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 292
ttaaccgaca gtatgaccgt c                                              21

SEQ ID NO: 293          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 293
ttaaccgaca gtatgaccgt c                                              21

SEQ ID NO: 294          moltype = RNA   length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 294
ttaaccgaca gtatgaccgt c                                              21

SEQ ID NO: 295          moltype = RNA   length = 22
FEATURE                 Location/Qualifiers
source                  1..22
                        mol_type = other RNA
```

```
                         organism = synthetic construct
misc_feature             1..22
                         note = siRNA strand - modified as per Table 5
SEQUENCE: 295
ttaaccgtac agtatgaccg tc                                              22

SEQ ID NO: 296           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 296
ttaaccgaca gtatgaccgt c                                               21

SEQ ID NO: 297           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 297
ttaaccgaca gtatgaccgt c                                               21

SEQ ID NO: 298           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 298
ttaaccgaca gtatgaccgt c                                               21

SEQ ID NO: 299           moltype = RNA   length = 22
FEATURE                  Location/Qualifiers
source                   1..22
                         mol_type = other RNA
                         organism = synthetic construct
misc_feature             1..22
                         note = siRNA strand - modified as per Table 5
SEQUENCE: 299
ttaaccgtac agtatgaccg tc                                              22

SEQ ID NO: 300           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 300
ttaaccgaca gtatgaccgt c                                               21

SEQ ID NO: 301           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 301
ttaaccgaca gtatgaccgt c                                               21

SEQ ID NO: 302           moltype = RNA   length = 21
FEATURE                  Location/Qualifiers
source                   1..21
                         mol_type = other RNA
                         organism = synthetic construct
misc_feature             1..21
                         note = siRNA strand - modified as per Table 5
SEQUENCE: 302
ttaaccgaca gtatgaccgt c                                               21

SEQ ID NO: 303           moltype = RNA   length = 22
FEATURE                  Location/Qualifiers
source                   1..22
```

```
                        mol_type = other RNA
                        organism = synthetic construct
misc_feature            1..22
                        note = siRNA strand - modified as per Table 5
SEQUENCE: 303
ttaaccgtac agtatgaccg tc                                            22

SEQ ID NO: 304          moltype = RNA  length = 21
FEATURE                 Location/Qualifiers
source                  1..21
                        mol_type = other RNA
                        organism = synthetic construct
misc_feature            1..21
                        note = siRNA strand - modified as per Table 5
SEQUENCE: 304
ttaaccgaca gtatgaccgt c                                             21

SEQ ID NO: 305          moltype = RNA  length = 2886
FEATURE                 Location/Qualifiers
source                  1..2886
                        mol_type = mRNA
                        organism = Homo sapiens
SEQUENCE: 305
atcgctgggg gacagcctgc aggcttcagg aggggacaca agcatggagc ggctttgggg    60
tctattccag agagcgcaac aactgtcccc aagatcctct cagaccgtct accagcgtgt   120
ggaaggcccc cggaaagggc acctggagga ggaagaggaa gacggggagg aggggcggga   180
gacattggcc cacttctgcc ccatggagct gaggggccct gagcccctgg gctctagacc   240
caggcagcca aacctcattc cctgggcggc agcaggacgg agggctgccc cctacctggt   300
cctgacggcc ctgctgatct tcactggggc cttcctactg ggctacgtcg ccttccgagg   360
gtcctgccag gcgtgcggag actctgtgtt ggtggtcagt gaggatgtca actatgaacc   420
tgacctggat ttccaccagg gcagactcta ctggagcgac ctccaggcca tgttcctgca   480
gttcctgggg gaggggcgcc tggaggacac catcaggcaa accagccttc gggaacgggt   540
ggcaggctcg gccgggatgg ccgctctgac tcaggacatt cgcgcggcgc tctcccgcca   600
gaagctggac cacgtgtgga ccgacacgca ctacgtgggg ctgcaattcc cggatccggc   660
tcaccccaac accctgcact gggtcgatga ggccggaaag gtcggagagc agctgccgct   720
ggaggaccct gacgtctact gcccctacag cgccatcggc aacgtcacgg gagagctggt   780
gtacgcccac tacgggcggc ccgaagacct gcaggacctg cgggccaggg gcgtggatcc   840
agtgggccgc ctgctgctgg tgcgcgtggg ggtgatcagc ttcgcccaga aggtgaccaa   900
tgctcaggac ttcgggggctc aaggagtgct catataccca gagccagcgg acttctccca   960
ggacccaccc aagccaagcc tgtccagcca gcaggcagtg tatggacatg tgcacctggg  1020
aactggagac ccctacacac ctggcttccc ttccttcaat caaacccagt tccctccagt  1080
tgcatcatca ggccttccca gcatcccagc ccagcccatc agtgcagaca ttgcctcccg  1140
cctgctgagg aagctcaaag gccctgtggc ccccaagaa tggcaggggga gcctcctagg  1200
ctcccccttat cacctgggcc ccgggccacg actgcggcta gtggtcaaca atcacaggac  1260
ctccacccccc atcaacaaca tcttcggctg catcgaaggc cgctcagagc cagatcacta  1320
cgttgtcatc ggggcccaga gggatgcatg gggcccagga gcagctaaat ccgctgtggg  1380
gacggctata ctcctggagc tggtgcggac cttttcctcc atggtgagca acggcttccg  1440
gccccgcaga agtctcctct tcatcagctg ggacggtggt gactttgaa gcgtgggctc  1500
cacggagtgg ctagagggct acctcagcgt gctgcacctc aaagccgtag tgtacgtgag  1560
cctgacaac gcagtgctgg gggatgacaa gtttcatgcc aagaccagcc ccttctgac  1620
aagtctcatt gagagtgtcc tgaagcaggt ggattctgca aaccacagtg ggcagactct  1680
ctatgaacag gtggtgttca ccaatcccag ctgggatgct gaggtgatcc ggccctacc  1740
catgacagc agtgccatt ccttcacggc ctttgtggga gtccctgccg tcgagttctc  1800
cttttatggag gacgaccagg cctacccatt cctgcacaca aaggaggaca cttatgagaa  1860
cctgcataag gtgctgcaag gccgcctgcc cgccgtggc caggccgtgg cccagctcgc  1920
agggcagctc ctcatccggc tcagccacga tcgcctgctg cccctcgact tcggccgcta  1980
cgggacgtc gtcctcaggc acatcgggaa cctcaacgag ttctctgggg acctcaaggc  2040
ccgcgggctg accctgcagt gggtgtactc ggcgcggggg gactacatcc gggcggcgga  2100
aaagctgcgg caggagatct acagctcgga ggagagagac gagcgactga cacgcatga  2160
caacgtcgc ataatgcggg tggagttcta cttcctttcc cagtacgtgt cgccagccga  2220
ctcccccgttc cgccacatct tcatgggccg tggagaccac acgctgggcg ccctgctgga  2280
ccacctgcgg ctgctgcgct ccaacagctc cgggaccccc gggcacct cctccactgg  2340
cttccaggag agccgttttc ggcgtcagct agccctgctc acctgacgc tgcaagggc   2400
agccaatgcg cttagcgggg atgtctgaa cattgataa aacttctgag gccctgggga  2460
tcctcacatc cccgtcccc agtcaagagc tcctctgctc ctcgcttgaa tgattcaggg  2520
tcagggagt ggctcagagt ccacctctca ttgctgatca atttctcatt acccctacac  2580
atctctccac ggagcccaga ccccagcaca gatatccaca caccccagcc ctgcagtgta  2640
gctgacccta atgtgacggt catactgtcg gttaatcaga gagtagcatc ccttcaatca  2700
cagcccctcc cctttctgg ggtcctccat acctagagac aactctggga ggttgtctag  2760
gcccttggac ctggccagct ctgttagtgg gagagatcgc tggcaccata gccttatggc  2820
caacaggtgg tctgtggtga aaggggcgtg gagtttcaat atcaataaac cacctgatat  2880
caataa                                                              2886

SEQ ID NO: 306          moltype = RNA  length = 19
FEATURE                 Location/Qualifiers
source                  1..19
                        mol_type = other RNA
                        organism = synthetic construct
SEQUENCE: 306
```

```
cggtcatact gtcggttaa                                                    19

SEQ ID NO: 307          moltype = RNA   length = 21
FEATURE                 Location/Qualifiers
source                  1..21
                        mol_type = other RNA
                        organism = synthetic construct
SEQUENCE: 307
ttaaccgaca gtatgaccgt c                                                 21

SEQ ID NO: 308          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 308
cggtcatact gtcggttaa                                                    19

SEQ ID NO: 309          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 309
caggcagcca aacctcata                                                    19

SEQ ID NO: 310          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 310
ctatgagcct gacctggaa                                                    19

SEQ ID NO: 311          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 311
ttccttcaat caaacccaa                                                    19

SEQ ID NO: 312          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 312
agaagtctcc tcttcatca                                                    19

SEQ ID NO: 313          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 313
cattgagagt gtcctgaaa                                                    19

SEQ ID NO: 314          moltype = RNA   length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 314
aaaggaggac acttatgaa                                                    19
```

```
SEQ ID NO: 315          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 315
tgtacaacgt gcgcataaa                                                19

SEQ ID NO: 316          moltype = RNA  length = 19
FEATURE                 Location/Qualifiers
source                  1..19
                        mol_type = other RNA
                        organism = synthetic construct
misc_feature            1..19
                        note = siRNA strand - modified as per Table 5
SEQUENCE: 316
cggtcatact gtcggttaa                                                19
```

NUCLEIC ACIDS FOR INHIBITING EXPRESSION OF TRANSFERRIN RECEPTOR 2

BRIEF DESCRIPTION OF THE SEQUENCE LISTING

The nucleotide sequences provided herewith are shown using standard letter abbreviations for nucleotide bases as defined in 37 CFR 1.831 through 37 CFR 1.835. Only one strand of each nucleic acid sequence is shown, but the complementary strand is understood as included by any reference to the displayed strand. The Sequence Listing is submitted as an XML file named 3316_1_3_seqlist, approximately 399,000 bytes, created Sep. 26, 2024, the contents of which are incorporated by reference herein in their entirety.

FIELD

This disclosure relates to nucleic acids and compositions thereof for inhibiting expression of transferrin receptor 2 (TFR2). Also described are methods for treatment of TFR2-associated diseases, such as anemia, with the disclosed nucleic acids.

BACKGROUND

The hepcidin antimicrobial peptide (encoded primarily in hepatocytes by the HAMP gene) is a significant modulator of systemic iron homeostasis (Liu et al., Medicine, Volume 95, Number 14, April 2016). Its expression is tightly controlled by various factors, including serum and tissue iron levels, inflammation, and hypoxia. TFR2, a transmembrane protein predominantly expressed in hepatocytes and erythroid precursors, plays a pivotal role in iron sensing and signaling and, by extension, in regulation of erythropoiesis. In conditions of iron overload, TFR2 interacts with iron-bound transferrin, leading to downstream signaling events and induction of hepcidin expression. TFR2-deficient mice show reduced levels of phosphorylated SMAD1/5/8 in the liver, suggesting that TFR2 regulates hepcidin via the BMP-SMAD pathway. Additionally, TFR2-deficient mice have blunted hepcidin response to inflammation suggesting a crosstalk with IL6-STAT-mediated regulation of hepcidin expression. The function of TFR2 in hepcidin and iron regulation has been validated by human genetics. Humans with loss of function mutations in the TFR2 gene present with a condition of iron overload, called hemochromatosis, characterized by excessive iron absorption and reduced hepcidin (Wang et al., Blood 133:18-29, 2019; Wallace et al., Blood 117:2960-2966, 2011). Therefore, while HAMP overexpression is associated with iron deficiency anemia, HAMP underexpression can result in iron overload diseases such as hereditary hemochromatosis. Reducing HAMP overexpression could therefore provide targeted treatment for HAMP-related anemias. Such reduction of hepcidin levels can be achieved directly, e.g., via antisense oligonucleotide or siRNA targeting of the HAMP gene, or indirectly by targeting genetic elements of the upstream pathways that regulate hepcidin levels, such as TFR2.

Previous efforts at directly reducing TFR2 using siRNA have been described (e.g., in U.S. Pat. No. 9,228,188 and WO 2023/176,862). However, these reported efforts have not developed into clinical-stage therapeutics. Thus, a continuing need exists for siRNA molecules to robustly and reliably reduce the expression and associated activity of TFR2 and by extension pathological amounts of hepcidin in circulation.

SUMMARY

The present disclosure describes the discovery of novel, highly active, specific, and metabolically stable siRNAs for inhibiting expression of TFR2 mRNA. In particular, it was observed that particular siRNAs of a particular sequence and possessing unique chemical modification patterns can robustly and specifically knock down TFR2 mRNA expression, both in vitro and in vivo, while displaying superb metabolic stability. The described siRNAs are additionally predicted not to exhibit sequence-dependent off-target knockdown activity with their potential seed-mediated off-target activity being efficiently neutralized. The extensive assays described herein show the discovery and optimization of the described compounds, and additionally demonstrate that the ability to effectively inhibit expression of TFR2 mRNA is sensitive to the region of TFR2 mRNA targeted, and variations in oligonucleotide chemical modifications, with variations affecting overall activity and/or specificity. Accordingly, the presently described siRNAs provide novel therapeutic agents which are advantageously active, specific, and safe.

Described herein are double-stranded nucleic acids for inhibiting expression of transferrin receptor 2 (TFR2), that include a sense strand including a sense strand sequence and an antisense strand including an antisense strand sequence, in which the sense strand sequence includes the sequence 5' CGGUCAUACUGUCGGUUAA 3' (SEQ ID NO: 306) and/or the antisense strand sequence includes the sequence 5' UUAACCGACAGUAUGACCGUC 3' (SEQ ID NO: 307), which can in particular embodiments be partially or fully modified, and in more particular embodiments can include 1, 2, 3, 4, 5, or more additions, deletions or substitutions in the sense and/or the antisense strand sequence.

In particular embodiments, the sense strand includes the sense strand sequence 5'-(C3)csgsguCfaUfAfCfugucgguuaa 3' (SEQ ID NO: 308), in which a lowercase letter indicates a 2'-O-Methyl (2'-OMe) modified RNA nucleotide, an uppercase letter followed by f indicates a 2'-Fluoro (2'-F) modified RNA nucleotide, (C3) indicates a propanol or C3 alkyl moiety connected to the 5' end of the strand via a phosphodiester linkage, and s indicates a phosphorothioate linkage between adjacent nucleotides.

In particular embodiments of the described double-stranded nucleic acids, the sense strand sequence includes 5'-(C3)csgsguCfaUfAfCfugucgguuaasLsLsL-3 (SEQ ID NO: 291), in which L indicates a monomer of N-acetylgalactosamine (GalNAc) with a triethyleneglycol (TEG) linker, and which connected via a phosphorothioate linkage as noted.

In other particular embodiments, the antisense strand includes an antisense strand sequence 5'-(vinu)sUfsaacCf(3dG)AfCfaguaUfgAfccgsusc-3' (SEQ ID NO: 293) or 5'-(vinu)sUfsaacCf(3dG)aCfaguaUfgAfccgsusc-3' (SEQ ID NO: 297), in which (vinu) indicates a 5' vinylphosphonate 2'-OMe RNA U nucleotide, and (3dG) indicates a 3'H modification of ribose in a G nucleotide that is connected via a 2'-5' bridge with the following nucleotide.

In some embodiments of the described double-stranded nucleic acids, the sense strand sequence includes 5'-(C3) csgsguCfaUfAfCfugucgguuaasLsLsL-3 (SEQ ID NO: 291), in which L indicates a monomer of N-acetylgalactosamine (GalNAc) with a triethyleneglycol (TEG) linker, which is shown to be connected via a phosphorothioate linkage, and the antisense strand sequence includes 5'-(vinu)sUfsaacCf(3dG)AfCfaguaUfgAfccgsusc-3' (SEQ ID NO: 293) or 5'-(vinu)sUfsaacCf(3dG)aCfaguaUfgAfccgsusc-3' (SEQ ID NO: 297), in which (vinu) indicates a 5' vinylphosphonate 2'-OMe RNA U nucleotide, and (3dG) indicates a 3'H modification of ribose in a G nucleotide that is connected via a 2'-5' bridge with the following nucleotide.

Particular embodiments of the described double-stranded nucleic acids further include a targeting ligand that is covalently attached to the double-stranded nucleic acid, such as at least one of the 5' end of the sense strand, the 3' end of the sense strand, or the 3' end of the antisense strand, or any non-terminal nucleotide along the sense or antisense strands, and wherein the 3' ends of either the sense and/or of the antisense strands, if not attached to a targeting ligand, are extended to have a 3' overhang.

In some embodiments of the described double-stranded nucleic acids which include a targeting ligand, the targeting ligand is selected from one or more moieties that include but are not limited to a carbohydrate, lipophilic, any type of antibody, polypeptide, peptide, peptidomimetic, aptamer, vitamins, or any type of small molecule moieties that support cell targeting via binding to cellular membrane structures followed by siRNA internalization. In particular embodiments, the carbohydrate moiety is 1, 2, 3, or 4 N-acetylgalactosamine (GalNAc) moieties, which in still further particular embodiments is or are covalently attached to the 3' end of the sense strand, and even more particularly in certain embodiments can be linked to the sense strand via a triethyleneglycol linker.

In particular embodiments, the described double-stranded nucleic acids are for use in medicine, for such as but not limited to for use in treatment of an anemia and particularly a HAMP-related anemia as defined herein.

Also described herein is a pharmaceutical composition that includes the described double-stranded nucleic acid or a pharmaceutically acceptable salt thereof, and one or more of a pharmaceutically acceptable excipient, carrier, or buffer.

In particular embodiments of the pharmaceutical composition, the double-stranded nucleic acid is the only pharmaceutically active agent.

In other particular embodiments, the described pharmaceutical composition is for use in treatment of an anemia, such as particularly a HAMP-related anemia Further described herein is a method for treating an anemia, such as a HAMP-related anemia by administering to a subject in need thereof, an effective amount of the described pharmaceutical composition, thereby treating the anemia.

The foregoing and other objects, features, and advantages will become more apparent from the following detailed description, which proceeds with reference to the accompanying figures.

As described above and further listed below, the nucleic acid molecules described herein include nucleotide and extranucleotide (e.g., backbone and non-nucleotide moiety) modifications. The naming conventions of the noted modifications in the described sequences is shown in below Table 1. The listed modifications are further described herein.

TABLE 1

| Sequence Naming Conventions | |
|---|---|
| Symbol | Modification Type |
| N | non-modified ribonucleotide |

TABLE 1-continued

| Sequence Naming Conventions | |
|---|---|
| Symbol | Modification Type |
| n | A nucleotide with 2'-OMe modification of ribose |
| Nf | A nucleotide with 2'-F modification of ribose |
| 3dN | 3'H modification of ribose in a nucleotide N that is connected via 2'-5' bridge with the next one. |
| (2-5n) | 3'OMe modification of ribose in a nucleotide that is connected via 2'-5' bridge with the next one. |
| Nt | A nucleotide having threose instead of ribose as a sugar moiety (TNA) |
| vinu | –5'-E-vinylphosphonate 2'OMe U |
| s | Phosphorothioate backbone modification between 2 adjacent nucleotides |
| L | Monomer of N-acetylgalactosamine (GalNAc) with a triethyleneglycol (TEG) linker connected via a phosphodiester linkage (or phosphorothioate if noted with an "s") |
| C3 | propanol or C3 alkyl moiety connected via a phosphodiester linkage |

Figure 1:
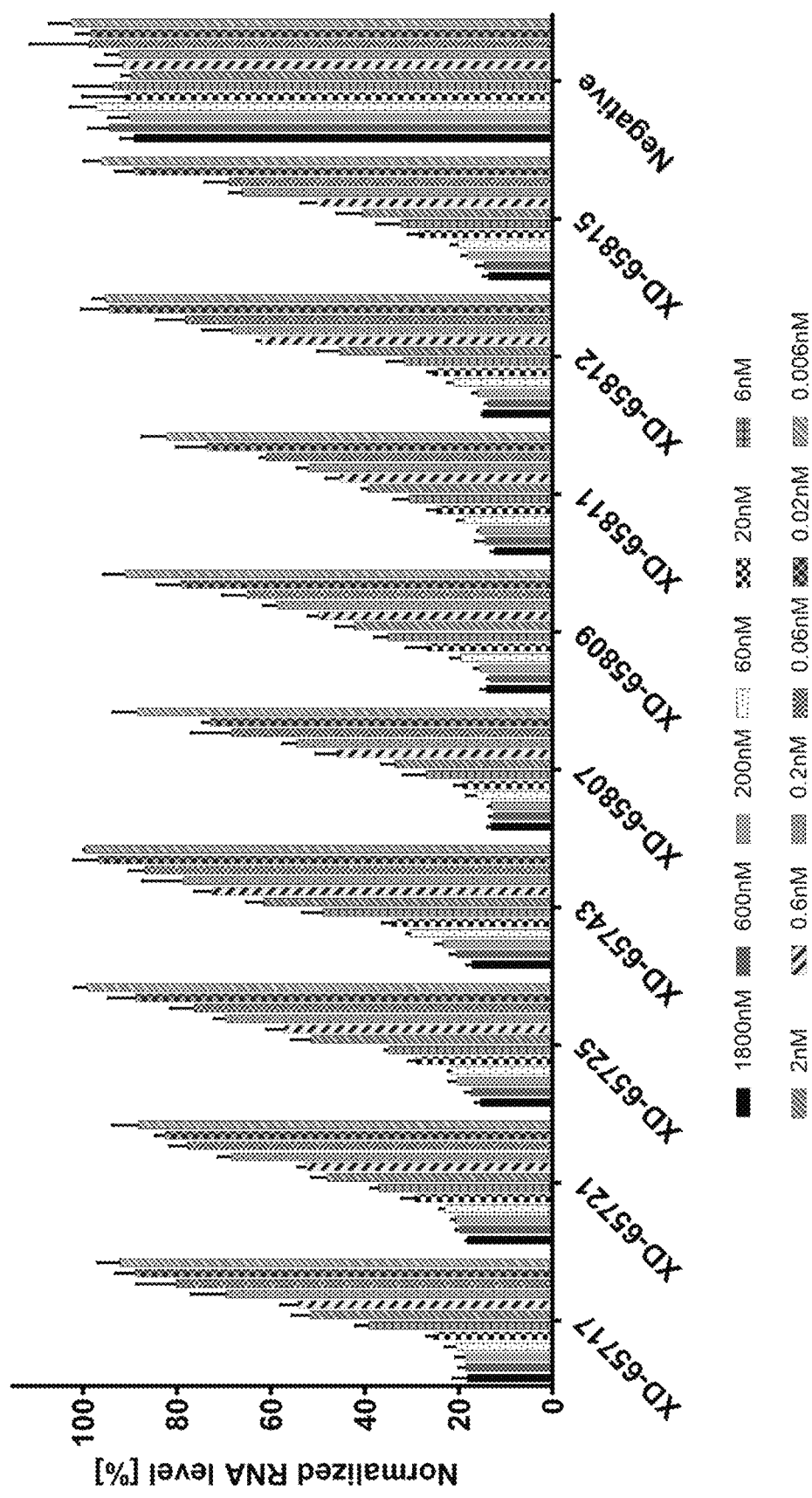
FIG. 1 shows the dose-dependent activity of chemically optimized TFR2 siRNAs in primary human hepatocytes (PHH). The siRNAs were delivered via free uptake mediated by a GalNAc ligands. The graphs show normalized residual expression levels (%) of human TFR2 mRNA in PHH treated with indicated siRNAs at a dose range from 1.8 mM to 6 pM in 3-fold dilution steps. % values were all normalized to the mean relative quantity (Rq) of control non-treated cells to obtain the mean relative abundance as a percentage of expression in non-treated cells. Error bars represent standard deviations.

or 10 mg/kg, of siRNAs XD-65807, XD-65811 or XD-65815 on Day 49 after study drug administration are shown. All % values are adjusted to standard curve and normalized to mean of TFR2 RNA levels in PBS control. Each data point represents the mean percentage of residual human TFR2 expression across the three liver lobes analyzed for each animal. Error bars are standard deviations. Statistical analysis was done using the one-way ANOVA followed by Dunnett's multiple comparison test with statistical significance set for p≤0.05 (GraphPad Prism package). Each treatment group was compared to the PBS control group. **=p<0.01 and *=p<0.05. The comparison between the XD-65815 group and the PBS control group was hampered due to having only one mouse in the XD-65815 group (n=1).

DETAILED DESCRIPTION

Terms

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise. It is further to be understood that all base sizes, and all molecular weight or molecular mass values, given for nucleic acids are approximate, and are provided for description. Although methods and materials similar or equivalent to those described herein can be used in the practice or testing of this disclosure, suitable methods and materials are described below. The term "comprises" means "includes." The term "consists essentially of" or "consisting essentially of" indicates that the active ingredient or step of the described composition or method includes only the expressly recited ingredient or step, but that non-active ingredients or non-critical steps are included even if not expressly recited. This is in contrast to "consists" or "consisting" of which indicates that only the recited ingredients or steps are included in the claim. It is to be understood that compositions that "comprise" a given ingredient can also in other embodiments "consist essentially of" or "consist of" that ingredient. Similarly, methods that "comprise" a given set of steps can also in other embodiments "consist essentially of" or "consist of" the expressly indicated set of steps. The abbreviation, "e.g.," is derived from the Latin exempli gratia, and is used herein to indicate a non-limiting example. Thus, the abbreviation "e.g.," is synonymous with the term "for example."

In case of conflict, the present specification, including explanations of terms, will control. All materials, methods, and examples are illustrative and not intended to be limiting. References cited herein are incorporated by reference herein with respect to the technical aspects described (chemical structure, sequence modifications, etc.).

Nucleic Acids for Inhibiting TFR2 Expression

Described herein are synthetic nucleic acid molecules for reducing the amount of TFR2 mRNA, and by extension inhibiting the expression of the hepcidin peptide that is dependent on expression of TFR2 for HAMP mRNA (encoding hepcidin peptide) expression, in a cell or organism that expresses HAMP. The described nucleic acid molecules, also referred to as nucleic acid "compounds" or nucleic acid "compositions" are suitable for RNA interference or inhibition of expression of the TFR2 target gene. As used herein, the term "mRNA knockdown," is understood to be synonymous with the concept of post-transcriptional inhibition of TFR2 expression (see Zhu et al., Cell Death Dis. 13 (7): 644 (2022)). As used herein, a "target" gene is a gene which the described dsRNA compounds are designed to specifically inhibit expression of by reducing the presence of the RNA encoded by the target gene. The described TFR2-targeting nucleic acids can be used, inter alia, for treatment of diseases and pathological conditions accompanied with iron deficiency associated with pathological HAMP overexpression and/or hepcidin accumulation in blood. Such "HAMP-related anemia" or alternatively "HAMP-associated anemia" include but are not limited to, hereditary iron refractory iron deficiency anemia (IRIDA), anemia associated with acute and chronic inflammatory diseases, cancer (including myelofibrosis), or chronic kidney disease (e.g., as described by Wang & Babitt, Curr. Opin. Hematol. 23 (3), 189-197 (2016), Verstovsek, Annals of Hem. 102:698-698 (2023); Portoles et al. Front Med. 26; 8:642296 (2021); and Rivera et al. Blood 112 (11), 3835 (2008)).

The molecules described herein can be presented as a double stranded (ds) molecule or as a single stranded (ss) molecule that is designed to form intramolecular double stranded regions which are then effectively equivalent to a double stranded molecule. Accordingly, the described molecules can be formed from ssRNAs that can hybridize one to another thereby forming a dsRNA duplex or from a single RNA molecule of sufficient internal complementarity to enable stem and loop (i.e., hairpin) formation. Antisense oligonucleotides, including but not limited to gapmers, with sufficient homology to the antisense strand sequences listed herein are also within the current disclosure. In particular embodiments, the described molecules are dsRNA, such as small interfering RNA (siRNA).

The double stranded nucleic acid molecules described herein have two polynucleotide strands (or their equivalents in the case of a ssRNA molecule with sufficient internal complementarity to form a hairpin structure): a strand with a nucleotide sequence reasonably identical to the targeted mRNA, most commonly referred to as the sense, or passenger, strand; and a reverse complementary strand also referred to as the antisense, or guide, strand. The sense and antisense strands are correspondingly composed of a sense strand nucleotide sequence (referred to herein as a "sense strand sequence") and an antisense strand nucleotide sequence (referred to herein as an "antisense strand sequence"). In the described molecules, the antisense strand is composed of a sequence that is substantially reverse complementary to a 15-35, particularly a 17-25, and more particularly a 15, 16, 17, 18, 19, 20, 21, 22, 23, 24, 25, 26, 27, 28, 29, 30, 31, 32, 33, 34, or 35 contiguous nucleotide sequence of the human TFR2 mRNA sequence found at in the NCBI database under accession number NM_001206855.3 (SEQ ID NO: 305; available online at ncbi.nlm.nih.gov/nuccore/NM_001206855.3).

In particular embodiments, the sense strand sequence of the described molecules is fully complementary to the antisense strand sequence within the double-stranded region (excluding a 3' overhang). In other particular embodiments, at least one of the sense or antisense strands of the described molecules is a sense or antisense strand sequence listed in Tables 2 and 5 below. In other particular embodiments, the described molecules comprise one of the sense and antisense strand sequence pairs listed in Tables 2 and 5 below.

Particular embodiments of the double stranded nucleic acid molecules described herein comprise a sense strand starting (5') from position 2657 of SEQ ID NO: 305 (referred to herein as "TFR2-2657 siRNAs"). In such embodiments, the sense strand sequence can comprise the sequence 5' CGGUCAUACUGUCGGUUAA 3' (SEQ ID NO: 306) and/or the antisense strand sequence can comprise the sequence 5' UUAACCGACAGUAUGACCGUC 3' (SEQ ID NO: 307). In particular embodiments, the described dsRNA includes at least one nucleotide or non-nucleotide (e.g., non-nucleotide ligand or moiety) addition, deletion, substitution, and/or modification to SEQ ID NOs 306 and/or 307. The described dsRNA can be partially or more preferably fully modified, such that each nucleotide is chemically modified from the unmodified sequences. In particular embodiments, the described dsRNAs can include 1, 2, 3, 4, 5, or more additions, deletions or substitutions, and in more particular embodiments no more than 1, no more than 2, no more than 3, no more than 3, no more than 4, or no more than 5 additions, deletion, or substitutions.

Particular modifications of TFR2-2657 siRNA sense and antisense sequences are additionally described below in Tables 2 and 5, according to the nucleotide and modification notation in Table 1. In particular embodiments, the described TFR2-2657 siRNA includes a sense strand sequence described herein as SEQ ID NO: 308 (5'-(C3)csgsguCfaUfAfCfugucgguuaa 3' (see Table 1 below for notation). In other embodiments, the siRNA includes a sense strand sequence described herein as SEQ ID NO: 291, as listed in Table 5. In particular embodiments, the siRNA includes an antisense strand sequence described herein as SEQ ID NO: 293 or 297, both of which are listed in Table 5.

In view of their double stranded nature, each strand of the described nucleic acids is substantially complementary to the other, and the nucleotide sequence of one strand can be understood from the sequence of the other. Strands being complementary to each other over a certain length means that the strands are able to form a stable non-interrupted duplex at physiological conditions of at least 12 consecutive hybridized base pairs over that length, such as but not limited to beginning from the 5' nucleotide of the antisense strand sequence. As used herein, a molecule that comprises sense and antisense strands that are "substantially complementary" means that every nucleotide of the length of the molecule does not necessarily have to be able to base pair with its counterpart in the other strand, as long as a stable double-stranded nucleic acid under physiological conditions can be formed. Nucleic acids that are capable of hybridizing under physiological conditions are nucleic acids that are capable of forming base pairs, particularly Watson-Crick or wobble base-pairs, between at least a portion of the opposed nucleotides in the strands so as to form a duplex region. Such a double-stranded nucleic acid is a stable double-stranded nucleic acid under physiological conditions, meaning that under such conditions, the two strands remain hybridized to each other.

In particular embodiments, the described double stranded nucleic acids, which in particular embodiments is a dsRNA, and more particularly an siRNA, comprises an antisense strand sequence that is 100% complementary to its target sequence. In other embodiments, the antisense strand sequence of the siRNA is only partially complementary, and has 1, 2, 3, or more nucleotides that are different from the complement of its target RNA sequence. Similarly, in particular embodiments, the strands of the dsRNA described herein can be fully complementary to each other. In other embodiments, the strands of the dsRNA can be partially complementary to each other, and can include base mismatches of 1, 2, 3, or more (sometimes referred to in the art as a "bungle"), so long as the dsRNA remains double stranded under physiological conditions. In some embodiments, variations in the sense or antisense strand sequences represent differences, in the sense strand, from the target sequence. In other embodiments, the variations in the sense and antisense strands can include a 1, 2, 3 or greater base overhang at the 3' end, which can independently be on the sense and/or the antisense strands. For example, in certain embodiments, a two-base 3' overhang is present on the antisense strand sequence. In more specific embodiments, the sense strand and the antisense strand each further comprises a 2-nt 3'-overhang. Overhang nucleotides can be either directly derived from the target RNA sequence (if on the sense strand) or be complementary to the target RNA sequence (if on the antisense strand) or substituted by "universal" nucleotides, for example, but not limited to dTdT or uu or ug (where "dT" is deoxythymidine, "u" is 2'OMe uridine, g is 2'OMe guanine connected between them and to the 3' end(s) of siRNA strands via phosphodiester or phosphorothioate linkages). In particular embodiments, 3' overhangs may be substituted by non-nucleotide moieties, such as but not limited to C3/C4-Pi/Ps-C3/C4-Pi/Ps where C3 and C4 are tri- or tetracarbon linkers connected between them and to the 3' end(s) of siRNA strands via phosphodiester (Pi) or phosphorothioate (Ps) linkages. Particular examples of 2-nt 3' overhangs are described herein, and include, but are not limited, to a 2'Ome uracil nucleotide followed by a 2'Ome cytosine nucleotide, joined at the 3' end of the antisense strand sequence, and to each other, by phosphorothioate linkages.

In particular embodiments of the described double stranded nucleic acids, such as a dsRNA, the sequence of the dsRNA is defined by reference to the sense strand sequence. In other embodiments, the sequence of dsRNA is defined by reference to the antisense strand sequence. In still other embodiments, the sequence of the dsRNA is defined in reference to both the sense strand sequence and the antisense strand sequence.

In the present disclosure, distinction is made between the sense and antisense strands and the sense and antisense strand sequences. Accordingly, the described sense and antisense strands can comprise sense and antisense strand sequences that consist of particular defined nucleotide sequences which can, in particular embodiments be unmodified, partially modified (i.e., wherein not all of the nucleotides are chemically modified), or completely modified (wherein all of the nucleotides of the sequence are chemically modified). In such molecules, the sense and antisense strand sequences are expressly defined, but the sense and antisense strands as independent molecules remain open to undefined further addition or modification.

Nucleic Acid Modifications

The double stranded nucleic acids described herein, such as dsRNA, and more specifically siRNA, can include sense and/or antisense strand sequences that are composed of unmodified nucleotides, combine nucleotides that are unmodified with those that are chemically modified, such that at least one nucleotide of one strand of the double stranded nucleic acid must be modified, or in particular embodiments are completely (i.e., "fully") modified such that all of the nucleotides of both sense and antisense strand sequences are modified.

Unmodified double stranded nucleic acids refer to a molecule in which the components of the nucleic acid, namely sugars, bases, phosphate moieties, and internucleoside linkages, are the same or essentially the same as those which occur in nature. An unmodified (also described as a "non-modified") nucleotide of the described nucleic acid molecules is one observed in cellular nucleic acids and is composed of a nitrogenous base [Adenine—A, Guanine—G, Thymine—T (in DNA), Cytosine—C, Uracil—U (in RNA)], a D-deoxyribose or D-ribose sugar moiety (furanose) in deoxy-ribonucleotides and ribonucleotides, respectively, and at least one phosphate group, which may make up an internucleoside linkage (backbone). An unmodified nucleotide may refer to an unmodified ribonucleotide or an unmodified deoxyribonucleotide. An unmodified nucleotide in a nucleic acid molecule is covalently linked to neighboring nucleotides by phosphodiester bonds between the sugar moieties of the nucleotides via 3'-5' linkages, in which the 3' position of the nucleotide's sugar moiety is linked through a phosphate with the 5' position of the next nucleotide's sugar moiety, and the 5' position of the nucleotide's sugar moiety is similarly linked through a phosphate with the 3' position of the previous nucleotide's sugar moiety (in this context, "next" and "previous" relate to the 5'>3' direction, as commonly referred in the art).

In contrast, a modified nucleotide of the described nucleic acid molecules is an unmodified nucleotide in which at least one of the nitrogenous base, the sugar, or the internucleoside linkage are independently chemically modified whereas some of these modifications may also occur in nature. It will accordingly be understood that deoxyribose nucleotides are considered to be modified ribonucleotides in the context of RNA compounds, such as, the described siRNA compounds. Similarly, a nucleotide containing uracil would be considered to be a modified nucleotide in the context of DNA compounds. In addition, the described double stranded ribonucleic acids may be modified by substitution with, or insertion of, analogs of nucleic acids or bases. Other particular non-limiting examples of modified nucleotides include naturally occurring but non-abundant nucleotide variants, such as pseudo-U or inosine (I). In other particular examples, the entire nucleotide (all its parts) is modified, such as in the case of mirror nucleotides including L-nucleotides. Additional modifications to the nucleic acids described can include but are not limited to end modifications, e.g., 5'-end modifications (phosphorylation, conjugation, inverted linkages) or 3'-end modifications (conjugated ligands, DNA nucleotides, inverted linkages); base modifications as described, and removal of bases (abasic nucleotides). Particular non-limiting examples of nucleic acid and nucleotide modifications for use with the described nucleic acids are described below (see also in Hu et al., Nature: Signal Transduct. and Targeted Ther. 5, Article 101, 2020, and International Patent Publication Nos. WO2024013334A1 and WO2023215805A1 the contents of which are incorporated by reference herein with respect to descriptions of modified nucleic acids and formulations thereof).

Nucleotide Modifications: Sugar Moiety

In particular embodiments of the described composition, a modified nucleotide can be one in which the ribose or deoxyribose sugar moiety is chemically modified. According to some embodiments, the modification in the ribose sugar moiety is in the 2'-position not usually used in the native 5' to 3'-internucleoside linkage.

Modifications to the sugar moiety of the described nucleic acids can include but are note limited to one of the following at the 2'-position: OH; F; O-, S-, or N-alkyl; O-, S-, or N-alkenyl; O—, S- or N-alkynyl; or O-alky l-O-alkyl, wherein the alkyl, alkenyl and alkynyl can be substituted or unsubstituted $C_1$ to $C_{10}$ alkyl or $C_2$ to $C_{10}$ alkenyl and alkynyl. Exemplary suitable modifications include $O[(CH_2)_nO]_mCH_3$, $O(CH_2)_nOCH_3$, $O(CH_2)_nNH_2$, $O(CH_2)_nCH_3$, $O(CH_2)_nONH_2$, and $O(CH_2)_nON[(CH_2)_nCH_3)]_2$, where n and m are independently from 1 to about 10. In other embodiments, dsRNAs can include one of the following at the 2' position: $C_1$ to $C_{10}$ alkyl, substituted alkyl, aralkyl, O-alkaryl or O-aralkyl, SH, $SCH_3$, OCN, Cl, Br, CN, $CF_3$, $OCF_3$, $SOCH_3$, $SO_2CH_3$, $ONO_2$, $NO_2$, $N_3$, $NH_2$, heterocycloalkyl, heterocycloalkaryl, aminoalkylamino, polyalkylamino, substituted silyl, an RNA cleaving group, a reporter group, an intercalator, a group for improving the pharmacokinetic properties of the described dsRNA, or a group for improving the pharmacodynamic properties of the described dsRNA.

In particular embodiments of the described nucleic acids, chemical modification of the ribose sugar includes a 2'-methoxyethoxy (2'-O—$CH_2CH_2OCH_3$, also known as 2'-O-(2-methoxyethyl) or 2'-MOE) (Martin et al., Helv. Chim. Acta, 1995, 78:486-504) i.e., an alkoxy-alkoxy group. Another exemplary modification is 2'-dimethylaminooxyethoxy, i.e., a $O(CH_2)_2ON(CH_3)_2$ group, also known as 2'-DMAOE, as described in examples herein below, and 2'-dimethylaminoethoxyethoxy (also known in the art as 2'-O-dimethylaminoethoxy ethyl or 2'-DMAEOE), i.e., 2'-O—$CH_2$—O—$CH_2$—$N(CH_3)_2$. Further exemplary modifications include: 5'-Me-2'-F nucleotides, 5'-Me-2'-OMe nucleotides, 5'-Me-2'-deoxynucleotides, (both R and S isomers in these three families); 2'-alkoxy alkyl; and 2'-NMA (N-methylacetamide).

In other particular embodiments of the described dsRNAs, chemical modifications of the ribose sugar include 2'-methoxy (2'-$OCH_3$), 2'-aminopropoxy (2'-$OCH_2CH_2CH_2NH_2$), 2'-O-hexadecyl, and 2'-fluoro (2'-F). Similar modifications can also be made at other positions, particularly the 3' position of the sugar on the 3' terminal nucleotide or in 2'-5' linked dsRNAs and the 5' position of 5' terminal nucleotide. In still other embodiments, dsRNAs can also have sugar mimetics such as cyclobutyl moieties in place of the pentofuranosyl sugar.

The sugar moiety of the described dsRNAs also be modified to include one or more bicyclic sugar moieties. A "bicyclic sugar" is a furanosyl ring modified by the bridging of two atoms. A "bicyclic nucleoside" ("BNA") is a nucleoside having a sugar moiety comprising a bridge connecting two carbon atoms of the sugar ring, thereby forming a bicyclic ring system, such as the 4'-carbon and the 2'-carbon of the sugar ring. In particular examples, the described dsRNAs can include one or more locked nucleic acids (LNA) in which the ribose is locked in the 3'-endo structural conformation. A locked nucleic acid is a nucleotide having a modified ribose moiety which comprises an extra bridge connecting the 2' and 4' carbons (i.e., comprising a bicyclic sugar moiety comprising a 4'-CH2-O-2' bridge). Particular examples of bicyclic nucleosides for use in the described dsRNAs include but are not limited to 4' to 2' bridged bicyclic nucleosides, such as 4'-($CH_2$)-0-2' (LNA); 4'-($CH_2$)—S-2'; 4'-($CH_2$)$_2$-0-2' (ENA); 4'-$CH(CH_3)$-0-2' and 4'-$CH(CH_2OCH_3)$-0-2'; 4'-$C(CH_3)$ $(CH_3)$-0-2'; 4'-$CH_2$—N $(OCH_3)$-2'; 4'-$CH_2$—O—$N(CH_3)$-2'; 4'-$CH_2$—N(R)-0-2', wherein R is H, C1-C12 alkyl, or a protecting group; 4'-$CH_2$—C(H)($CH_3$)-2'; and 4'-$CH_2$—C(=$CH_2$)-2'.

Other particular examples of chemical modifications at the 2' hydroxyl group of the ribose sugar include O-AMINE modifications, wherein AMINE=$NH_2$. Such modifications include but are not limited to alkylamino, dialkylamino, heterocyclyl, arylamino, diaryl amino, heteroaryl amino, or diheteroaryl amino, ethylene diamine or polyamino) and aminoalkoxy, O(CH2)nAMINE, (e.g., AMINE=NH2), alkylamino, dialkylamino, heterocyclyl, arylamino, diaryl amino, heteroaryl amino, or diheteroaryl amino, ethylene diamine or polyamino).

Other possible modifications of the sugar moiety include substitution of the natural sugar group with a different sugar moiety, e.g. threose to yield threose nucleic acid (TNA). Modifications to the sugar group can be such that it contains one or more carbons that possess the opposite stereochemical configuration than that of the corresponding carbon in ribose. Thus, a modified nucleotide may contain a sugar such as arabinose to yield arabinonucleic acids (ANA) with or without sugar modifications like, e.g. in case of 2'-deoxy-2'-fluoroarabinonucleic acid (FANA). In other embodiments, sugar moieties may be substituted with non-sugar moieties such as e.g., propylene glycol to yield glycol nucleic acids (GNA) or with methylenemorpholine rings to yield morpholino oligonucleotides or with cyclopentyl. In yet another embodiment, ribose can be presented by its acyclic derivative lacking the 2'-3' bond of the ring to yield unlocked nucleic acid (UNA).

In particular embodiments, the described double stranded nucleic acids include modified nucleotides with a modified sugar moiety having a 2' carbon in the sugar moiety modified with a methyl moiety and/or a fluoro moiety, resulting in a nucleic acid that includes one or multiple 2' 0 methyl (2'O-Me) modified nucleotides and/or 2'-deoxy-2'-fluoro (2'F) modified nucleotides.

In other non-limiting examples in which the internucleosidic linkage is 2' to 5' (rather than the standard 3' to 5'), similar modifications to the sugar moiety as described herein can be made at the 3' carbon in the sugar moiety. In a particular embodiment described herein, the sugar moiety of the described dsRNAs are modified to have H (instead of OH) at the 3' position such that the 2' position participates in the backbone formation.

Nucleotide Modifications: Nitrogenous Base

In particular embodiments, the described double stranded nucleic acid can include a nucleotide comprising a modified base. Modified bases include but are not limited to synthetic and natural nucleobases such as 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-halouracil and cytosine, 5-propynyl uracil and cytosine, 6-azo uracil, cytosine and thymine, 5-uracil (pseudouracil), 4-thiouracil, 8-halo, 8-amino, 8-thiol, 8-thioalkyl, 8-hydroxyl anal other 8-substituted adenines and guanines, 5-halo, particularly 5-bromo, 5-trifluoromethyl and other 5-substituted uracils and cytosines, 7-methylguanine, 7-methyladenine, 8-azaguanine, 8-azaadenine, 7-deazaguanine, 7-deazaadenine, 3-deazaguanine, and 3-deazaadenine.

In other particular embodiments, the nucleotide is modified in that it is "abasic" and does not comprise a nitrogenous base at a particular position.

Nucleotide Modifications: Internucleoside Linkage

A modified nucleotide of the described double stranded nucleic acids can also include modifications from the standard phosphodiester bond between two adjacent nucleotides (such modifications are also referred to as "internucleotide linkage" modifications or "backbone linkage" modifications). According to some embodiments, a nucleic acid molecule that comprises a modified internucleotide linkage refers to a molecule that includes at least one of: an internucleotide linkage other than a phosphodiester bond, an internucleotide linkage between positions other than 3' and 5' within the sugar moiety of neighboring nucleotides (such as an internucleotide linkage between position 2' in a nucleotide's sugar moiety and position 5' in the next nucleotide's sugar moiety), or a combination thereof.

In some embodiments, the modified internucleotide linkage is a phosphorous-containing internucleotide linkage, such as a phosphotriester, aminoalkylphosphotriester, an alkylphosphonate (e.g. methylphosphonate, 3'-alkylene phosphonate), a phosphinate, a phosphoramidate (e.g. 3'-amino phosphoramidate and aminoalkylphosphoramidate), a phosphorothioate (P=S), a chiral phosphorothioate, a phosphorodithioate, a thionophosphoramidate, a thionoalkylphosphonate, a thionoalkylphosphotriester, and a boranophosphate. In one embodiment, a modified internucleotide linkage is a 2' to 5' phosphodiester linkage. In other embodiments, the modified internucleotide linkage is a non-phosphorous-containing internucleotide linkage and thus can be referred to as a modified internucleoside linkage. Such non-phosphorous-containing linkages include, but are not limited to, morpholino linkages (formed in part from the sugar portion of a nucleoside); siloxane linkages (-0-Si(H) 2-0-); sulfide, sulfoxide and sulfone linkages; formacetyl and thioformacetyl linkages; alkene containing backbones; sulfamate backbones; methylenemethylimino (—CH2-N (CH3)-0-CH 2-) and methylenehydrazino linkages; sulfonate and sulfonamide linkages; amide linkages; and others having mixed N, O, S and CH 2 component parts.

According to another non-limiting example, the internucleotide linkage between two nucleotides in a nucleic acid may be substituted from a 3'-5' linkage to a 2'-5' bridged backbone linkage in which the 2' position of the sugar moiety in the modified nucleotide is linked via a phosphodiester bond to the 5' position of the sugar moiety of the next nucleotide (in this context, and as previously noted, "next" relates to the 5'>3' direction, as commonly referred in the art), wherein such a modification may be referred to as a 5'-2' bridge, a 2'-5' bridge or a nucleotide-2'-phosphate (or a ribo-nucleotide-2'-phosphate in case of a modified ribo-nucleotide). In a particular embodiment, at least one internucleotide linkage between positions 6 and 7 or 7 and 8 from the 5' terminus of the antisense strand of the described molecules is a 2'-5' bridge. In a further particular embodiment, the internucleotide linkage between positions 7 and 8 is such a 2'-5' bridge.

In particular embodiments, the described nucleic acids include an inverted RNA nucleotide, such as but not limited to at one or several of the strand ends. In particular examples the nucleic acid comprises at least an inverted nucleotide at the 3' end of the first and/or the second strand and/or at the 5' end of the second strand. An inverted nucleotide is a nucleotide that is linked to the 3' end of a nucleic acid through its 3' carbon, rather than its 5' carbon as would normally be the case or is linked to the 5' end of a nucleic acid through its 5' carbon, rather than its 3' carbon as would normally be the case.

In other embodiments, suitable RNA mimetics are contemplated for use in RNAi agents, in which both the sugar and the internucleoside linkage, i.e., the backbone, of the nucleotide units are replaced with alternate groups. The nucleobase units are maintained for hybridization with an appropriate nucleic acid target compound. One such oligomeric compound, is referred to as a peptide nucleic acid (PNA). In PNA compounds, the sugar backbone of an RNA is replaced with an amide containing backbone, in particular an aminoethylglycine backbone. The nucleobases are retained and are bound directly or indirectly to aza nitrogen atoms of the amide portion of the backbone.

End Modifications

The double stranded nucleic acid compounds described herein can be a dsRNA compound that is blunt-ended on both sides of one or both strands, can have nucleotide or non-nucleotide overhangs on one or both termini of the sense strand (e.g., a 5' cap and/or a 3' overhang), can have nucleotide or non-nucleotide overhangs at the 3' terminus of the antisense strand, or can have a combination of blunt and overhang termini within the requirements of the art. 5' and 3' modifications can be added to the described nucleic acids for a number of reasons, including to modulate activity, increase metabolic stability, or provide other functionality such as cellular targeting or labeling. Such modifications can include modification or replacement of an entire terminal phosphate or of one or more of the atoms of the phosphate group.

Terminal modifications useful for modulating activity and increasing stability include modification of the 5' end with phosphate or phosphate analogues. The described dsRNAs can be 5' phosphorylated or include a phosphoryl analogue at the 5' prime terminus. 5'-phosphate modifications include 5'-monophosphate ((HO)2(O)P—O-5'); 5'-diphosphate ((HO)2(O)P—O—P(HO)(O)-0-5'); 5'-triphosphate ((HO)2(O)P—O—(HO)(O)P—O—P(HO)(O)-0-5'); 5'-guanosine cap (7-methylated or non-methylated) (7m-G-O-5'-(HO)(O)P—O—(HO)(O)P—O—P(HO)(O)-0-5'); 5'-adenosine cap (Appp), and any modified or unmodified nucleotide cap structure (N—O-5'-(HO)(O)P—O—(HO)(O)P—O—P(HO)(O)—O-5'); 5'-monothiophosphate (phosphorothioate; (HO)2(S)P—O-5'); 5'-monodithiophosphate (phosphorodithioate; (HO)(HS)(S)P—O-5'), 5'-phosphorothiolate ((HO)2(O)P—S-5'); any additional combination of oxygen/sulfur replaced monophosphate, diphosphate and triphosphates (e.g., 5'-alpha-thiotriphosphate, 5'-gamma-thiotriphosphate, etc.), 5'-phosphoramidates ((HO)2(O)P—NH-5', (HO)(NH2)(O)P—O-5'), 5-alkylphosphonates (alkyl=methyl, ethyl, isopropyl, propyl, etc., e.g. RP(OH)(O)-0-5'-(wherein R is an alkyl), (OH)2(O)P-5'-CH2-), 5' vinylphosphonate, 5'-alkyletherphosphonates (alkylether=methoxymethyl (MeOCH2-), ethoxymethyl, etc., e.g. RP(OH)(O)—O-5'-(wherein R is an alkylether)). Additional 5' modifications at the antisense strand include 5'-POR and derivates thereof, described by Carrigan-Broda et al., 2023 RNA Therapeutics Conference, UMass. Other 5' phosphate modifications within the scope of the present disclosure are described in US 2023/0346819, the contents of which are incorporated by reference herein.

In particular embodiments, the described dsRNAs include an antisense strand which has a terminal 5' (E)-vinylphosphonate sugar modification at its 5' end. In particular embodiments, the terminal 5' (E)-vinylphosphonate nucleotide is linked to the second nucleotide in the sense strand by a 3'-5' phosphodiester linkage. In still more particular embodiments, the terminal 5' (E)-vinylphosphonate nucleotide is a uridine or adenine with a 2' OMe or 2'F ribose modification.

In particular embodiments, the terminal 5' (E)-vinylphosphonate nucleotide is linked to the second nucleotide in the sense strand by a 2'-5' phosphodiester linkage. In still more particular embodiments, the terminal 5' (E)-vinylphosphonate nucleotide is a uridine or adenine with a 3' OMe or 3'F or 3'H ribose modification.

In particular embodiments, the 5' and or 3' end of the described dsRNA can include a a non-nucleotide moiety, such as a C3 alkyl or —C3-OH moiety. In particular embodiments, such covalently linked moieties can be a combination of one or more of the moieties described herein.

The capping and/or terminal moiety or moieties can include saturated aliphatic groups, including linear-chain alkyl groups (e.g., methyl, ethyl, propyl, butyl, pentyl, hexyl, heptyl, octyl, nonyl, decyl, etc.), branched-chain alkyl groups (isopropyl, tert-butyl, isobutyl, etc.), cycloalkyl (alicyclic) groups (cyclopropyl, cyclopentyl, cyclohexyl, cycloheptyl, cyclooctyl), alkyl substituted cycloalkyl groups, and cycloalkyl substituted alkyl groups. In certain embodiments, a linear chain or branched chain alkyl has 10 or fewer carbon atoms in its backbone (e.g., C1-C10 for linear chain, C3-C10 for branched chain), such as 6 or fewer carbon atoms. Likewise, particular cycloalkyls can have from 3-8 carbon atoms in their ring structure, such as 5 or 6 carbons in the ring structure. The term C1-C10 includes alkyl groups containing 1 to 10 carbon atoms.

In particular embodiments, the dsRNAs described herein include a C3 moiety at the 5' end of the sense strand. "C3" and "C3 alkyl moiety" are used herein interchangeably and refer to an alkyl moiety, particularly a propanol or C3 alkyl moiety, wherein the C3 alkyl moiety can be covalently linked to a terminus of a dsRNA strand through a phosphate group (Pi) covalently linked to the 5' position of the sugar moiety of the 5' terminal nucleotide.

In a particular non-limiting embodiment, the C3 moiety is attached to the 5' end of the sense strand as shown below, with the C3 moiety liked to the terminal phosphate circled:

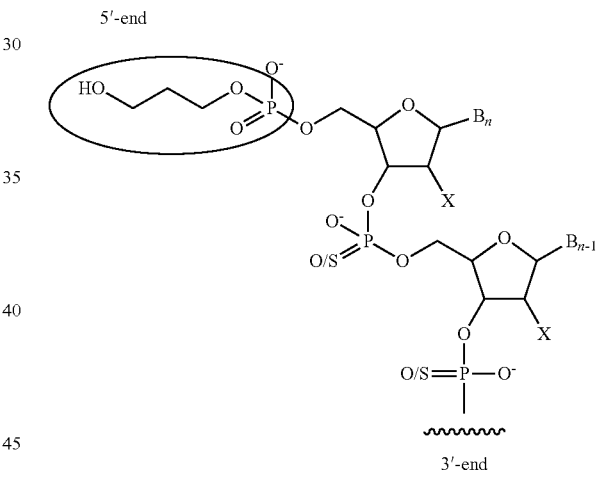

X = 2' RNA modification
B = Base A, G, U, C

In particular embodiments, the 3' terminus of a sense strand and/or an antisense strand include a C3-Pi or C4-Pi moiety covalently attached through a phosphate or a phosphorothioate group at the 3' end. Such moieties can in certain embodiments be used to mimic nucleotide overhangs of 1, 2, 3 or more nucleotides. According to some embodiments, the 3' terminus of the sense strand of the described dsRNA molecule, such as an siRNA compound, is covalently linked to a C3-Pi or C4-Pi moiety, wherein the C3-Pi or C4-Pi moiety is covalently linked to the 3' terminus via a phosphodiester bond, and wherein the moiety comprises a free terminal phosphate group.

In other embodiments, the covalently-linked moiety includes two C3-Pi or C4-Pi moieties which are covalently linked via the phosphate group (Pi) of the first C3 (or C4) moiety, and in which there is a terminal phosphate group (the free phosphate of the second C3-Pi group). Such a C3/C4-Pi-C3/C4-Pi moiety is, in particular embodiments, covalently linked through a phosphate group to the 3' terminus of the antisense and/or the sense strand of a dsRNA, or siRNA. In other particular embodiments, in non-nucleotide moieties comprising a C3 alkyl moiety, one or more of the Pi moieties may be replaced by a Ps moiety, which represents a phosphorothioate bond when covalently linking two moieties, or which represents a terminal phosphorothioate moiety when present in a 3' terminus of sense and/or antisense strand in an siRNA.

Targeting Ligands

In particular embodiments, the described double stranded nucleic acid molecules include at least one targeting ligand that is covalently attached to the double stranded nucleic acid. The targeting ligand can in certain embodiments be covalently attached to the 2' position of a nucleotide sugar within the sense and/or antisense strands or loop forming nucleotides of the dsRNA or ssRNA siRNA molecule. In other embodiments, the targeting ligand is covalently attached to at least one of the 5' end of the sense strand, the 3' end of the sense strand, or the 3' end of the antisense strand. In those embodiments wherein the targeting ligand is attached to only one of 3' ends of the sense or antisense sequence, the 3' end of the strand that does not comprise a targeting ligand is extended to have a 3' overhang of 1, 2, 3, or more nucleotides, such as a 3' di or trinucleotide overhang or a non-nucleotide overhang.

Particular non-limiting examples of targeting ligands that can be covalently attached to the described nucleic acid molecules include a vitamin or receptor binding small molecules of low molecular weight of any type, lipid or other lipophilic conjugate including but not limited to cholesterol, tocopherol or C16/C18 acyl fatty acid, or vitamins (see for illustrative examples, Do et al, ACS Omega 2017, 2, 6939-6957, the contents of which are incorporated by reference herein). Derivatives of the foregoing conjugates could also be used. In other embodiments, such conjugated moieties include specific cell receptor targeting moieties, e.g., peptide and polypeptide moieties including linear, cyclic, bicyclic or multicyclic peptides and polypeptides, antibodies of various types and forms including but not limited to complete antibodies, Fab's, minibodies, single-chain antibodies; targeting protein domains like e.g., centyrins, synthetic small molecules and aptamers. In a particular embodiment, antibodies of various types, peptides of various types, polypeptides or aptamers that bind to the TFR1 receptor can be covalently attached to the described molecules for delivery of the described nucleic acids to erythrocytes, muscle and CNS (via a blood brain barrier).

Other targeting ligands that can be covalently attached to the described molecules can be carbohydrate (i.e., glycan)-based ligands including but not limited to N-acetylgalactosamine (GalNAc), mannose, fucose, galactose, N-Acetylneuraminic acid (Neu5Ac), N-acetylglucosamine (GlcNAc), folic acid and their derivatives (see for illustrative examples, Uehara et al., Nucl. Acid Res. 2022 May 20; 50 (9): 4840-4859, the contents of which are incorporated by reference herein). Other particular examples of glycan ligands are those that bind to the mannose receptor on a variety of cell types (Cummings, Curr. Opin. Struct. Biol. 75:102394, 2022, the contents of which are incorporated by reference herein).

The targeting ligands described herein can be incorporated with the described dsRNAs by any method known to the art, such as during automatic nucleic acid synthesis as an amidite or linked to the column material or in other embodiments can be added using post-synthesis conjugation using methods known in the art.

In particular embodiments, the targeting ligand comprises at least one N-acetylgalactosamine (GalNAc) moiety, and more particularly two, three or four (see International Patent Publication No. WO 2012/177921 for non-limiting examples of GalNAc targeting ligands).

In particular embodiments of the described molecules, the targeting ligand is covalently attached to the described nucleic acid at the desired location via a phosphodiester or a phosphorothioate bond during an automatic oligonucleotide synthesis being a part of a phosphoroamidite. Such phosphoroamidites can be either directly attached to the nucleotide entity, or can be separated from the nucleotide by a linker from the 5' end, and/or the 3' end, and/or being covalently attached to a 2' position of the ribose sugar (e.g., in those embodiments in which the ligand is a part of a nucleoside-containing phosphoroamidite). Linkers for use with the described molecules include but are not limited to a chemically modified nucleotide linker (1, 2, 3, or more nucleotides), or a chemical linker, such as e.g., an alkyl linker. The linkers connecting the targeting moiety to the described nucleic acids can also vary as well as the core structures of phosphoroamidites. Particular non-limiting examples of chemical linkers through which a targeting moiety can be attached to a phosphoroamidite include but are not limited to polyethylenglycol (PEG), triethylenegly-col (TEG), C4 urea, C6 carbamate and the like (for non-limiting examples, see International Patent Publication Nos. WO 2018/013999 and WO 2012/177921, the contents of which are incorporated by reference herein with respect to targeting ligands and linkers).

In a particular embodiment, the targeting ligand is linked to the described nucleic acids via a TEG linker that is 2-(6-(bis(4-methoxyphenyl)(phenyl)methoxy)-5-(hydroxymethyl)hexyl)isoindoline-1,3-dione linker available for example from Hongene Biotech (Cat. No. ON-153).

In another embodiment, the double stranded nucleic acid has three or more GalNAc moieties covalently bound to the 3' end of the sense strand. GalNAc moieties in the described dsRNA molecules can in particular embodiments be added sequentially as monomers during oligonucleotide synthesis being introduced in the form of phosphoroamidites or immobilized on glass or polystyrene columns to allow for oligonucleotide initiation. In such embodiments, the individual GalNAc moieties are connected between them and/or to the oligonucleotide terminus via phosphodiester bonds that can be also modified to have e.g., phosphorothioate or other types of backbone modifications as described herein. In a particular embodiment, the double stranded nucleic acid has three or more GalNAc moieties individually connected to three or four core moieties by way of a triethylene-glycol linkers in which the first GalNAc structure is immobilized, the next two or three are sequentially added and then the nucleotides are added during the remainder of oligonucleotide synthesis. Other methodologies for adding such ligands to the described nucleic acids are also encompassed by the current disclosure.

In a particular embodiment, the ligand is a series of three GalNAc monomers with a triethyleneglycol (TEG) linker, and is connected to the 3' end of the sense strand. An illustration of one such ligand is shown below:

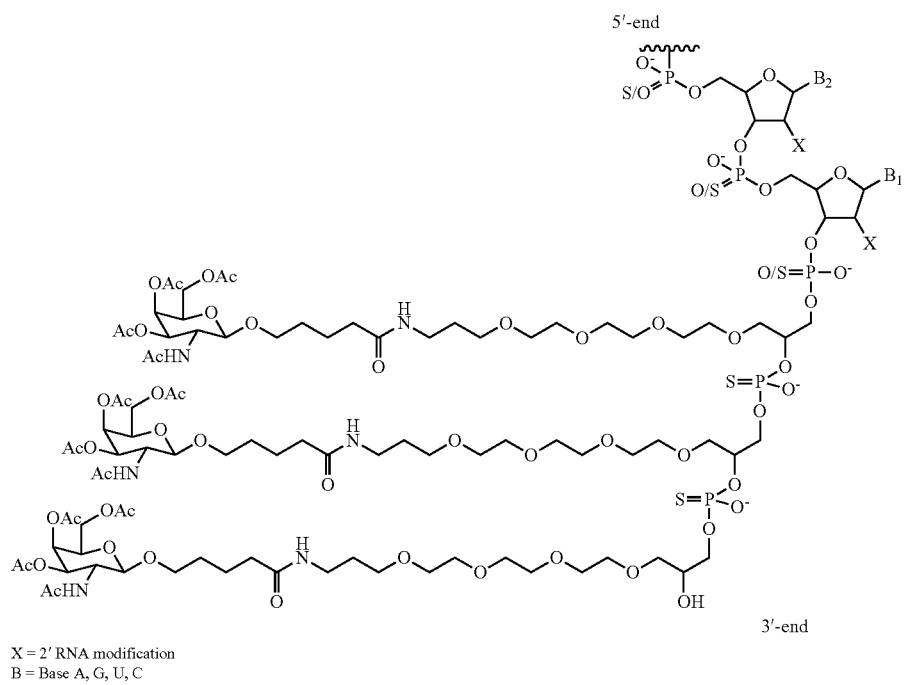

X = 2' RNA modification
B = Base A, G, U, C

Nucleic Acid Compositions

The synthetic double stranded nucleic acids described herein can be synthesized by any standard method known in the art for synthesis of ribonucleic (or deoxyribonucleic) oligonucleotides. These procedures may make use of common nucleic acid protecting and coupling groups, such as dimethoxytrityl at the 5'-end, and phosphoramidites at the 3'-end. The modified (e.g. 2'-O-methylated) nucleotides and unmodified nucleotides are incorporated as desired (see for example, Hughes, Cold Spring Harbor Perspect. Biol. 9, 2017; Sandahl et al., Nature Comm. 12, 2021; and Brazier, Methods Mol. Bio. Vol. 2633, 2023). The nucleic acid molecules disclosed herein can be synthesized separately and as relevant hybridized following synthesis and/or deprotection.

The double stranded nucleic acids (e.g., dsRNA and more particularly siRNA) and pharmaceutically acceptable salts thereof described herein can, in particular embodiments, be delivered to the target tissue, such as liver tissue, by direct administration of the "naked" molecules. The terms "naked nucleic acid" or "naked dsRNA" or "naked siRNA" refers to nucleic acid molecules that are free from any delivery vehicle that acts to assist, promote, or facilitate entry into the cell such as e.g., lipid or polymer nanoparticle formulations. For example, dsRNA (with or without covalently attached targeting ligand) in PBS is "naked dsRNA".

In other embodiments, the described dsRNA compounds, pharmaceutically acceptable salts thereof, and pharmaceutical compositions thereof, can include a pharmaceutically-acceptable delivery vehicle, including one or more excipients, carriers, buffers, or diluents. The pharmaceutical compositions described herein can additionally or alternatively be formulated as a lipid or polymer nanoparticle formulation and the like for administration to a subject, and to facilitate entry of the dsRNA into the target organ, tissue, and cell.

The pharmaceutically acceptable carriers, buffers, solvents, diluents, excipients, adjuvants and vehicles generally refer to inert, non-toxic solid or liquid fillers, diluents or encapsulating material not reacting with the active ingredients disclosed herein. The pharmaceutically acceptable carriers and pharmaceutically acceptable salts useful in this disclosure are conventional. Remington (The Science and Practice of Pharmacology, 23rd Edition (2020)), describes compositions and formulations suitable for pharmaceutical delivery of the compounds herein disclosed. In general, the nature of the carrier and/or salt will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle.

Additional illustrative examples of pharmaceutical nucleic acid formulations and methods of their delivery can be found in Roberts et al., Nature Rev. Drug Disc. 19:673-694, 2020; and Hammond et al., EMBO Mol. Med., 13 (4), 2021, the contents of both of which are incorporated herein by reference.

Treatment of Hepcidin-Related Diseases with Nucleic Acids that Inhibit TFR2 Expression The described nucleic acid compositions can be used in methods for treatment of diseases associated with increased circulating levels of hepcidin (a protein product of the HAMP gene, the expression of which is regulated by TFR2 expression), e.g., due to increased expression of the HAMP gene in hepatocytes and/or reduced glomerular filtration of hepcidin as occurring during kidney malfunction. The methods involve administration to a subject in need thereof an effective amount of a TFR2 mRNA-targeting double stranded nucleic acid described herein, thereby knocking down TFR2 expression in hepatocytes and treating the condition associated with increased circulating levels of hepcidin. In particular embodiments, the TFR2-targeting double stranded nucleic acid is administered subcutaneously.

TFR2 expression in erythrocytes is also involved in control of erythropoiesis, with inhibition of TFR2 expression acting to increase expression of erythropoietin receptors on the cell surface, and thereby stimulate erythropoiesis (Richard et al., Int. J. Mol. Sci. 21:9173, 2020). Therefore, in particular embodiments, in which the described nucleic acids are targeted to erythrocytes by way of a TFR1-targeting ligand such as but not limited to a TFR1-binding antibody, the described nucleic acids can be used in methods to stimulate erythropoiesis and thereby treat anemia.

As described, aberrant overexpression of HAMP is associated, inter alia, with iron-deficiency related anemia. In particular embodiments, the subject to be treated has an iron-deficient anemia, including but not limited to iron-refractory anemia (both hereditary and acquired) or anemia of a chronic disease and/or inflammation that occurs e.g., in patients with cancer (including myeloproliferative neoplasms such as myelofibrosis), chronic kidney disease, rheumatoid arthritis, chronic obstructive pulmonary disease and others. In other embodiments, the subject in need of the treatments described herein has iron-restricted erythropoiesis or another condition related to reduced iron levels. In still other embodiments, the subject has a condition for which an increase in iron levels (resultant from TFR2 knockdown and associated reduction of hepcidin levels) would provide a therapeutic benefit.

Pharmaceutical compositions of the described dsRNAs are detailed in the preceding section and can be used alone or in combination with one or more additional therapeutic agents. A combination therapy may include at least one of the described double stranded nucleic acids combined with at least one other therapeutic agent that can be used to treat a disease or condition related to iron deficiency with high hepcidin levels such as an anemia. Such agents include but are not limited to therapeutically active small molecules or polypeptides, a single chain antibody, a classical antibody or fragment thereof, or an additional synthetic nucleic acid molecule which targets the expression of an alternative TFR2 sequence or one or more additional genes in the same or relevant associated pathways controlling iron homeostasis. In particular embodiments, such additional synthetic nucleic acids can be covalently joined with TFR2 siRNA to form a bi- or multivalent specific molecule. In other embodiments, such synthetic nucleic acids can be administered independently or in a form of defined combination formulations.

It will be understood that targeting and inhibiting TFR2 expression in the described methods does not require that 100% of the TFR2 mRNA be knocked down in the targeted organ or tissue, such as the liver (more specifically, hepatocytes). Rather, the described methods require at least partial inhibition of TFR2 expression, such that the expression of TFR2, and by extension HAMP, is from 0% to less than 100% of the expression that would be present in the absence of the described dsRNA compound. In particular embodiments, less than 100%, less than 90%, less than 80%, less than 70%, less than 60%, less than 50%, less than 40%, less than 30%, less than 20%, or even less than 10% of TFR2 expression is necessary to achieve the desired therapeutic effect.

The compositions and pharmaceutical compositions described herein can be administered to a subject in need of the described treatments by any route known to one of skill in the art for providing nucleic acids or nucleic acid-associated materials to a subject, including by way of a delivery device employed for or adapted for delivery of nucleic acids to a subject. Administration can be local or systemic. Local administration of the described compositions includes direct administration to a target organ or tissue. Systemic administration includes any route of administration designed to distribute an active compound or composition widely throughout the body via the circulatory system. Thus, systemic administration includes, but is not limited to intra-arterial and intravenous administration. Systemic administration also includes, but is not limited to, topical administration, subcutaneous administration, intramuscular administration, or administration by inhalation, when such administration is directed at absorption and distribution throughout the body by the circulatory system. In particular embodiments, the described compositions are administered by subcutaneous injection.

The dsRNAs for use in the described methods of treatment are provided in an effective amount which can also be understood to be a "therapeutically effective amount." Such amounts include a quantity of the described compound sufficient to achieve a desired therapeutic effect in a subject being treated. For example, an amount of TFR2 targeting dsRNA necessary to decrease HAMP expression to sufficiently increase iron availability in the subject for hematopoiesis. The effective amount of the compound will be dependent on the compound applied, the subject being treated, and particularly factors such as subject weight and metabolism, the severity and type of the affliction.

The methods of treatment described herein are designed to treat or even prevent pathological conditions such as iron deficiency related anemias in a subject. Preventing a disease can be complete or even partial prevention of the disease, such as the anemia. Partial prevention of a disease is when a given treatment leads to its development in a milder form and/or development of the disease or condition only after a longer period of time. Treatment refers to a therapeutic intervention that ameliorates or reduces a sign or symptom of a disease or pathological condition after it has begun to develop. As used herein, the term "subject" includes human and non-human mammals.

The following examples are provided to illustrate certain particular features and/or embodiments. These examples should not be construed to limit the disclosure to the particular features or embodiments described. Nor should these examples be construed to limit the disclosure to particular materials and methods for use in synthesis of the nucleic acids described herein.

EXAMPLES

The following examples describe the discovery of siRNAs for knocking down the expression of human TFR2 mRNA with overall superior properties of robust on-target knockdown activity in vitro and in vivo, and with minimal to no seed-mediated off-target activity in an in vitro model. Examples 1-6 present a screen for TFR2 mRNA-targeting siRNAs and demonstrate that siRNAs having sense strands with a 5' nucleotide corresponding to position 2657 of the TFR2 mRNA, in which the 5' nucleotide of the sense strand sequence is at position 2657 according to NCBI accession number NM_001206855.3 (SEQ ID NO: 305) (TFR2-2657 siRNAs), are among those with overall superior properties.

Example 1: Screening of the Initial Set of TFR2 siRNAs in HepG2 Cells

To identify potent siRNAs for inhibiting TFR2 mRNA expression, a series of fully chemically modified siRNAs (Table 2) was designed and synthesized on an automatic oligonucleotide synthesizer as follows and as further detailed in Example 3. Single strands (i.e., sense and antisense strands) were synthesized according to conventional solid-phase oligonucleotide synthesis methodology using standard phosphoramidite-based oligomerization chemistry whereby the oligonucleotides were assembled on solid support, employing a Mermade 96E synthesizer (LGC Bioautomation) in a 96 well format controlled by the Poseidon software package.

For the screening purposes, all siRNAs have been synthesized with the same pattern of chemical modifications. The siRNA positions provided in Table 2 ("Position" column) correspond to the position of the 5' nucleotide of the sense strands according to the human TFR2 mRNA (cDNA) sequence available at NCBI accession number NM_001206855.3 (SEQ ID NO: 305).

As noted above in Table 1, the described sequences include the following modifications: Nf: 2'-Fluoro (2'F) RNA nucleotides; n: 2'-O-Methyl (2'OMe) RNA nucleotides; (C3): propanol or C3 alkyl moiety connected to the 5' end of the strand via a phosphodiester linkage; s: Phosphorothioate (Ps) backbone modification.

TABLE 2

TFR2-targeting siRNAs for initial activity screen

| SEQ ID NOs | Starting nt | siRNA ID | sense strand | antisense strand |
|---|---|---|---|---|
| 1, 2 | 39 | XD-52020 | (C3)csasAfgcaUfGfGfagCfggcuUfua | usAfsaagccgcuccaUfgcuugsusg |
| 3, 4 | 65 | XD-52021 | (C3)ususCfcagAfGfAfgcGfcaacAfaa | usUfsuguugcgcucuCfuggaasusa |
| 5, 6 | 66 | XD-52022 | (C3)uscsCfagaGfAfGfcgCfaacaAfca | usGfsuuguugcgcucUfcuggasasu |
| 7, 8 | 67 | XD-52023 | (C3)cscsAfgagAfGfCfgcAfacaaCfua | usAfsguuguugcgcuCfucuggsasa |
| 9, 10 | 68 | XD-52024 | (C3)csasGfagaGfCfGfcaAfcaacUfga | usCfsaguuguugcgcUfcucugsgsa |
| 11, 12 | 69 | XD-52025 | (C3)asgsAfgagCfGfCfaaCfaacuGfua | usAfscaguuguugcGfcucucusgsg |
| 13, 14 | 88 | XD-52026 | (C3)cscsCfaagAfUfCfcuCfucagAfca | usGfsucugagaggauCfuugggsgsa |
| 15, 16 | 92 | XD-52027 | (C3)asgsAfuccUfCfUfcaGfaccgUfca | usGfsacggucugagaGfgaucususg |
| 17, 18 | 97 | XD-52030 | (C3)csusCfucaGfAfCfcgUfcuacCfaa | usUfsgguagacggucUfgagagsgsa |
| 19, 20 | 98 | XD-52031 | (C3)uscsUfcagAfCfCfguCfuaccAfga | usCfsugguagacgguCfugagasgsg |
| 21, 22 | 99 | XD-52032 | (C3)csusCfagaCfCfGfucUfaccaGfca | usGfscugguagacggUfcugagsasg |
| 23, 24 | 241 | XD-52035 | (C3)csasGfgcaGfCfCfaaAfccucAfua | usAfsugagguuggcUfgccugsgsg |
| 25, 26 | 387 | XD-52041 | (C3)usgsUfuggUfGfGfucAfgugaGfga | usCfscucacugaccaCfcaacascsa |
| 27, 28 | 406 | XD-52042 | (C3)usgsUfcaaCfUfAfugAfgccuGfaa | usUfscaggcucauagUfugacasusc |
| 29, 30 | 409 | XD-52043 | (C3)csasAfcuaUfGfAfgcCfugacCfua | usAfsggucaggcucaUfaguugsasc |
| 31, 32 | 412 | XD-52044 | (C3)csusAfugaGfCfCfugAfccugGfaa | usUfsccaggucaggcUfcauagsusu |
| 33, 34 | 721 | XD-52051 | (C3)gsgsAfggaCfCfCfugAfcgucUfaa | usUfsagacgucagggUfccuccsasg |
| 35, 36 | 871 | XD-52054 | (C3)gsgsUfgauCfAfGfcuUfcgccCfaa | usUfsgggcgaagcugAfucaccscsc |
| 37, 38 | 885 | XD-52057 | (C3)cscsCfagaAfGfGfugAfccaaUfga | usCfsauuggucaccuUfcugggscsg |
| 39, 40 | 888 | XD-52058 | (C3)asgsAfaggUfGfAfccAfaugcUfca | usGfsagcauuggucaCfcuucusgsg |
| 41, 42 | 892 | XD-52059 | (C3)gsgsUfgacCfAfAfugCfucagGfaa | usUfsccugagcauugGfucaccsusu |
| 43, 44 | 895 | XD-52060 | (C3)gsasCfcaaUfGfCfucAfggacUfua | usAfsaguccugagcaUfuggucsasc |
| 45, 46 | 997 | XD-52063 | (C3)asgsUfguaUfGfGfacAfugugCfaa | usUfsgcacauguccaUfacacusgsc |
| 47, 48 | 1051 | XD-52065 | (C3)ususCfcuuCfAfAfucAfaaccCfaa | usUfsggguuugauugAfaggaasgsg |
| 49, 50 | 1051 | XD-52066 | (C3)gsusCfcuuCfAfAfucAfaaccCfaa | usUfsggguuugauugAfaggacsgsg |
| 51, 52 | 1053 | XD-52067 | (C3)cscsUfucaAfUfCfaaAfcccaGfua | usAfscugggguugauUfgaaggsasa |
| 53, 54 | 1054 | XD-52068 | (C3)csusUfcaaUfCfAfaaCfccagUfua | usAfsacugggguugaUfugaagsgsa |
| 55, 56 | 1055 | XD-52070 | (C3)ususCfaauCfAfAfacCfcaguUfca | usGfsaacugggguugAfuugaasgsg |
| 57, 58 | 1303 | XD-52079 | (C3)csusCfagaGfCfCfagAfucacUfaa | usUfsagugaucuggcUfcugagscsg |
| 59, 60 | 1445 | XD-52084 | (C3)csgsCfagaAfGfUfcuCfucucUfca | usGfsaagaggagacuUfcugcgsgsg |
| 61, 62 | 1448 | XD-52085 | (C3)asgsAfaguCfUfCfucUfcuucaUfca | usGfsaugaagaggagAfcuucusgsc |

TABLE 2-continued

TFR2-targeting siRNAs for initial activity screen

| SEQ ID NOs | Starting nt | siRNA ID | sense strand | antisense strand |
|---|---|---|---|---|
| 63, 64 | 1531 | XD-52089 | (C3)gscsUfgcaCfCfUfcaAfagccGfua | usAfscggcuuugaggUfgcagcsasc |
| 65, 66 | 1534 | XD-52090 | (C3)gscsAfccuCfAfAfagCfcguaGfua | usAfscuacggcuuugAfggugcsasg |
| 67, 68 | 1536 | XD-52091 | (C3)ascsCfucaAfAfGfccGfuaguGfua | usAfscacuacggcuuUfgaggusgsc |
| 69, 70 | 1537 | XD-52092 | (C3)cscsUfcaaAfGfCfcgUfagugUfaa | usUfsacacuacggcuUfugaggsusg |
| 71, 72 | 1539 | XD-52093 | (C3)uscsAfaagCfCfGfuaGfuaCfga | usCfsguacacuacggCfuuugasgsg |
| 73, 74 | 1542 | XD-52094 | (C3)asasGfccgUfAfGfugUfacguGfaa | usUfscacguacacuaCfggcuususg |
| 75, 76 | 1546 | XD-52095 | (C3)csgsUfaguGfUfAfcgUfgagcCfua | usAfsgggcucacguacAfcuacgsgsc |
| 77, 78 | 1549 | XD-52096 | (C3)asgsUfguaCfGfUfgaGfccugGfaa | usUfsccaggcucacgUfacacusasc |
| 79, 80 | 1581 | XD-52099 | (C3)gsgsGfaugAfCfAfagUfuucaUfga | usCfsaugaaacuuguCfaucccscsc |
| 81, 82 | 1588 | XD-52100 | (C3)csasAfguuUfCfAfugCfcaagAfca | usGfsucuuggcaugaAfacuugsusc |
| 83, 84 | 1616 | XD-52105 | (C3)csusGfacaAfGfUfcuCfauugAfga | usCfsucaaugagacuUfgucagsasa |
| 85, 86 | 1617 | XD-52106 | (C3)usgsAfcaaGfUfCfucAfuugaGfaa | usUfscucaaugagacCfugucasgsa |
| 87, 88 | 1619 | XD-52107 | (C3)ascsAfaguCfUfCfauUfgagaGfua | usAfscucucaaugagAfcuugusscsa |
| 89, 90 | 1626 | XD-52108 | (C3)uscsAfuugAfGfAfguGfuccuGfaa | usUfscaggacacucuCfaaugasgsa |
| 91, 92 | 1627 | XD-52109 | (C3)csasUfugaGfAfGfugUfccugAfaa | usUfsucaggacacucUfcaaugsasg |
| 93, 94 | 1670 | XD-52115 | (C3)gsgsGfcagAfCfUfcuCfuaugAfaa | usUfsucauagagagcCfugcccsasc |
| 95, 96 | 1671 | XD-52116 | (C3)gsgsCfagaCfUfCfucUfaugaAfca | usGfsuucauagagagUfcugccscsa |
| 97, 98 | 1675 | XD-52120 | (C3)gsasCfucuCfUfAfugaAfacagGfua | usAfsccuguucauagAfgagucsusg |
| 99, 100 | 1686 | XD-52125 | (C3)asasCfaggUfGfGfugUfucacCfaa | usUfsggugaacaccaCfcuguuscsa |
| 101, 102 | 1836 | XD-52130 | (C3)ascsAfcaaAfGfGfagGfacacUfua | usAfsaguguccuccuUfugugusgsc |
| 103, 104 | 1837 | XD-52131 | (C3)csasCfaaaGfGfAfggAfcacuUfaa | usUfsaaguguccuccUfuugugsusg |
| 105, 106 | 1840 | XD-52134 | (C3)asasAfggaGfGfAfcaCfuuauGfaa | usUfscauaaguguccUfccuuusgsu |
| 107, 108 | 1840 | XD-52135 | (C3)gsasAfggaGfGfAfcaCfuuauGfaa | usUfscauaaguguccUfccuucsgsu |
| 109, 110 | 1999 | XD-52137 | (C3)gscsAfcauCfGfGfgaAfccucAfaa | usUfsugagguucccGfaugugcscsu |
| 111, 112 | 2004 | XD-52139 | (C3)uscsGfggaAfCfCfucAfacgaGfua | usAfscucguugagguUfcccgasusg |
| 113, 114 | 2110 | XD-52145 | (C3)gscsAfggaGfAfUfcuAfcagcUfca | usGfsagcuguagaucUfccugcscsg |
| 115, 116 | 2134 | XD-52155 | (C3)gsasGfagaCfGfAfgcGfacugAfca | usGfsucagucgcucgUfcucucsusc |
| 117, 118 | 2135 | XD-52156 | (C3)asgsAfgacGfAfGfcgAfcugaCfaa | usUfsgucagucgcucGfucucuscsu |
| 119, 120 | 2136 | XD-52157 | (C3)gsasGfacgAfGfCfgaCfugacAfca | usGfsugucagucgcuCfgucucsusc |
| 121, 122 | 2148 | XD-52158 | (C3)usgsAfcacGfCfAfugUfcaaCfga | usCfsguuguacaugcGfugucasgsu |
| 123, 124 | 2154 | XD-52159 | (C3)gscsAfuguAfCfAfacGfugcgCfaa | usUfsgcgcacguuguAfcaugcsgsu |
| 125, 126 | 2157 | XD-52160 | (C3)usgsUfacaAfCfGfugCfgcauAfaa | usUfsuaugcgcacguUfguacasusg |
| 127, 128 | 2158 | XD-52161 | (C3)gsusAfcaaCfGfUfgcGfcauaAfua | usAfsuuaugcgcacgUffuguacsasu |
| 129, 130 | 2168 | XD-52162 | (C3)csgsCfauaAfUfGfcgGfguggAfga | usCfsuccacccgcauUfaugcsgscsa |
| 131, 132 | 2169 | XD-52163 | (C3)gscsAfuaaUfGfCfggGfuggaGfua | usAfscuccacccgcaUfuaugcsgsc |
| 133, 134 | 2172 | XD-52164 | (C3)usasAfugcGfGfGfugGfaguuCfua | usAfsgaacuccacccGfcauuasusg |
| 135, 136 | 2175 | XD-52166 | (C3)usgsCfgggUfGfGfagUfcuaCfua | usAfsguagaacuccaCffccgcasusu |
| 137, 138 | 2176 | XD-52167 | (C3)gscsGfgguGfGfAfguUfcuacUfua | usAfsaguagaacuccAfcccgcsasu |

TABLE 2-continued

TFR2-targeting siRNAs for initial activity screen

| SEQ ID NOs | Starting nt | siRNA ID | sense strand | antisense strand |
|---|---|---|---|---|
| 139, 140 | 2177 | XD-52168 | (C3)csgsGfgugGfAfGfuuCfuacuUfca | usGfsaaguagaacucCfacccgscsa |
| 141, 142 | 2181 | XD-52169 | (C3)usgsGfaguUfCfUfacUfccuUfua | usAfsaaggaaguagaAfcuccascsc |
| 143, 144 | 2188 | XD-52170 | (C3)csusAfcuuCfCfUfuuCfccagUfaa | usUfsacugggaaaggAfaguagsasa |
| 145, 146 | 2192 | XD-52173 | (C3)ususCfcuuUfCfCfcaGfuacgUfga | usCfsacguacugggaAfaggaasgsu |
| 147, 148 | 2192 | XD-52174 | (C3)gsusCfcuuUfCfCfcaGfuacgUfga | usCfsacguacugggaAfaggacsgsu |
| 149, 150 | 2193 | XD-52175 | (C3)uscsCfuuuCfCfCfagUfacguGfua | usAfscacguacugggAfaaggasasg |
| 151, 152 | 2401 | XD-52179 | (C3)asgsCfcaaUfGfCfgcUfuagcGfga | usCfscgcuaagcgcaUfuggcusgsc |
| 153, 154 | 2424 | XD-52180 | (C3)uscsUfggaAfCfAfuuGfauaaCfaa | usUfsguuaucaauguUfccagascsa |
| 155, 156 | 2425 | XD-52181 | (C3)csusGfgaaCfAfUfugAfuaacAfaa | usUfsuguuaucaaugUfuccagsasc |
| 157, 158 | 2427 | XD-52184 | (C3)gsgsAfacaUfUfGfauAfacaaCfua | usAfsguuguuaucaaUfguccsasg |
| 159, 160 | 2429 | XD-52185 | (C3)asasCfauuGfAfUfaaCfaacuUfca | usGfsaaguuguuaucAfauguuscsc |
| 161, 162 | 2429 | XD-52186 | (C3)gsasCfauuGfAfUfaaCfaacuUfca | usGfsaaguuguuaucAfaugucscsc |
| 163, 164 | 2430 | XD-52187 | (C3)ascsAfuugAfUfAfacAfacuuCfua | usAfsgaaguuguuauCfaaugususc |
| 165, 166 | 2432 | XD-52188 | (C3)asusUfgauAfAfCfaaCfuucuGfaa | usUfscagaaguuguuAfucaausgsu |
| 167, 168 | 2432 | XD-52189 | (C3)gsusUfgauAfAfCfaaCfuucuGfaa | usUfscagaaguuguuAfucaacsgsu |
| 169, 170 | 2433 | XD-52190 | (C3)ususGfauaAfCfAfacUfucugAfga | usCfsucagaaguuguUfaucaasusg |
| 171, 172 | 2433 | XD-52191 | (C3)gsusGfauaAfCfAfacUfucugAfga | usCfsucagaaguuguUfaucacsusg |
| 173, 174 | 2543 | XD-52194 | (C3)ascsCfucuCfAfUfugCfugauCfaa | usUfsgaucagcaaugAfgaggusgsg |
| 175, 176 | 2605 | XD-52195 | (C3)asgsCfacaGfAfUfauCfcacaCfaa | usUfsgugugguauaucUfgugcusgsg |
| 177, 178 | 2657 | XD-52197 | (C3)csgsGfucaUfAfCfugUfcgguUfaa | usUfsaaccgacaguaUfgaccgsusc |
| 179, 180 | 2663 | XD-52198 | (C3)usasCfuguCfGfGfuuAfaucaGfaa | usUfscugauuaaccgAfcaguasusg |
| 181, 182 | 2663 | XD-52199 | (C3)gsasCfuguCfGfGfuuAfaucaGfaa | usUfscugauuaaccgAfcagucsusg |
| 183, 184 | 2720 | XD-52200 | (C3)gsgsGfuccUfCfCfauAfccuaGfaa | usUfscuagguauggaGfgacccscsa |
| 185, 186 | 2792 | XD-52202 | (C3)asgsAfgauCfGfCfugGfcaccAfua | usAfsuggugccagcgAfucucuscsc |
| 187, 188 | 2793 | XD-52203 | (C3)gsasGfaucGfCfUfggCfaccaUfaa | usUfsauggugccagcGfaucucsusc |
| 189, 190 | 2800 | XD-52204 | (C3)csusGfgcaCfCfAfuaGfccuuAfua | usAfsuaaggcuauggUfgccagscsg |
| 191, 192 | 2806 | XD-52205 | (C3)cscsAfuagCfCfUfuaUfggccAfaa | usUfsuggccauaaggCfuauggsusg |

The activity of the siRNAs listed in Table 2 was tested as follows. HepG2 cells were obtained from ATCC (ATCC in partnership with LGC Standards, Wesel, Germany, cat. #ATCC-HB-8065) and cultured in MEM (#21090-022, Thermo Invitrogen, Germany), supplemented to contain 10% fetal calf serum (1248D, Biochrom GmbH, Berlin, Germany), 2 mM L-Glu (K0283, Biochrom GmbH, Berlin, Germany), 1× non-essential amino acids (K0293, Biochrom GmbH, Berlin, Germany), 1 mM Na-Pyruvate and 100 U/ml Penicillin/100 µg/ml Streptomycin (A2213, Biochrom GmbH, Berlin, Germany) at 37° C. in an atmosphere with 5% CO2 in a humidified incubator.

For transfection of HepG2 cells with siRNAs, cells were seeded at a density of 20,000 cells/well into 96-well tissue culture plates (GBO, Germany). Transfection of siRNA was carried out with Lipofectamine RNAiMax (Invitrogen/Life Technologies) according to manufacturer's instructions for reverse transfection. The dual dose screen was performed with TFR2 siRNAs in quadruplicates at 10 nM and 0.5 nM concentrations. siRNAs targeting AHSA1, Firefly-Luciferase and Factor VII and a mock transfection served as unspecific controls. After 24 h of incubation with siRNAs, culture medium was removed and cells were lysed with the lysis buffer included in the MagnaPure LC RNA isolation system (Roche, Cat #05467535001). RNA extraction was performed on the MagnaPure 96 instrument, following the manufacturer's instructions. cDNA was generated using the high-capacity reverse transcription kit (ThermoFisher, Cat #4368813). cDNA corresponding to approximately 40 ng of RNA was used for the qPCR reaction. qPCR was performed using the TaqMan fast advanced MasterMix (ThermoFisher, Cat #4444557), together with primer pairs for TFR2 (labeled with FAM dye; ThermoFisher, #Hs00162690_m1-FAM) and GAPDH (labeled with VIC dye; ThermoFisher, #4326317) in one reaction. The AHSA1-siRNA served at the same time as an unspecific control for TFR2 mRNA expression and as a positive control to analyze transfection efficiency with regards to AHSA1 mRNA level by qPCR analysis with an AHSA1 primer set for each transfection plate (ThermoFisher, #Hs00201602_m1-FAM). Transfection efficiency for each 96-well plate was calculated by analysis of AHSA1-knock-down with AHSA1-siRNA (normalized to GapDH) compared to an unspecific control.

For data evaluation, in each well of the experiments, TFR2 mRNA levels were normalized to the respective GAPDH mRNA level (calculating $\Delta C_t$) and then the activity of a given TFR2 siRNA was expressed as percent TFR2 mRNA concentration (normalized to GAPDH mRNA) in treated cells, relative to the TFR2 mRNA concentration (normalized to GAPDH mRNA) averaged across control wells, using the formula $2 \exp(-\Delta\Delta C_t)$.

Table 3 shows the results of this "dual-dose" experiment as % residual TFR2 mRNA expression in siRNA-treated cells compared to mock-transfected cells (100%). Mean values (%) and standard deviation (SD) per each quadruplicate are shown.

TABLE 3

Results of the dual dose screening of TFR2-targeting siRNAs in HepG2 cells

| | | TFR2 mRNA KD (% residual) | | | |
|---|---|---|---|---|---|
| | | 10 nM | | 0.5 nM | |
| siRNA ID | Starting nt | Mean (%) | SD (%) | Mean (%) | SD (%) |
| XD-52020 | 39 | 24.17 | 2.05 | 43.02 | 6.58 |
| XD-52021 | 65 | 44.22 | 6.33 | 75.64 | 6.19 |
| XD-52022 | 66 | 22.50 | 2.34 | 58.69 | 9.81 |
| XD-52023 | 67 | 34.91 | 2.02 | 51.62 | 4.22 |
| XD-52024 | 68 | 19.96 | 2.38 | 35.07 | 4.09 |
| XD-52025 | 69 | 23.49 | 3.91 | 41.48 | 4.91 |
| XD-52026 | 88 | 17.12 | 1.10 | 40.66 | 0.93 |
| XD-52027 | 92 | 18.13 | 1.59 | 48.38 | 3.28 |
| XD-52030 | 97 | 28.95 | 1.42 | 53.78 | 1.53 |
| XD-52031 | 98 | 28.87 | 1.58 | 81.33 | 9.51 |
| XD-52032 | 99 | 36.20 | 1.06 | 40.59 | 6.69 |
| XD-52035 | 241 | 7.85 | 0.77 | 18.30 | 4.84 |
| XD-52038 | 245 | 19.45 | 2.73 | 30.77 | 5.16 |
| XD-52041 | 387 | 17.05 | 2.22 | 37.84 | 6.52 |
| XD-52042 | 406 | 11.66 | 1.34 | 28.40 | 4.62 |
| XD-52043 | 409 | 68.41 | 8.51 | 69.48 | 11.82 |
| XD-52044 | 412 | 12.17 | 1.32 | 24.94 | 1.87 |
| XD-52051 | 721 | 23.95 | 1.16 | 26.88 | 3.51 |
| XD-52054 | 871 | 53.07 | 4.34 | 69.78 | 8.54 |
| XD-52057 | 885 | 30.49 | 2.92 | 60.72 | 7.24 |
| XD-52058 | 888 | 31.55 | 4.87 | 33.67 | 3.28 |
| XD-52059 | 892 | 34.54 | 2.71 | 65.99 | 10.28 |
| XD-52060 | 895 | 26.97 | 4.38 | 41.67 | 6.43 |
| XD-52063 | 997 | 25.48 | 2.04 | 34.65 | 2.81 |
| XD-52065 | 1051 | 17.38 | 2.84 | 25.34 | 3.71 |
| XD-52066 | 1051 | 17.69 | 1.09 | 32.38 | 5.71 |
| XD-52067 | 1053 | 27.23 | 10.49 | 65.81 | 9.27 |
| XD-52068 | 1054 | 17.22 | 1.36 | 34.56 | 3.89 |
| XD-52070 | 1055 | 47.40 | 4.82 | 67.03 | 6.53 |
| XD-52079 | 1303 | 42.03 | 2.79 | 46.05 | 5.59 |
| XD-52084 | 1445 | 13.03 | 1.30 | 22.50 | 4.37 |
| XD-52085 | 1448 | 14.37 | 1.86 | 20.91 | 4.98 |
| XD-52089 | 1531 | 15.44 | 2.58 | 38.20 | 6.39 |
| XD-52090 | 1534 | 33.36 | 3.80 | 52.74 | 6.07 |
| XD-52091 | 1536 | 45.36 | 8.26 | 64.89 | 3.38 |
| XD-52092 | 1537 | 17.56 | 2.48 | 44.25 | 3.51 |
| XD-52093 | 1539 | 16.73 | 1.91 | 32.80 | 4.64 |
| XD-52094 | 1542 | 35.34 | 3.11 | 42.60 | 6.95 |
| XD-52095 | 1546 | 69.47 | 7.59 | 71.21 | 2.91 |
| XD-52096 | 1549 | 17.75 | 2.17 | 45.23 | 8.19 |
| XD-52099 | 1581 | 20.76 | 0.99 | 39.54 | 2.49 |
| XD-52100 | 1588 | 18.25 | 1.96 | 29.34 | 4.38 |
| XD-52105 | 1616 | 24.45 | 3.33 | 39.98 | 7.61 |
| XD-52106 | 1617 | 20.06 | 1.17 | 21.73 | 1.56 |
| XD-52107 | 1619 | 97.84 | 8.32 | 81.74 | 19.98 |
| XD-52108 | 1626 | 19.77 | 1.86 | 40.07 | 4.39 |
| XD-52109 | 1627 | 13.20 | 2.35 | 20.43 | 2.59 |
| XD-52115 | 1670 | 21.53 | 1.92 | 28.20 | 4.30 |
| XD-52116 | 1671 | 26.31 | 2.83 | 28.17 | 4.63 |
| XD-52120 | 1675 | 27.73 | 2.82 | 49.23 | 4.99 |
| XD-52125 | 1686 | 28.70 | 3.09 | 62.38 | 5.29 |
| XD-52130 | 1836 | 19.18 | 1.07 | 24.04 | 2.79 |
| XD-52131 | 1837 | 34.35 | 3.90 | 36.64 | 6.30 |
| XD-52134 | 1840 | 17.80 | 3.03 | 24.14 | 3.41 |

TABLE 3-continued

Results of the dual dose screening of TFR2-targeting siRNAs in HepG2 cells

| | | TFR2 mRNA KD (% residual) | | | |
|---|---|---|---|---|---|
| | | 10 nM | | 0.5 nM | |
| siRNA ID | Starting nt | Mean (%) | SD (%) | Mean (%) | SD (%) |
| XD-52135 | 1840 | 18.16 | 1.51 | 28.60 | 3.17 |
| XD-52137 | 1999 | 79.06 | 4.51 | 85.84 | 4.64 |
| XD-52139 | 2004 | 16.40 | 1.48 | 27.50 | 4.14 |
| XD-52145 | 2110 | 38.81 | 5.50 | 32.77 | 2.72 |
| XD-52155 | 2134 | 33.61 | 2.46 | 36.32 | 2.75 |
| XD-52156 | 2135 | 40.04 | 3.03 | 62.36 | 4.80 |
| XD-52157 | 2136 | 24.60 | 0.76 | 67.48 | 12.66 |
| XD-52158 | 2148 | 43.40 | 6.50 | 84.94 | 5.04 |
| XD-52159 | 2154 | 40.42 | 1.50 | 65.60 | 11.34 |
| XD-52160 | 2157 | 12.60 | 1.00 | 22.01 | 2.91 |
| XD-52161 | 2158 | 36.97 | 1.92 | 55.44 | 5.55 |
| XD-52162 | 2168 | 60.70 | 3.44 | 78.63 | 9.94 |
| XD-52163 | 2169 | 45.58 | 1.20 | 53.79 | 4.25 |
| XD-52164 | 2172 | 35.59 | 3.48 | 55.06 | 10.07 |
| XD-52166 | 2175 | 58.14 | 3.63 | 85.01 | 8.72 |
| XD-52167 | 2176 | 68.94 | 5.90 | 68.53 | 4.32 |
| XD-52168 | 2177 | 45.11 | 4.12 | 41.23 | 6.72 |
| XD-52169 | 2181 | 40.16 | 11.43 | 35.83 | 5.66 |
| XD-52170 | 2188 | 36.19 | 2.23 | 36.78 | 2.96 |
| XD-52173 | 2192 | 28.88 | 1.52 | 39.78 | 8.51 |
| XD-52174 | 2192 | 27.32 | 2.05 | 43.02 | 4.84 |
| XD-52175 | 2193 | 46.62 | 0.50 | 70.96 | 18.20 |
| XD-52179 | 2401 | 45.52 | 2.21 | 61.20 | 10.31 |
| XD-52180 | 2424 | 39.77 | 4.36 | 32.81 | 3.65 |
| XD-52181 | 2425 | 36.62 | 1.09 | 34.73 | 2.31 |
| XD-52184 | 2427 | 47.06 | 3.91 | 55.77 | 5.01 |
| XD-52185 | 2429 | 33.29 | 5.00 | 41.02 | 2.71 |
| XD-52186 | 2429 | 37.22 | 2.15 | 48.75 | 4.39 |
| XD-52187 | 2430 | 43.20 | 1.77 | 47.00 | 7.57 |
| XD-52188 | 2432 | 30.31 | 3.00 | 53.83 | 3.07 |
| XD-52189 | 2432 | 31.98 | 1.83 | 55.59 | 1.15 |
| XD-52190 | 2433 | 30.69 | 3.13 | 53.21 | 3.60 |
| XD-52191 | 2433 | 36.93 | 3.14 | 63.73 | 4.23 |
| XD-52194 | 2543 | 26.54 | 1.63 | 46.60 | 1.66 |
| XD-52195 | 2605 | 52.23 | 3.77 | 61.56 | 8.02 |
| XD-52197 | 2657 | 25.47 | 1.81 | 35.26 | 2.00 |
| XD-52198 | 2663 | 45.95 | 2.30 | 37.07 | 1.79 |
| XD-52199 | 2663 | 44.04 | 4.45 | 39.19 | 5.08 |
| XD-52200 | 2720 | 42.83 | 3.47 | 61.39 | 8.51 |
| XD-52202 | 2792 | 36.27 | 3.20 | 35.56 | 5.15 |
| XD-52203 | 2793 | 31.84 | 4.16 | 38.10 | 4.04 |
| XD-52204 | 2800 | 37.74 | 4.28 | 43.18 | 6.39 |
| XD-52205 | 2806 | 28.90 | 2.24 | 41.64 | 7.00 |

Example 2. Dose Response Screening of the TFR2 siRNAs in HepG2 Cells

Several siRNAs displaying the best activity in the dual-dose screen were selected for more detailed dose response analysis. The experiment was performed essentially as described in Example 1. The siRNAs were used in 10 concentrations starting at 50 nM in 5-fold dilutions steps down to ~40 pM. For defining the IC50 values, the dose-response curves were analyzed with XLfit (Excel add-in) following a 4 parameter logistic fit model no. 205, fit=(A+((B−A)/(1+((C/x)^D)))), where A is the bottom plateau of the curve (i.e., the final minimum y value, wherein y is the relative mRNA level), B is the top of the plateau of the curve (i.e., the final maximum y value), C is the IC50 value represents the x value at which the middle y value is attained, D is the slope factor, and x is concentration. The results of this analysis, showing IC50 and maximum knockdown effect are shown in Table 4.

TABLE 4

Results of the activity analysis of the initial set of TFR2 siRNAs in HepG2 cells in dose response

| siRNA ID | Starting nt | IC50 (nM) | Maximum inhibition (%) |
|---|---|---|---|
| XD-52020 | 39 | 0.20 | 77.84 |
| XD-52024 | 68 | 0.09 | 75.56 |
| XD-52025 | 69 | 3.44 | 60.95 |
| XD-52026 | 88 | 0.64 | 73.44 |
| XD-52027 | 92 | 1.98 | 70.98 |
| XD-52035 | 241 | 0.05 | 88.58 |
| XD-52038 | 245 | 0.70 | 73.48 |
| XD-52041 | 387 | 0.27 | 77.09 |
| XD-52042 | 406 | 0.40 | 87.32 |
| XD-52044 | 412 | 0.40 | 84.67 |
| XD-52051 | 721 | 0.24 | 74.52 |
| XD-52060 | 895 | 0.65 | 69.31 |
| XD-52063 | 997 | 0.53 | 72.81 |
| XD-52065 | 1051 | 0.11 | 81.34 |
| XD-52066 | 1051 | 0.62 | 72.21 |
| XD-52068 | 1054 | 0.53 | 76.32 |

TABLE 4-continued

Results of the activity analysis of the initial set of TFR2 siRNAs in HepG2 cells in dose response

| siRNA ID | Starting nt | IC50 (nM) | Maximum inhibition (%) |
|---|---|---|---|
| XD-52084 | 1445 | 0.17 | 83.20 |
| XD-52085 | 1448 | 0.06 | 86.95 |
| XD-52089 | 1531 | 1.78 | 74.00 |
| XD-52092 | 1537 | 0.98 | 72.41 |
| XD-52093 | 1539 | 1.84 | 74.38 |
| XD-52099 | 1581 | 0.76 | 75.31 |
| XD-52100 | 1588 | 0.63 | 84.83 |
| XD-52105 | 1616 | 0.71 | 78.86 |
| XD-52106 | 1617 | 0.08 | 78.99 |
| XD-52108 | 1626 | 0.38 | 75.55 |
| XD-52109 | 1627 | 0.16 | 85.87 |
| XD-52115 | 1670 | 0.23 | 78.76 |
| XD-52116 | 1671 | 0.10 | 70.52 |
| XD-52130 | 1836 | 0.12 | 79.59 |
| XD-52134 | 1840 | 0.09 | 81.77 |
| XD-52135 | 1840 | 0.15 | 81.60 |
| XD-52139 | 2004 | 0.56 | 78.05 |
| XD-52160 | 2157 | 0.11 | 86.20 |
| XD-52173 | 2192 | 2.36 | 70.71 |
| XD-52174 | 2192 | 1.49 | 67.72 |
| XD-52197 | 2657 | 0.02 | 69.32 |
| XD-52205 | 2806 | 0.50 | 65.67 |

All siRNAs with sub-nanomolar IC50 values were analyzed for sequence specificity by screening RNA sequence databases, expression of potential off-target genes in hepatocytes and positions of the mismatches along siRNA. All siRNAs likely to have dangerous sequence-mediated off-target effects in hepatocytes were discarded.

Example 3. Chemical Optimization of Selected TFR2 siRNAs

Several siRNAs starting from positions 241, 412, 1051, 1448, 1627, 1840, 2157, and 2657 showing the best activity in the dose response analysis in HepG2 cells and the best sequence specificity were selected for further chemical optimization and synthesized as generally described in Example 1 and as follows. It will be understood by those of skill in the art that alternative methodologies and materials for oligonucleotide synthesis are available and are encompassed by this disclosure.

Antisense strands were mostly synthesized on Universal linker loaded controlled pore glass (CPG) frit based-solid support, available from Biocomma (#DS0500, porosity of 500 Å) (except X169635 and X169639, which were assembled on 2'-OMe-C loaded CPG solid support available from LGC Biosearch Technologies (Petaluma, CA, USA) (#BG7-1030, porosity of 498 Å, 84 µmol/g loading). As noted, alternate synthesis methods can be used to synthesize the siRNAs in this example and that of Example 1. Sense strands were synthesized on the monomeric GalNAc-TEG immobilised CPG solid support sourced from Hongene Biotech, China (#ON-431, porosity of 500 Å, 49 µmol/g loading). Sense strands were synthesized on the monomeric GalNAc-TEG immobilised CPG solid support sourced from Hongene biotech, China (#ON-431, porosity of 500 Å, 49 µmol/g loading).

All 2'-modified RNA phosphoramidites as well as the majority of ancillary reagents (if not separately mentioned) for use in the current example as well as in Example 1 were purchased from SAFC, Proligo, Sigma Aldrich (Hamburg, Germany). Specifically, the following 2'-O-Methyl phosphoramidites were used: (5'-O-dimethoxytrityl-N6-(benzoyl)-2'-O-methyl-adenosine-3'-O-(2-cyanoethyl-N,N-diisopropylamino) phosphoramidite, 5'-O-dimethoxytrityl-N4-(acetyl)-2'-O-methyl-cytidine-3'-O-(2-cyanoethyl-N,N-diisopropylamino) phosphoramidite, (5'-O-dimethoxytrityl-N2-(isobutyryl)-2'-O-methyl-guanosine-3'-O-(2-cyanoethyl-N,N-diisopropylamino) phosphoramidite and 5'-O-dimethoxytrityl-2'-O-methyl-uridine-3'-O-(2-cyanoethyl-N,N-diisopropylamino) phosphoramidite. The 2'-deoxy-2'-fluoro-phosphoramidites and 2'-O-TBDMS phosphoramidites carried the same protecting groups as the 2'-O-methyl RNA amidites. In addition to these, the other phosphoramidites were sourced as follows: 5'-vinyl phosphonate-2'-OMe-U (POM protected) (#LK2579), spacer C3 (#LK2113) and (invdT) (#LK2020) phosphoramidites were purchased from LGC Biosearch Technologies; monomeric GalNAc-TEG phosphoramidite (#OP-123) was procured from Hongene biotech, China; 2'-5'-linked 3'-deoxy phosphoramidites (3'-dA(bz)(#10-1004), 3'-dC(bz)(#10-1064), 3'-dG(dmf)(#10-1074) and 3'-dT(#10-1084)) were purchased from Glen Research; 2'-5'-linked 3'-OMe phosphoramidites (3'-OMe A(bz)(#ANP-2901), 3'-OMe C(bz)(#ANP-2902), 3'-OMe G(ibu)(#ANP-2903) and 3'-OMe U(#ANP-2904)) were purchased from ChemGenes; threose nucleic acid phosphoramidites (TNA-A(bz)(#STA-AM10063), TNA-C(ac)(#STA-AM10083), TNA-G(dmf)(#STA-AM10349) and TNA-U(#STA-AM10956)) were purchased from Wuxiapptech, China. Amidite solutions (50 mM) used were prepared from the amidites, as commercially sourced, in anhydrous acetonitrile and molecular sieves (3 Å, 8-12 mesh, Car Roth, #N893.1) were added.

5-Ethyl thiotetrazole (ETT, 500 mM in acetonitrile, 99.8%, Biosolve #0022112402BS) was used as activator solution. Coupling times were 6 minutes. In order to introduce phosphorothioate linkages a 100 mM solution of 3-Amino-1,2,4-dithiazole-5-thione (or Xanthane hydride obtained from TCI Chemicals, Germany, (Purity: >96.0% (HPLC) cas: 6846-35-1)) dissolved in ACN-pyridine (2:3 v/v) was employed as sulfurizing agent. The other ancillary reagents used were as follows: Iodine-Oxidizer (50 mM 12 (in Pyridine-$H_2O$ (9:1 v/v))), TCA (3% in DCM) for deblocking, Cap A (Acetic anhydride in THF (9.1:90.9 v/v)) and Cap B (THF, N-Methylimidazole and Pyridine (8:1:1 v/v/v) as Capping agents. Oligonucleotides were all synthesized with the removal of the final DMT protecting group ("DMT-Off").

Cleavage De-Protection: After finalization of the solid phase synthesis, oligonucleotides were cleaved from the solid support by addition of AMA (1:1 (v/v) mixture of concentrated aqueous ammonia and 40% aqueous methylamine, both available from Sigma Aldrich) and collected in 96 well plates. To achieve quantitative removal of all the protecting groups the solutions were incubated with shaking at 33° C. Samples were thereafter dried under reduced pressure and reconstituted in 250 mM Tris(hydroxymethyl) aminomethane (TRIS) pH7 to yield crude sample solutions for subsequent purification.

Crude preparations were thereafter purified by Anion Exchange Chromatography using a Dionex DNA Pac100 (9×250 mm)-column (ThermoFisher, Dreieich, Germany) on an ÄKTA Purifier system (GE Healthcare, Freiburg, Germany) equipped with an auto-sampler (A905) and a fraction collector (Frac-950). Buffer A was 20 mM TRIS pH 7.4 and contained 20% acetonitrile and buffer B contained 500 mM sodium perchlorate in buffer A. Appropriate fractions were pooled and precipitated overnight in the freezer using 3M NaOAc, pH=5.2 and a mixture of ethanol and isopropanol. Pellets were reconstituted in purified water. The purified sense and antisense strands were quantified by measuring the UV absorption at 260 nm. Subsequently, the materials were assessed with respect to fulfillment of pre-agreed specifications for MS-identity (+/−0.05% of calculated mass (by ESI-MS)) and purity (single strand purity >85%, as per integration of the UV signal of the analytical AEX trace).

The purified complementary strands were then mixed in an equimolar ratio and dried in a SpeedVac concentrator. Subsequently, 300 µL of purified water were added to achieve a final duplex concentration of 100 µM. The duplex solutions were placed into a water bath at 70° C., which was subsequently cooled to RT within 3 h. The resultant siRNA-duplexes were characterized by Size-exclusion chromatography (SEC) towards fulfillment of pre agreed specification of Purity (Duplex purity>90%, as per integration of the UV signal of the analytical SEC trace).

Using the described methods, the siRNAs were synthesized in 13 different chemical modification patterns each and compared to the original siRNAs used in the initial screening in HepG2 cells. Nine of these chemical modification patterns contained a chemical modification (a 2'-5' bridge between positions 7 and 8 of the antisense strand with 3'H or 3'OMe in position 7, or a TNA nucleotide in position 7) reported to reduce seed-mediated off-target effects of a given siRNA (see for example U.S. Pat. No. 10,421,962). The list of these siRNAs, as well as SEQ ID NO: 308, claimed herein, is shown in Table 5.

TABLE 5

Chemical optimization of modified TFR2 siRNAs

| SEQ ID NO | Starting nt | siRNA ID | Sense strand / Antisense strand |
|---|---|---|---|
| 193 | 241 | XD-65715 | 5'-(C3)csasggCfaGfCfCfaaaccucauasLsLsL-3' |
| 194 | | | 5'-(vinu)sAfsugaGfgUfUfuggcUfgCfcugsgsg-3' |
| 193 | 241 | XD-65716 | 5'-(C3)csasggCfaGfCfCfaaaccucauasLsLsL-3' |
| 195 | | | 5'-(vinu)sAfsugaGf(3dG)UfUfuggcUfgCfcugsgsg-3' |
| 193 | 241 | XD-65717 | 5'-(C3)csasggCfaGfCfCfaaaccucauasLsLsL-3' |
| 196 | | | 5'-(vinu)sAfsugaGf(2-5g)UfUfuggcUfgCfcugsgsg-3' |
| 193 | 241 | XD-65718 | 5'-(C3)csasggCfaGfCfCfaaaccucauasLsLsL-3' |
| 197 | | | 5'-(vinu)sAfsugaGfGtUfUfuggcUfgCfcugsgsg-3' |
| 193 | 241 | XD-65719 | 5'-(C3)csasggCfaGfCfCfaaaccucauasLsLsL-3' |
| 198 | | | 5'-(vinu)sAfsugaGfguUfuggcUfgCfcugsgsg-3' |
| 193 | 241 | XD-65720 | 5'-(C3)csasggCfaGfCfCfaaaccucauasLsLsL-3' |
| 199 | | | 5'-(vinu)sAfsugaGf(3dG)uUfuggcUfgCfcugsgsg-3' |
| 193 | 241 | XD-65721 | 5'-(C3)csasggCfaGfCfCfaaaccucauasLsLsL-3' |
| 200 | | | 5'-(vinu)sAfsugaGf(2-5g)uUfuggcUfgCfcugsgsg-3' |
| 193 | 241 | XD-65722 | 5'-(C3)csasggCfaGfCfCfaaaccucauasLsLsL-3' |
| 201 | | | 5'-(vinu)sAfsugaGfGtuUfuggcUfgCfcugsgsg-3' |
| 193 | 241 | XD-65723 | 5'-(C3)csasggCfaGfCfCfaaaccucauasLsLsL-3' |
| 202 | | | 5'-(vinu)sAfsugagguuuggcUfgCfcugsgsg-3' |
| 193 | 241 | XD-65724 | 5'-(C3)csasggCfaGfCfCfaaaccucauasLsLsL-3' |
| 203 | | | 5'-(vinu)sAfsugag(3dG)uuuggcUfgCfcugsgsg-3' |
| 193 | 241 | XD-65725 | 5'-(C3)csasggCfaGfCfCfaaaccucauasLsLsL-3' |
| 204 | | | 5'-(vinu)sAfsugag(2-5g)uuuggcUfgCfcugsgsg-3' |
| 193 | 241 | XD-65726 | 5'-(C3)csasggCfaGfCfCfaaaccucauasLsLsL-3' |
| 205 | | | 5'-(vinu)sAfsugagGtuuuggcUfgCfcugsgsg-3' |
| 309 | 241 | XD-65727 | 5'-(C3)csasGfgcaGfCfCfaaAfccucAfuasLsLsL-3' |
| 206 | | | 5'-(vinu)sAfsugagguuuggcUfgccugsgsg-3' |
| 207 | 412 | XD-65728 | 5'-(C3)csusauGfaGfCfCfugaccuggaasLsLsL-3' |
| 208 | | | 5'-(vinu)sUfsccaGfgUfCfaggcUfcAfuagsusu-3' |
| 207 | 412 | XD-65729 | 5'-(C3)csusauGfaGfCfCfugaccuggaasLsLsL-3' |
| 209 | | | 5'-(vinu)sUfsccaGf(3dG)UfCfaggcUfcAfuagsusu-3' |
| 207 | 412 | XD-65730 | 5'-(C3)csusauGfaGfCfCfugaccuggaasLsLsL-3' |
| 210 | | | 5'-(vinu)sUfsccaGf(2-5g)UfCfaggcUfcAfuagsusu-3' |
| 207 | 412 | XD-65731 | 5'-(C3)csusauGfaGfCfCfugaccuggaasLsLsL-3' |
| 211 | | | 5'-(vinu)sUfsccaGfGtUfCfaggcUfcAfuagsusu-3' |
| 207 | 412 | XD-65732 | 5'-(C3)csusauGfaGfCfCfugaccuggaasLsLsL-3' |
| 212 | | | 5'-(vinu)sUfsccaGfguCfaggcUfcAfuagsusu-3' |
| 207 | 412 | XD-65733 | 5'-(C3)csusauGfaGfCfCfugaccuggaasLsLsL-3' |
| 213 | | | 5'-(vinu)sUfsccaGf(3dG)uCfaggcUfcAfuagsusu-3' |

TABLE 5-continued

Chemical optimization of modified TFR2 siRNAs

| SEQ ID NO | Starting nt | siRNA ID | Sense strand<br>Antisense strand |
|---|---|---|---|
| 207<br>214 | 412 | XD-65734 | 5'-(C3)csusauGfaGfCfCfugaccuggaasLsLsL-3'<br>5'-(vinu)sUfsccaGf(2-5g)uCfaggcUfcAfuagsusu-3' |
| 207<br>215 | 412 | XD-65735 | 5'-(C3)csusauGfaGfCfCfugaccuggaasLsLsL-3'<br>5'-(vinu)sUfsccaGfGtuCfaggcUfcAfuagsusu-3' |
| 207<br>216 | 412 | XD-65736 | 5'-(C3)csusauGfaGfCfCfugaccuggaasLsLsL-3'<br>5'-(vinu)sUfsccaggucaggcUfcAfuagsusu-3' |
| 207<br>217 | 412 | XD-65737 | 5'-(C3)csusauGfaGfCfCfugaccuggaasLsLsL-3'<br>5'-(vinu)sUfsccag(3dG)ucaggcUfcAfuagsusu-3' |
| 207<br>218 | 412 | XD-65738 | 5'-(C3)csusauGfaGfCfCfugaccuggaasLsLsL-3'<br>5'-(vinu)sUfsccag(2-5g)ucaggcUfcAfuagsusu-3' |
| 207<br>219 | 412 | XD-65739 | 5'-(C3)csusauGfaGfCfCfugaccuggaasLsLsL-3'<br>5'-(vinu)sUfsccagGtucaggcUfcAfuagsusu-3' |
| 310<br>220 | 412 | XD-65740 | 5'-(C3)csusAfugaGfCfCfugAfccugGfaasLsLsL-3'<br>5'-(vinu)sUfsccaggucaggcUfcauagsusu-3' |
| 221<br>222 | 1051 | XD-65741 | 5'-(C3)ususccUfuCfAfAfucaaacccaasLsLsL-3'<br>5'-(vinu)sUfsgggUfuUfGfauugAfaGfgaasgsg-3' |
| 221<br>223 | 1051 | XD-65742 | 5'-(C3)ususccUfuCfAfAfucaaacccaasLsLsL-3'<br>5'-(vinu)sUfsgggUf(3dU)UfGfauugAfaGfgaasgsg-3' |
| 221<br>224 | 1051 | XD-65743 | 5'-(C3)ususccUfuCfAfAfucaaacccaasLsLsL-3'<br>5'-(vinu)sUfsgggUf(2-5u)UfGfauugAfaGfgaasgsg-3' |
| 221<br>225 | 1051 | XD-65744 | 5'-(C3)ususccUfuCfAfAfucaaacccaasLsLsL-3'<br>5'-(vinu)sUfsgggUfUtUfGfauugAfaGfgaasgsg-3' |
| 221<br>226 | 1051 | XD-65745 | 5'-(C3)ususccUfuCfAfAfucaaacccaasLsLsL-3'<br>5'-(vinu)sUfsgggUfuuGfauugAfaGfgaasgsg-3' |
| 221<br>227 | 1051 | XD-65746 | 5'-(C3)ususccUfuCfAfAfucaaacccaasLsLsL-3'<br>5'-(vinu)sUfsgggUf(3dU)uGfauugAfaGfgaasgsg-3' |
| 221<br>228 | 1051 | XD-65747 | 5'-(C3)ususccUfuCfAfAfucaaacccaasLsLsL-3'<br>5'-(vinu)sUfsgggUf(2-5u)uGfauugAfaGfgaasgsg-3' |
| 221<br>229 | 1051 | XD-65748 | 5'-(C3) ususccUfuCfAfAfucaaacccaasLsLsL-3'<br>5'-(vinu)sUfsgggUfUtuGfauugAfaGfgaasgsg-3' |
| 221<br>230 | 1051 | XD-65749 | 5'-(C3)ususccUfuCfAfAfucaaacccaasLsLsL-3'<br>5'-(vinu)sUfsgggguuugauugAfaGfgaasgsg-3' |
| 221<br>231 | 1051 | XD-65750 | 5'-(C3)ususccUfuCfAfAfucaaacccaasLsLsL-3'<br>5'-(vinu)sUfsgggu(3dU)ugauugAfaGfgaasgsg-3' |
| 221<br>232 | 1051 | XD-65751 | 5'-(C3)ususccUfuCfAfAfucaaacccaasLsLsL-3'<br>5'-(vinu)sUfsgggu(2-5u)ugauugAfaGfgaasgsg-3' |
| 221<br>233 | 1051 | XD-65752 | 5'-(C3)ususccUfuCfAfAfucaaacccaasLsLsL-3'<br>5'-(vinu)sUfsggguUtugauugAfaGfgaasgsg-3' |
| 311<br>234 | 1051 | XD-65753 | 5'-(C3)ususCfcuuCfAfAfucAfaaccCfaasLsLsL-3'<br>5'-(vinu)sUfsgggguuugauugAfaggaasgsg-3' |
| 235<br>236 | 1448 | XD-65754 | 5'-(C3)asgsaaGfuCfUfCfcucuucaucasLsLsL-3'<br>5'-(vinu)sGfsaugAfaGfAfggagAfcUfucusgsc-3' |
| 235<br>237 | 1448 | XD-65755 | 5'-(C3)asgsaaGfuCfUfCfcucuucaucasLsLsL-3'<br>5'-(vinu)sGfsaugAf(3dA)GfAfggagAfcUfucusgsc-3' |
| 235<br>238 | 1448 | XD-65756 | 5'-(C3)asgsaaGfuCfUfCfcucuucaucasLsLsL-3'<br>5'-(vinu)sGfsaugAf(2-5a)GfAfggagAfcUfucusgsc-3' |
| 235<br>239 | 1448 | XD-65757 | 5'-(C3)asgsaaGfuCfUfCfcucuucaucasLsLsL-3'<br>5'-(vinu)sGfsaugAfAtGfAfggagAfcUfucusgsc-3' |
| 235<br>240 | 1448 | XD-65758 | 5'-(C3)asgsaaGfuCfUfCfcucuucaucasLsLsL-3'<br>5'-(vinu)sGfsaugAfagAfggagAfcUfucusgsc-3' |

TABLE 5-continued

Chemical optimization of modified TFR2 siRNAs

| SEQ ID NO | Starting nt | siRNA ID | Sense strand<br>Antisense strand |
|---|---|---|---|
| 235<br>241 | 1448 | XD-65759 | 5'-(C3)asgsaaGfuCfUfCfcucuucaucasLsLsL-3'<br>5'-(vinu)sGfsaugAf(3dA)gAfggagAfcUfucusgsc-3' |
| 235<br>242 | 1448 | XD-65760 | 5'-(C3)asgsaaGfuCfUfCfcucuucaucasLsLsL-3'<br>5'-(vinu)sGfsaugAf(2-5a)gAfggagAfcUfucusgsc-3' |
| 235<br>243 | 1448 | XD-65761 | 5'-(C3)asgsaaGfuCfUfCfcucuucaucasLsLsL-3'<br>5'-(vinu)sGfsaugAfAtgAfggagAfcUfucusgsc-3' |
| 235<br>244 | 1448 | XD-65762 | 5'-(C3)asgsaaGfuCfUfCfcucuucaucasLsLsL-3'<br>5'-(vinu)sGfsaugaagaggagAfcUfucusgsc-3' |
| 235<br>245 | 1448 | XD-65763 | 5'-(C3)asgsaaGfuCfUfCfcucuucaucasLsLsL-3'<br>5'-(vinu)sGfsauga(3dA)gaggagAfcUfucusgsc-3' |
| 235<br>246 | 1448 | XD-65764 | 5'-(C3)asgsaaGfuCfUfCfcucuucaucasLsLsL-3'<br>5'-(vinu)sGfsauga(2-5a)gaggagAfcUfucusgsc-3' |
| 235<br>247 | 1448 | XD-65765 | 5'-(C3)asgsaaGfuCfUfCfcucuucaucasLsLsL-3'<br>5'-(vinu)sGfsaugaAtgaggagAfcUfucusgsc-3' |
| 312<br>248 | 1448 | XD-65766 | 5'-(C3)asgsAfaguCfUfCfcuCfuucaUfcasLsLsL-3'<br>5'-(vinu)sGfsaugaagaggagAfcuucusgsc-3' |
| 249<br>250 | 1627 | XD-65767 | 5'-(C3)csasuuGfaGfAfGfuguccugaaasLsLsL-3'<br>5'-(vinu)sUfsucaGfgAfCfacucUfcAfaugsasg-3' |
| 249<br>251 | 1627 | XD-65768 | 5'-(C3)csasuuGfaGfAfGfuguccugaaasLsLsL-3'<br>5'-(vinu)sUfsucaGf(3dG)AfCfacucUfcAfaugsasg-3' |
| 249<br>252 | 1627 | XD-65769 | 5'-(C3)csasuuGfaGfAfGfuguccugaaasLsLsL-3'<br>5'-(vinu)sUfsucaGf(2-5g)AfCfacucUfcAfaugsasg-3' |
| 249<br>253 | 1627 | XD-65770 | 5'-(C3)csasuuGfaGfAfGfuguccugaaasLsLsL-3'<br>5'-(vinu)sUfsucaGfGtAfCfacucUfcAfaugsasg-3' |
| 249<br>254 | 1627 | XD-65771 | 5'-(C3)csasuuGfaGfAfGfuguccugaaasLsLsL-3'<br>5'-(vinu)sUfsucaGfgaCfacucUfcAfaugsasg-3' |
| 249<br>255 | 1627 | XD-65772 | 5'-(C3)csasuuGfaGfAfGfuguccugaaasLsLsL-3'<br>5'-(vinu)sUfsucaGf(3dG)aCfacucUfcAfaugsasg-3' |
| 249<br>256 | 1627 | XD-65773 | 5'-(C3)csasuuGfaGfAfGfuguccugaaasLsLsL-3'<br>5'-(vinu)sUfsucaGf(2-5g)aCfacucUfcAfaugsasg-3' |
| 249<br>257 | 1627 | XD-65774 | 5'-(C3)csasuuGfaGfAfGfuguccugaaasLsLsL-3'<br>5'-(vinu)sUfsucaGfGtaCfacucUfcAfaugsasg-3' |
| 249<br>258 | 1627 | XD-65775 | 5'-(C3)csasuuGfaGfAfGfuguccugaaasLsLsL-3'<br>5'-(vinu)sUfsucaggacacucUfcAfaugsasg-3' |
| 249<br>259 | 1627 | XD-65776 | 5'-(C3)csasuuGfaGfAfGfuguccugaaasLsLsL-3'<br>5'-(vinu)sUfsucag(3dG)acacucUfcAfaugsasg-3' |
| 249<br>260 | 1627 | XD-65777 | 5'-(C3)csasuuGfaGfAfGfuguccugaaasLsLsL-3'<br>5'-(vinu)sUfsucag(2-5g)acacucUfcAfaugsasg-3' |
| 249<br>261 | 1627 | XD-65778 | 5'-(C3)csasuuGfaGfAfGfuguccugaaasLsLsL-3'<br>5'-(vinu)sUfsucagGtacacucUfcAfaugsasg-3' |
| 313<br>262 | 1627 | XD-65779 | 5'-(C3)csasUfugaGfAfGfugUfccugAfaasLsLsL-3'<br>5'-(vinu)sUfsucaggacacucUfcaaugsasg-3' |
| 263<br>264 | 1840 | XD-65780 | 5'-(C3)asasagGfaGfGfAfcacuuaugaasLsLsL-3'<br>5'-(vinu) sUfscauAfaGfUfguccUfcCfuuusgsu-3' |
| 263<br>265 | 1840 | XD-65781 | 5'-(C3)asasagGfaGfGfAfcacuuaugaasLsLsL-3'<br>5'-(vinu)sUfscauAf(3dA)GfUfguccUfcCfuuusgsu-3' |
| 263<br>266 | 1840 | XD-65782 | 5'-(C3)asasagGfaGfGfAfcacuuaugaasLsLsL-3'<br>5'-(vinu)sUfscauAf(2-5a)GfUfguccUfcCfuuusgsu-3' |

TABLE 5-continued

Chemical optimization of modified TFR2 siRNAs

| SEQ ID NO | Starting nt | siRNA ID | Sense strand<br>Antisense strand |
|---|---|---|---|
| 263<br>267 | 1840 | XD-65783 | 5'-(C3)asasagGfaGfGfAfcacuuaugaasLsLsL-3'<br>5'-(vinu)sUfscauAfAtGfUfguccUfcCfuuusgsu-3' |
| 263<br>268 | 1840 | XD-65784 | 5'-(C3)asasagGfaGfGfAfcacuuaugaasLsLsL-3'<br>5'-(vinu)sUfscauAfagUfguccUfcCfuuusgsu-3' |
| 263<br>269 | 1840 | XD-65785 | 5'-(C3)asasagGfaGfGfAfcacuuaugaasLsLsL-3'<br>5'-(vinu)sUfscauAf(3dA)gUfguccUfcCfuuusgsu-3' |
| 263<br>270 | 1840 | XD-65786 | 5'-(C3)asasagGfaGfGfAfcacuuaugaasLsLsL-3'<br>5'-(vinu)sUfscauAf(2-5a)gUfguccUfcCfuuusgsu-3' |
| 263<br>271 | 1840 | XD-65787 | 5'-(C3)asasagGfaGfGfAfcacuuaugaasLsLsL-3'<br>5'-(vinu)sUfscauAfAtgUfguccUfcCfuuusgsu-3' |
| 263<br>272 | 1840 | XD-65788 | 5'-(C3)asasagGfaGfGfAfcacuuaugaasLsLsL-3'<br>5'-(vinu)sUfscauaaguguccUfcCfuuusgsu-3' |
| 263<br>273 | 1840 | XD-65789 | 5'-(C3)asasagGfaGfGfAfcacuuaugaasLsLsL-3'<br>5'-(vinu)sUfscaua(3dA)guguccUfcCfuuusgsu-3' |
| 263<br>274 | 1840 | XD-65790 | 5'-(C3)asasagGfaGfGfAfcacuuaugaasLsLsL-3'<br>5'-(vinu)sUfscaua(2-5a)guguccUfcCfuuusgsu-3' |
| 263<br>275 | 1840 | XD-65791 | 5'-(C3)asasagGfaGfGfAfcacuuaugaasLsLsL-3'<br>5'-(vinu)sUfscauaAtguguccUfcCfuuusgsu-3' |
| 314<br>276 | 1840 | XD-65792 | 5'-(C3)asasAfggaGfGfAfcaCfuuauGfaasLsLsL-3'<br>5'-(vinu)sUfscauaaguguccUfccuuusgsu-3' |
| 277<br>278 | 2157 | XD-65793 | 5'-(C3)usgsuaCfaAfCfGfugcgcauaaasLsLsL-3'<br>5'-(vinu)sUfsuauGfcGfCfacguUfgUfacasusg-3' |
| 277<br>279 | 2157 | XD-65794 | 5'-(C3)usgsuaCfaAfCfGfugcgcauaaasLsLsL-3'<br>5'-(vinu)sUfsuauGf(3dC)GfCfacguUfgUfacasusg-3' |
| 277<br>280 | 2157 | XD-65795 | 5'-(C3)usgsuaCfaAfCfGfugcgcauaaasLsLsL-3'<br>5'-(vinu)sUfsuauGf(2-5c)GfCfacguUfgUfacasusg-3' |
| 277<br>281 | 2157 | XD-65796 | 5'-(C3)usgsuaCfaAfCfGfugcgcauaaasLsLsL-3'<br>5'-(vinu)sUfsuauGfCtGfCfacguUfgUfacasusg-3' |
| 277<br>282 | 2157 | XD-65797 | 5'-(C3)usgsuaCfaAfCfGfugcgcauaaasLsLsL-3'<br>5'-(vinu)sUfsuauGfcgCfacguUfgUfacasusg-3' |
| 277<br>283 | 2157 | XD-65798 | 5'-(C3)usgsuaCfaAfCfGfugcgcauaaasLsLsL-3'<br>5'-(vinu)sUfsuauGf(3dC)gCfacguUfgUfacasusg-3' |
| 277<br>284 | 2157 | XD-65799 | 5'-(C3)usgsuaCfaAfCfGfugcgcauaaasLsLsL-3'<br>5'-(vinu)sUfsuauGf(2-5c)gCfacguUfgUfacasusg-3' |
| 277<br>285 | 2157 | XD-65800 | 5'-(C3)usgsuaCfaAfCfGfugcgcauaaasLsLsL-3'<br>5'-(vinu)sUfsuauGfCtgCfacguUfgUfacasusg-3' |
| 277<br>286 | 2157 | XD-65801 | 5'-(C3)usgsuaCfaAfCfGfugcgcauaaasLsLsL-3'<br>5'-(vinu)sUfsuaugcgcacguUfgUfacasusg-3' |
| 277<br>287 | 2157 | XD-65802 | 5'-(C3)usgsuaCfaAfCfGfugcgcauaaasLsLsL-3'<br>5'-(vinu)sUfsuaug(3dC)gcacguUfgUfacasusg-3' |
| 277<br>288 | 2157 | XD-65803 | 5'-(C3)usgsuaCfaAfCfGfugcgcauaaasLsLsL-3'<br>5'-(vinu)sUfsuaug(2-5c)gcacguUfgUfacasusg-3' |
| 277<br>289 | 2157 | XD-65804 | 5'-(C3)usgsuaCfaAfCfGfugcgcauaaasLsLsL-3'<br>5'-(vinu)sUfsuaugCtgcacguUfgUfacasusg-3' |
| 315<br>290 | 2157 | XD-65805 | 5'-(C3)usgsUfacaAfCfGfugCfgcauAfaasLsLsL-3'<br>5'-(vinu)sUfsuaugcgcacguUfguacasusg-3' |
| 291<br>292 | 2657 | XD-65806 | 5'-(C3)csgsguCfaUfAfCfugucgguuaasLsLsL-3'<br>5'-(vinu)sUfsaacCfgAfCfaguaUfgAfccgsusc-3' |
| 291<br>293 | 2657 | XD-65807 | 5'-(C3)csgsguCfaUfAfCfugucgguuaasLsLsL-3'<br>5'-(vinu)sUfsaacCf(3dG)AfCfaguaUfgAfccgsusc-3' |

TABLE 5-continued

Chemical optimization of modified TFR2 siRNAs

| SEQ ID NO | Starting nt | siRNA ID | Sense strand / Antisense strand |
|---|---|---|---|
| 291 | 2657 | XD-65808 | 5'-(C3)csgsguCfaUfAfCfugucgguuaasLsLsL-3' |
| 294 | | | 5'-(vinu)sUfsaacCf(2-5g)AfCfaguaUfgAfccgsusc-3' |
| 291 | 2657 | XD-65809 | 5'-(C3)csgsguCfaUfAfCfugucgguuaasLsLsL-3' |
| 295 | | | 5'-(vinu)sUfsaacCfGtAfCfaguaUfgAfccgsusc-3' |
| 291 | 2657 | XD-65810 | 5'-(C3)csgsguCfaUfAfCfugucgguuaasLsLsL-3' |
| 296 | | | 5'-(vinu)sUfsaacCfgaCfaguaUfgAfccgsusc-3' |
| 291 | 2657 | XD-65811 | 5'-(C3)csgsguCfaUfAfCfugucgguuaasLsLsL-3' |
| 297 | | | 5'-(vinu)sUfsaacCf(3dG)aCfaguaUfgAfccgsusc-3' |
| 291 | 2657 | XD-65812 | 5'-(C3)csgsguCfaUfAfCfugucgguuaasLsLsL-3' |
| 298 | | | 5'-(vinu)sUfsaacCf(2-5g)aCfaguaUfgAfccgsusc-3' |
| 291 | 2657 | XD-65813 | 5'-(C3)csgsguCfaUfAfCfugucgguuaasLsLsL-3' |
| 299 | | | 5'-(vinu)sUfsaacCfGtaCfaguaUfgAfccgsusc-3' |
| 291 | 2657 | XD-65814 | 5'-(C3)csgsguCfaUfAfCfugucgguuaasLsLsL-3' |
| 300 | | | 5'-(vinu)sUfsaaccgacaguaUfgAfccgsusc-3' |
| 291 | 2657 | XD-65815 | 5'-(C3)csgsguCfaUfAfCfugucgguuaasLsLsL-3' |
| 301 | | | 5'-(vinu)sUfsaacc(3dG)acaguaUfgAfccgsusc-3' |
| 291 | 2657 | XD-65816 | 5'-(C3)csgsguCfaUfAfCfugucgguuaasLsLsL-3' |
| 302 | | | 5'-(vinu)sUfsaacc(2-5g)acaguaUfgAfccgsusc-3' |
| 291 | 2657 | XD-65817 | 5'-(C3)csgsguCfaUfAfCfugucgguuaasLsLsL-3' |
| 303 | | | 5'-(vinu) sUfsaaccGtacaguaUfgAfccgsusc-3' |
| 316 | 2657 | XD-65818 | 5'-(C3)csgsGfucaUfAfCfugUfcgguUfaasLsLsL-3' |
| 304 | | | 5'-(vinu)sUfsaaccgacaguaUfgaccgsusc-3' |
| 308 | 2657 | | (C3)csgsguCfaUfAfCfugucgguuaa (sense strand only) |

As also described in Table 1 above, the sequence nomenclature in Table 5 is as follows: Nf: 2'-Fluoro (2'F) nucleotides; n: 2'-O-Methyl (2' OMe) nucleotides; (2-5n): 2'-5' 3'-OMe nucleotides; (3dN): 2'-5' 3'-H nucleotides; (vinu): 5' vinyl-phosphonate 2'-OMe U nucleotide; Nt: TNA nucleotides; ($C_3$): propanol or $C_3$ alkyl moiety connected to the 5' end of the strand via a phosphodiester linkage; s: phosphorothioate (Ps) backbone modification between adjacent nucleotides; L: Monomer of N-acetylgalactosamine (GalNAc) with a triethyleneglycol (TEG) linker.

Example 4. Analysis of Chemically Optimized siRNAs for Attenuation of Seed-Mediated Effects in a Dual-Luciferase Assay It is known that siRNAs can elicit seed-mediated miRNA-like off-target activity (see for example Suter et al., Org. Biomed. Chem. 15:10029-10036, 2017). The siRNAs listed in Table 5 were assayed for the such seed-mediated off-target effects in a dual-luciferase assay.

A set of constructs in the psiCHECK vector (Promega) was generated. One set of psiCHECK plasmids contained complete 19-mer target sequences of each siRNA of interest for monitoring the on-target activity of the siRNAs. Another set of psiCHECK plasmids contained the 3x concatomer seed target sequences (3 copies of nucleotide sequences complementary to positions 2-8 of the antisense strands starting from their 5' ends) of each siRNA to monitor seed-mediated activity of the siRNAs. Each of the target sequences (a completely matched or 3x-seed-matched) was individually cloned into the multiple cloning sites within the Renilla Luciferase (R-Luc) 3' untranslated region of the psiCHECK vectors for monitoring on-target or seed-mediated off-target siRNA activity by measuring the R-Luc activity whereas the luminescence signal elicited by a Firefly Luciferase (F-Luc) expressed from the same plasmid but from a different promoter served for effect normalization.

The assay was performed in Hepa 1-6 cells co-transfected with individual psiCHECK plasmids (a constant concentration of 50 ng/well) and the corresponding siRNAs added in 5 concentrations from 20 nM to 2 pM in 10-fold dilutions steps. Cells transfected with the empty plasmid served as negative control. The transfections were performed in quadruplicates using Lipofectamine2000 (Invitrogen/Life Technologies). After 24 hours of incubation, DualGlo Assay (Promega) was performed according to the manufacturer's protocol. For each well, the R-Luc signal was normalized to the respective F-Luc signal to correct for plasmid loading. The activity of a given siRNA was expressed as percent of relative R-Luc activity (normalized to F-Luc) in treated cells, relative to the negative control signals (R-Luc normalized to F-Luc) averaged across negative control wells. IC20, IC50 and IC80 concentrations were calculated from the dose response curves using XLfit graph (MS Excel Add On) and the results are summarized in Tables 6A and 6B. "#N/A" designates "non-applicable" for cases when IC20/IC50/IC80 values could not be calculated.

As shown in Table 6A, in the majority of cases, varying chemical modification patterns compared to the one used in the initial screening in HepG2 cells did not alter the on-target maximal knockdown potency—albeit with few exceptions. For example, for siRNAs starting from position 241, the maximum on-target knockdown effects of all novel modification patterns were improved from 94% (XD-65727) to 95-98.5%. For siRNAs starting from position 1840, the maximum on target KD effect was improved from 91.5% (XD-65792) to 94-97% for all chemical modification variants but one (XD-65790) where it was reduced to 78.7%. Notably, this chemical modification pattern did not negatively affect the maximal KD by other assayed siRNAs.

As for the on-target IC50 values (Table 6A), the effects of various chemical modification patterns seemed to be mostly siRNA sequence-dependent. For example, for siRNAs starting from position 2657, all novel chemical modification patterns improved IC50 values (albeit to different extents) compared to the original siRNA (XD-65818). At the same time, for other original siRNAs, application of certain novel chemical modification patterns resulted in on-target IC50 worsening, e.g., compare XD65793 vs XD65805 (original) and XD65790 vs XD65792 (original) for siRNAs starting from positions 2157 and 1840, respectively. Notably, chemical modification patterns for XD65793 and XD65790 were different.

Testing siRNA KD activities based only their seed region recognition (modeling of seed-mediated off-target effects) (Table 6B) has demonstrated that this type of activity was present in all siRNAs which chemical modification patterns did not include a specifically modified position 7 of the antisense strand. Seed-mediated knockdown potency of these siRNAs strongly depended on their sequence and, to a lesser extent, on the type of chemical modification pattern (that did not involve specific modifications in the antisense position 7). Thus, siRNAs starting from position 1840 could induce only a 30-35% seed-mediated KD, whereas for siRNAs starting from positions 241 and 412 it was 40-50%, for siRNAs starting from position 1051—60-70%, for siRNA starting from positions 1448, 1627, 2657—70-80%, and for siRNA starting from position 2157->90%.

In the majority of cases, addition of specific chemical modifications in position 7 of the antisense strand resulted in reduction of seed-mediated KD potency (Table 6B). However, this effect was sequence—and modification type-dependent—not working equally well for all siRNAs. For example, for siRNAs starting from position 2157, none of the antisense position 7 modification types was able to reduce seed-mediated KD activity. At the same time, for siRNAs starting at position 241, all types of modifications at the antisense position 7 have completely abolished the seed-mediated KD. For siRNAs starting from positions 1051 and 1448, having 2'-5' linkage between positions 7 and 8 of their antisense strands with position 7 being modified with 3'H resulted in a minimal reduction of seed-mediated KD whereas a substitution of 3'H with 3'Ome has practically eliminated the seed-mediated KD effect. In contrast, for siRNAs starting from position 2657, both 3'H and 3'Ome in antisense position 7 had similar profound effects in inhibiting seed-mediated KD.

Several siRNAs that demonstrated strong on-target knock down activity and little to no seed-mediated knockdown activity were selected for further analysis in primary human hepatocytes with GalNAc-mediated delivery.

TABLE 6A

Summary of on-target TFR2 siRNA activity

| Starting position | siRNA ID | Full length target sequence | | | |
|---|---|---|---|---|---|
| | | IC20 (nM) | IC50 (nM) | IC80 (nM) | Maximum KD (%) |
| 241 | XD-65715 | 0.0018 | 0.0083 | 0.0402 | 97.52 |
| | XD-65716 | 0.0018 | 0.0074 | 0.0318 | 96.88 |
| | XD-65717 | 0.0009 | 0.0036 | 0.0156 | 96.91 |
| | XD-65718 | 0.0013 | 0.0049 | 0.0182 | 98.31 |
| | XD-65719 | 0.0017 | 0.0089 | 0.0488 | 97.61 |
| | XD-65720 | 0.0019 | 0.0080 | 0.0352 | 96.91 |
| | XD-65721 | 0.0010 | 0.0042 | 0.0187 | 97.17 |
| | XD-65722 | 0.0015 | 0.0059 | 0.0232 | 98.54 |
| | XD-65723 | 0.0017 | 0.0088 | 0.0479 | 97.28 |
| | XD-65724 | 0.0048 | 0.0166 | 0.0641 | 95.03 |
| | XD-65725 | 0.0011 | 0.0049 | 0.0225 | 97.05 |
| | XD-65726 | 0.0018 | 0.0067 | 0.0252 | 98.06 |
| | XD-65727 | 0.0035 | 0.0145 | 0.0678 | 93.92 |
| 412 | XD-65728 | 0.0037 | 0.0173 | 0.0872 | 97.26 |
| | XD-65729 | 0.0024 | 0.0100 | 0.0441 | 97.50 |
| | XD-65730 | 0.0016 | 0.0068 | 0.0288 | 98.08 |
| | XD-65731 | 0.0018 | 0.0066 | 0.0254 | 98.34 |
| | XD-65732 | 0.0030 | 0.0149 | 0.0800 | 97.71 |
| | XD-65733 | 0.0020 | 0.0082 | 0.0359 | 97.48 |
| | XD-65734 | 0.0012 | 0.0053 | 0.0255 | 98.04 |
| | XD-65735 | 0.0015 | 0.0059 | 0.0243 | 98.36 |
| | XD-65736 | 0.0021 | 0.0120 | 0.0755 | 97.73 |
| | XD-65737 | 0.0020 | 0.0078 | 0.0328 | 98.01 |
| | XD-65738 | 0.0012 | 0.0052 | 0.0227 | 98.45 |
| | XD-65739 | 0.0019 | 0.0073 | 0.0295 | 98.34 |
| | XD-65740 | 0.0022 | 0.0103 | 0.0491 | 98.37 |
| 1051 | XD-65741 | 0.0006 | 0.0024 | 0.0099 | 98.75 |
| | XD-65742 | 0.0007 | 0.0025 | 0.0094 | 99.16 |
| | XD-65743 | 0.0004 | 0.0016 | 0.0057 | 98.97 |
| | XD-65744 | 0.0009 | 0.0034 | 0.0123 | 98.62 |
| | XD-65745 | 0.0007 | 0.0029 | 0.0128 | 98.91 |
| | XD-65746 | 0.0006 | 0.0023 | 0.0088 | 99.16 |
| | XD-65747 | 0.0005 | 0.0016 | 0.0055 | 98.96 |
| | XD-65748 | 0.0008 | 0.0031 | 0.0120 | 98.72 |
| | XD-65749 | 0.0008 | 0.0031 | 0.0123 | 98.76 |
| | XD-65750 | 0.0011 | 0.0041 | 0.0151 | 98.34 |
| | XD-65751 | 0.0009 | 0.0034 | 0.0131 | 97.57 |
| | XD-65752 | 0.0016 | 0.0060 | 0.0236 | 96.70 |
| | XD-65753 | 0.0008 | 0.0030 | 0.0118 | 98.41 |
| 1448 | XD-65754 | 0.0023 | 0.0089 | 0.0346 | 98.73 |
| | XD-65755 | 0.0014 | 0.0050 | 0.0190 | 99.09 |
| | XD-65756 | 0.0007 | 0.0026 | 0.0092 | 98.63 |
| | XD-65757 | 0.0007 | 0.0027 | 0.0105 | 99.13 |
| | XD-65758 | 0.0042 | 0.0158 | 0.0612 | 98.84 |
| | XD-65759 | 0.0015 | 0.0054 | 0.0200 | 98.87 |
| | XD-65760 | 0.0007 | 0.0025 | 0.0095 | 98.01 |
| | XD-65761 | 0.0008 | 0.0031 | 0.0120 | 98.99 |
| | XD-65762 | 0.0015 | 0.0060 | 0.0239 | 98.90 |
| | XD-65763 | 0.0009 | 0.0037 | 0.0152 | 98.86 |
| | XD-65764 | 0.0009 | 0.0036 | 0.0149 | 98.64 |
| | XD-65765 | 0.0011 | 0.0043 | 0.0174 | 98.70 |
| | XD-65766 | 0.0025 | 0.0104 | 0.0434 | 98.17 |
| 1627 | XD-65767 | 0.0024 | 0.0098 | 0.0413 | 98.60 |
| | XD-65768 | 0.0017 | 0.0063 | 0.0239 | 98.83 |
| | XD-65769 | 0.0022 | 0.0081 | 0.0308 | 98.33 |
| | XD-65770 | 0.0050 | 0.0179 | 0.0659 | 98.15 |
| | XD-65771 | 0.0026 | 0.0109 | 0.0475 | 98.46 |
| | XD-65772 | 0.0019 | 0.0069 | 0.0251 | 98.82 |
| | XD-65773 | 0.0023 | 0.0088 | 0.0349 | 98.45 |
| | XD-65774 | 0.0059 | 0.0202 | 0.0720 | 97.89 |
| | XD-65775 | 0.0020 | 0.0086 | 0.0376 | 98.26 |
| | XD-65776 | 0.0018 | 0.0068 | 0.0268 | 97.85 |
| | XD-65777 | 0.0023 | 0.0099 | 0.0446 | 95.31 |
| | XD-65778 | 0.0033 | 0.0119 | 0.0454 | 97.64 |
| | XD-65779 | 0.0027 | 0.0100 | 0.0387 | 97.26 |
| 1840 | XD-65780 | 0.0024 | 0.0114 | 0.0582 | 97.43 |
| | XD-65781 | 0.0024 | 0.0102 | 0.0464 | 97.31 |
| | XD-65782 | 0.0037 | 0.0177 | 0.0973 | 95.59 |
| | XD-65783 | 0.0024 | 0.0109 | 0.0528 | 97.17 |
| | XD-65784 | 0.0032 | 0.0138 | 0.0642 | 97.16 |
| | XD-65785 | 0.0020 | 0.0094 | 0.0468 | 97.04 |
| | XD-65786 | 0.0032 | 0.0175 | 0.1076 | 95.58 |
| | XD-65787 | 0.0026 | 0.0114 | 0.0530 | 97.17 |

TABLE 6A-continued

Summary of on-target TFR2 siRNA activity

| Starting position | siRNA ID | Full length target sequence | | | Maximum KD (%) |
|---|---|---|---|---|---|
| | | IC20 (nM) | IC50 (nM) | IC80 (nM) | |
| | XD-65788 | 0.0019 | 0.0097 | 0.0539 | 96.83 |
| | XD-65789 | 0.0048 | 0.0199 | 0.0927 | 95.76 |
| | XD-65790 | 0.0072 | 0.0368 | 0.3496 | 78.71 |
| | XD-65791 | 0.0034 | 0.0133 | 0.0561 | 97.17 |
| | XD-65792 | 0.0036 | 0.0148 | 0.0748 | 91.52 |
| 2157 | XD-65793 | 0.0086 | 0.0293 | 0.1043 | 97.86 |
| | XD-65794 | 0.0045 | 0.0144 | 0.0472 | 98.52 |
| | XD-65795 | 0.0022 | 0.0078 | 0.0284 | 98.61 |
| | XD-65796 | 0.0018 | 0.0059 | 0.0203 | 98.81 |
| | XD-65797 | 0.0068 | 0.0254 | 0.0990 | 97.63 |
| | XD-65798 | 0.0038 | 0.0123 | 0.0413 | 98.61 |
| | XD-65799 | 0.0018 | 0.0068 | 0.0267 | 98.61 |
| | XD-65800 | 0.0017 | 0.0058 | 0.0204 | 98.57 |
| | XD-65801 | 0.0025 | 0.0104 | 0.0453 | 98.55 |
| | XD-65802 | 0.0023 | 0.0086 | 0.0335 | 97.85 |
| | XD-65803 | 0.0023 | 0.0095 | 0.0410 | 98.26 |
| | XD-65804 | 0.0018 | 0.0062 | 0.0222 | 98.83 |
| | XD-65805 | 0.0035 | 0.0127 | 0.0479 | 97.27 |
| 2657 | XD-65806 | 0.0016 | 0.0074 | 0.0356 | 98.28 |
| | XD-65807 | 0.0016 | 0.0053 | 0.0178 | 98.34 |
| | XD-65808 | 0.0009 | 0.0037 | 0.0158 | 97.69 |
| | XD-65809 | 0.0015 | 0.0055 | 0.0203 | 98.86 |
| | XD-65810 | 0.0023 | 0.0096 | 0.0408 | 98.52 |
| | XD-65811 | 0.0019 | 0.0062 | 0.0209 | 98.48 |
| | XD-65812 | 0.0014 | 0.0050 | 0.0189 | 97.87 |
| | XD-65813 | 0.0019 | 0.0064 | 0.0217 | 98.76 |
| | XD-65814 | 0.0023 | 0.0097 | 0.0418 | 98.30 |
| | XD-65815 | 0.0027 | 0.0084 | 0.0270 | 98.39 |
| | XD-65816 | 0.0018 | 0.0068 | 0.0277 | 97.65 |
| | XD-65817 | 0.0028 | 0.0089 | 0.0288 | 98.34 |
| | XD-65818 | 0.0036 | 0.0134 | 0.0522 | 98.23 |

TABLE 6B

Summary of seed mediated off target TFR2 siRNA activity

| Starting position | siRNA ID | Seed × 3 target sequence | | | Maximum KD (%) |
|---|---|---|---|---|---|
| | | IC20 (nM) | IC50 (nM) | IC80 (nM) | |
| 241 | XD-65715 | 0.0651 | #N/A | #N/A | 42.47 |
| | XD-65716 | #N/A | #N/A | #N/A | −7.09 |
| | XD-65717 | #N/A | #N/A | #N/A | −4.42 |
| | XD-65718 | #N/A | #N/A | #N/A | −2.62 |
| | XD-65719 | 0.0601 | 2.5914 | #N/A | 53.58 |
| | XD-65720 | #N/A | #N/A | #N/A | −6.69 |
| | XD-65721 | #N/A | #N/A | #N/A | −7.99 |
| | XD-65722 | #N/A | #N/A | #N/A | −4.95 |
| | XD-65723 | 0.2547 | #N/A | #N/A | 47.37 |
| | XD-65724 | #N/A | #N/A | #N/A | −9.74 |
| | XD-65725 | #N/A | #N/A | #N/A | −5.08 |
| | XD-65726 | #N/A | #N/A | #N/A | −6.17 |
| | XD-65727 | 0.1013 | #N/A | #N/A | 40.86 |
| 412 | XD-65728 | 0.2934 | #N/A | #N/A | 41.35 |
| | XD-65729 | #N/A | #N/A | #N/A | 9.04 |
| | XD-65730 | #N/A | #N/A | #N/A | 12.99 |
| | XD-65731 | #N/A | #N/A | #N/A | 0.49 |
| | XD-65732 | 0.2834 | 1.7481 | #N/A | 54.64 |
| | XD-65733 | #N/A | #N/A | #N/A | 6.48 |
| | XD-65734 | #N/A | #N/A | #N/A | 12.68 |
| | XD-65735 | #N/A | #N/A | #N/A | 4.18 |
| | XD-65736 | 0.6580 | #N/A | #N/A | 40.86 |
| | XD-65737 | #N/A | #N/A | #N/A | 9.44 |
| | XD-65738 | #N/A | #N/A | #N/A | 6.59 |
| | XD-65739 | #N/A | #N/A | #N/A | 6.52 |
| | XD-65740 | 0.6915 | #N/A | #N/A | 42.75 |
| 1051 | XD-65741 | 0.1267 | 0.4441 | #N/A | 63.65 |
| | XD-65742 | 0.3552 | #N/A | #N/A | 25.47 |
| | XD-65743 | #N/A | #N/A | #N/A | 2.14 |
| | XD-65744 | 0.3650 | #N/A | #N/A | 25.39 |
| | XD-65745 | 0.0851 | 0.2926 | #N/A | 73.75 |
| | XD-65746 | 0.3404 | #N/A | #N/A | 24.73 |
| | XD-65747 | #N/A | #N/A | #N/A | 6.80 |
| | XD-65748 | 0.3163 | #N/A | #N/A | 31.80 |
| | XD-65749 | 0.1007 | 0.3076 | #N/A | 72.99 |
| | XD-65750 | 0.4116 | #N/A | #N/A | 27.19 |
| | XD-65751 | 2.8934 | #N/A | #N/A | 21.77 |
| | XD-65752 | 0.3391 | #N/A | #N/A | 33.07 |
| | XD-65753 | 0.0766 | 0.2142 | #N/A | 73.00 |
| 1448 | XD-65754 | 0.1238 | 0.3490 | 6.6285 | 76.02 |
| | XD-65755 | 0.4644 | 9.4304 | #N/A | 51.21 |
| | XD-65756 | #N/A | #N/A | #N/A | 6.99 |
| | XD-65757 | #N/A | #N/A | #N/A | 19.34 |
| | XD-65758 | 0.2332 | 0.4961 | #N/A | 78.63 |

TABLE 6B-continued

Summary of seed mediated off target TFR2 siRNA activity

Seed × 3 target sequence

| Starting position | siRNA ID | IC20 (nM) | IC50 (nM) | IC80 (nM) | Maximum KD (%) |
|---|---|---|---|---|---|
|  | XD-65759 | 1.1316 | #N/A | #N/A | 42.24 |
|  | XD-65760 | #N/A | #N/A | #N/A | 6.75 |
|  | XD-65761 | #N/A | #N/A | #N/A | 19.93 |
|  | XD-65762 | 0.1003 | 0.3274 | 11.2642 | 80.38 |
|  | XD-65763 | #N/A | #N/A | #N/A | 12.81 |
|  | XD-65764 | #N/A | #N/A | #N/A | 6.28 |
|  | XD-65765 | 34477.4796 | #N/A | #N/A | 20.30 |
|  | XD-65766 | 0.1849 | 0.3060 | #N/A | 77.93 |
| 1627 | XD-65767 | 0.0642 | 0.2329 | 2.2049 | 81.58 |
|  | XD-65768 | 0.4911 | #N/A | #N/A | 38.69 |
|  | XD-65769 | #N/A | #N/A | #N/A | 9.51 |
|  | XD-65770 | #N/A | #N/A | #N/A | 6.02 |
|  | XD-65771 | 0.0650 | 0.1968 | 1.2013 | 80.82 |
|  | XD-65772 | 0.5471 | #N/A | #N/A | 29.88 |
|  | XD-65773 | #N/A | #N/A | #N/A | 9.07 |
|  | XD-65774 | #N/A | #N/A | #N/A | 0.81 |
|  | XD-65775 | 0.0456 | 0.1313 | 0.7961 | 82.09 |
|  | XD-65776 | 0.5101 | #N/A | #N/A | 44.75 |
|  | XD-65777 | #N/A | #N/A | #N/A | 5.57 |
|  | XD-65778 | #N/A | #N/A | #N/A | 4.53 |
|  | XD-65779 | 0.0394 | 0.1193 | 0.7078 | 83.02 |
| 1840 | XD-65780 | 0.3495 | #N/A | #N/A | 32.03 |
|  | XD-65781 | #N/A | #N/A | #N/A | −6.46 |
|  | XD-65782 | #N/A | #N/A | #N/A | −24.47 |
|  | XD-65783 | #N/A | #N/A | #N/A | −7.69 |
|  | XD-65784 | 0.3551 | #N/A | #N/A | 36.07 |
|  | XD-65785 | #N/A | #N/A | #N/A | −10.03 |
|  | XD-65786 | #N/A | #N/A | #N/A | −22.32 |
|  | XD-65787 | #N/A | #N/A | #N/A | −1.87 |
|  | XD-65788 | 0.4652 | #N/A | #N/A | 34.36 |
|  | XD-65789 | #N/A | #N/A | #N/A | −8.75 |
|  | XD-65790 | #N/A | #N/A | #N/A | −17.97 |
|  | XD-65791 | #N/A | #N/A | #N/A | 3.38 |
|  | XD-65792 | 1.2680 | #N/A | #N/A | 32.12 |
| 2157 | XD-65793 | 0.0187 | 0.0562 | 0.1942 | 92.95 |
|  | XD-65794 | 0.0247 | 0.0672 | 0.2123 | 92.11 |
|  | XD-65795 | 0.0349 | 0.1054 | 0.3882 | 91.17 |
|  | XD-65796 | 0.0333 | 0.0895 | 0.2903 | 91.43 |
|  | XD-65797 | 0.0188 | 0.0571 | 0.2043 | 92.68 |
|  | XD-65798 | 0.0405 | 0.1100 | 0.3564 | 90.86 |
|  | XD-65799 | 0.0344 | 0.1324 | 0.6888 | 89.53 |
|  | XD-65800 | 0.0378 | 0.1204 | 0.5060 | 89.42 |
|  | XD-65801 | 0.0245 | 0.0588 | 0.1632 | 92.59 |
|  | XD-65802 | 0.1045 | 0.2451 | 0.7444 | 88.97 |
|  | XD-65803 | 0.2530 | 0.6566 | #N/A | 72.20 |
|  | XD-65804 | 0.0790 | 0.2153 | 0.7437 | 90.55 |
|  | XD-65805 | 0.0191 | 0.0465 | 0.1334 | 91.56 |
| 2657 | XD-65806 | 0.1160 | 0.3644 | #N/A | 75.60 |
|  | XD-65807 | #N/A | #N/A | #N/A | 6.52 |
|  | XD-65808 | #N/A | #N/A | #N/A | −6.18 |
|  | XD-65809 | #N/A | #N/A | #N/A | 10.11 |
|  | XD-65810 | 0.0438 | 0.1365 | 0.9680 | 82.98 |
|  | XD-65811 | #N/A | #N/A | #N/A | 11.22 |
|  | XD-65812 | #N/A | #N/A | #N/A | 4.92 |
|  | XD-65813 | #N/A | #N/A | #N/A | 13.26 |
|  | XD-65814 | 0.1140 | 0.3129 | #N/A | 77.50 |
|  | XD-65815 | #N/A | #N/A | #N/A | 6.16 |
|  | XD-65816 | #N/A | #N/A | #N/A | 0.65 |
|  | XD-65817 | #N/A | #N/A | #N/A | 10.08 |
|  | XD-65818 | 0.1130 | 0.2445 | #N/A | 79.29 |

Example 5: Analysis of Activity of Chemically Optimized TFR2 siRNAs in Primary Human Hepatocytes (PHH) by Free Uptake Mediated by a GalNAc Ligand Based on the results of the dual-luciferase assay for on-/off-target activity, best performing siRNAs that displayed high on-target activity and little to no seed-mediated activity were tested for the RNAi activity towards TFR2 mRNA in PHH using a GalNAc-mediated free uptake delivery (Tables 7 and 8).

Plated primary human hepatocytes pooled from 5 donors (XenoTech, HPCH05+) were exposed to 7 different concentrations of siRNAs from 1 µM to 0.064 nM in 5-fold dilution steps in triplicates. Non-treated cells were used as negative control. After 72 hours of exposure, the cells were washed, lysed and RNA isolated. Harvested RNA was reverse transcribed and assayed for TFR2 expression via TaqMan qPCR. A single qPCR assay was performed for each sample using a TFR2 TaqMan probe set (Hs00162690_m1-FAM) multiplexed with a common GAPDH-VIC probe (ThermoFisher, Hs99999905_m1-VIC). Thermocycling and data acquisition was performed with an Applied Biosystems QuantStudio 3 Real-Time PCR System and analyzed. Cq was measured at the auto-defined threshold for each TFR2-FAM and GAPDH-VIC amplification curve. A 5-fold dilution series (1:1, 1:5, 1:25) of a common stock of non-treated cell RNA was assayed in each qPCR plate. A standard curve was calculated by plotting the Cq derived for each dilution against the base 2 log of the dilution factor, and a linear trendline calculated for each probe. Each Cq data point "y" was then normalized to the corresponding trendline by solving for "x". The base 2 antilog of each data point was then taken, and the TFR2-FAM values divided by the corresponding GAPDH-VIC values for each well and averaged as the mean of three replicates to obtain average Rq values per sample. These values were all normalized to the mean Rq of control non-treated cells to obtain the mean relative abundance as a percentage of expression in non-treated cells (the results are shown in Table 7).

Derived mean and standard error data was copied to GraphPad Prism statistical analysis software (version 9.5.1). IC50 values for the dose curves were calculated via nonlinear regression using the "[Inhibitor] vs. normalized response—Variable slope" calculation set. This equation assumes data that can be normalized to a 0-100% scale and calculates a non-standard Hill slope to the curve. The results of this analysis are shown in Table 7.

To better define the IC50 values, a repeated siRNA free uptake experiment in PHH was conducted with expanded 14-point siRNA dose range from 1.8 µM to 6 pM in 3-fold dilution steps with the best performing siRNAs. The results are summarized in Table 8 and FIG. 1.

TABLE 7

IC50 concentrations and maximum TFR2 knockdown activity of TFR2 siRNAs in PHH (7-point dose curves)

| Starting position | siRNA ID | IC50 (nM) | Maximum KD (%) |
|---|---|---|---|
| 241 | XD-65716 | 17.38 | 69.24 |
|  | XD-65717 | 2.132 | 74.51 |
|  | XD-65718 | 4.179 | 77.50 |
|  | XD-65719 | 2.536 | 81.37 |
|  | XD-65720 | 23.11 | 72.87 |
|  | XD-65721 | 2.555 | 81.91 |
|  | XD-65722 | 5.744 | 79.44 |
|  | XD-65723 | 1.283 | 78.48 |
|  | XD-65724 | 71.42 | 65.05 |
|  | XD-65725 | 2.434 | 79.70 |
|  | XD-65726 | 13.81 | 79.04 |
| 412 | XD-65728 | 1400 | 43.04 |
|  | XD-65729 | 66.89 | 68.74 |
|  | XD-65730 | 174.5 | 63.07 |
|  | XD-65731 | 50.66 | 72.25 |
|  | XD-65732 | 699.3 | 51.61 |
|  | XD-65733 | 68.9 | 67.45 |
|  | XD-65734 | 73.6 | 69.95 |
|  | XD-65735 | 73.83 | 69.42 |
|  | XD-65736 | 32.02 | 71.18 |
|  | XD-65737 | 17.66 | 73.34 |
|  | XD-65738 | 45.39 | 69.67 |
|  | XD-65739 | 13.82 | 79.86 |
| 1051 | XD-65741 | 4.941 | 79.37 |
|  | XD-65743 | 4.321 | 79.90 |
|  | XD-65745 | 15.9 | 79.30 |
|  | XD-65747 | 6.361 | 80.75 |
| 1448 | XD-65754 | 21.2 | 64.93 |
|  | XD-65756 | 41.33 | 69.90 |
|  | XD-65758 | 417.5 | 55.64 |
|  | XD-65760 | 103.4 | 68.43 |
|  | XD-65762 | 99.84 | 65.66 |
|  | XD-65763 | 203.7 | 62.88 |
|  | XD-65764 | 376.2 | 54.44 |
| 1627 | XD-65767 | 175.3 | 64.35 |
|  | XD-65769 | 46.11 | 72.37 |
|  | XD-65770 | 30.43 | 71.51 |
|  | XD-65771 | 14.13 | 69.19 |
|  | XD-65773 | 77.12 | 67.89 |
|  | XD-65774 | 305.3 | 58.74 |
|  | XD-65775 | 96.89 | 63.05 |
|  | XD-65777 | 319.7 | 60.54 |
|  | XD-65778 | 221.1 | 59.63 |
| 1840 | XD-65780 | 11.65 | 77.60 |
|  | XD-65781 | 42.65 | 64.70 |
|  | XD-65782 | 11.19 | 74.50 |
|  | XD-65783 | 7.092 | 82.20 |
|  | XD-65784 | 19.02 | 72.27 |
|  | XD-65785 | 5.842 | 76.30 |
|  | XD-65786 | 39.43 | 68.07 |
|  | XD-65787 | 80.46 | 68.32 |
|  | XD-65788 | 141.1 | 61.89 |
|  | XD-65789 | 394.5 | 55.69 |
|  | XD-65790 | 407.3 | 57.46 |
|  | XD-65791 | 50.64 | 73.69 |
| 2657 | XD-65806 | 3.001 | 76.78 |
|  | XD-65807 | 2.159 | 78.73 |
|  | XD-65808 | 3.885 | 76.19 |
|  | XD-65809 | 1.496 | 78.75 |
|  | XD-65810 | 1.695 | 78.66 |
|  | XD-65811 | 0.8179 | 80.65 |
|  | XD-65812 | 2.695 | 78.80 |
|  | XD-65813 | 2.083 | 76.41 |
|  | XD-65814 | 1.494 | 77.50 |
|  | XD-65815 | 2.708 | 78.36 |
|  | XD-65816 | 8.771 | 74.56 |
|  | XD-65817 | 14.52 | 73.86 |

TABLE 8

IC50 concentrations and maximum TFR2 knockdown activity (100% -% residual mRNA) of TFR2 siRNAs in PHH (expanded 14-point dose curve)

| Starting position | siRNA ID | IC50 (nM) | Maximum KD (%) |
|---|---|---|---|
| 241 | XD-65717 | 2.08 | 81.67 |
|  | XD-65721 | 1.81 | 81.79 |
|  | XD-65725 | 2.15 | 84.45 |

TABLE 8-continued

IC50 concentrations and maximum TFR2 knockdown activity (100% -% residual mRNA) of TFR2 siRNAs in PHH (expanded 14-point dose curve)

| Starting position | siRNA ID | IC50 (nM) | Maximum KD (%) |
|---|---|---|---|
| 1051 | XD-65743 | 7.27 | 82.77 |
| 2657 | XD-65807 | 0.44 | 86.73 |
|  | XD-65809 | 0.83 | 85.78 |
|  | XD-65811 | 0.43 | 87.41 |
|  | XD-65812 | 1.77 | 84.99 |
|  | XD-65815 | 1.18 | 86.24 |

Three siRNAs starting from position 2657 of TFR2 mRNA, all having 2'-5' linkage between positions 7 and 8 of the antisense strand and 3'H in position 7 but differing in the number of 2'Ome modifications in their antisense strands (XD65815>XD65811>XD65807) were selected for in vivo analysis keeping in mind that having more 2'Ome modifications may improve duration of effect. Notably, the results from the on-target screening using the psiCHECK-based assay (Table 6A) did not point that specifically these siRNAs will show the best KD performance in PHH.

Example 6: Assessment of TFR2 siRNA Pharmacodynamic Activity In Vivo in Mice with Humanized Liver Tissue This example presents a study that evaluated the knockdown effects in vivo in the livers of three GalNAc-conjugated siRNA compounds, XD-65807, XD-65811 and XD-65815, targeting human TFR2 mRNA. The study was conducted in uPA-SCID mice (PXB) mice in which mouse hepatocytes have been substituted with human hepatocytes (PhoenixBio Co, Japan). Each mouse accepted in the study had at least 90% of hepatocytes replaced as confirmed by the vendor.

Each mouse received a single subcutaneous injection of either a vehicle (PBS) or of one of the three siRNAs—each at 3 dose levels of 5, 10 or 30 mg/kg to be analyzed for gene expression in the liver at 15 days post dose. Additional groups of mice were treated with 10 mg/kg doses of each of the siRNAs or the vehicle to be analyzed for gene expression in the liver at 49 days post dose. Each study group consisted of 4-5 mice. At the designated time points, the livers were harvested for RNA extraction from each lobe separately and gene expression analysis using RT-qPCR. RT-qPCR was performed in technical triplicates using Taqman Hs00162690_m1-FAM probe for human TFR2 combined with TaqMan Endogenous Control; VIC®/MGB Hs99999905_m1 Probe for GAPDH (all from ThermoFisher), essentially as described in Example 5. Equal quantities of each PBS control sample from each of the three liver lobes were combined into a pool for control dilutions and expression normalization on all qPCR plates.

Overall, the siRNAs at all dose levels were well-tolerated. The results of TFR2 gene expression in the liver on Day 15 are shown in FIG. 2A and on Day 49-in FIG. 2B.

Figure 2A:
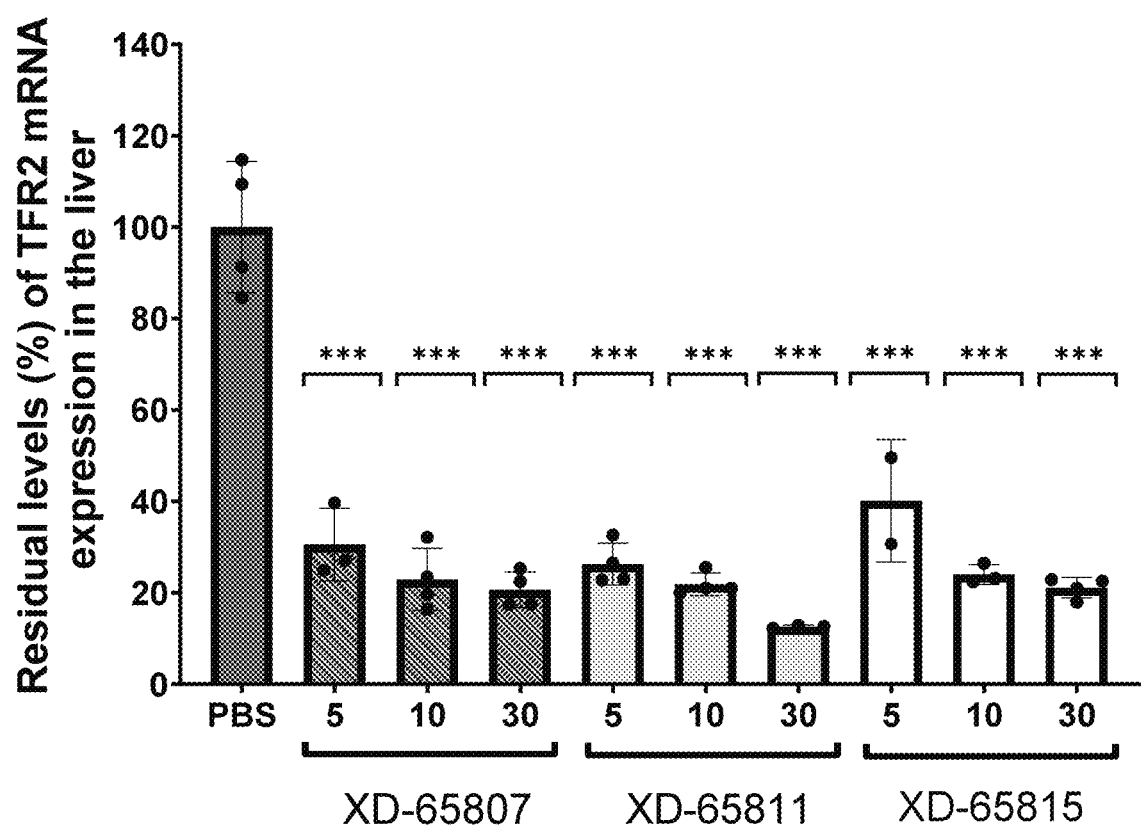
FIG. 2A shows knockdown of human TFR2 mRNA levels in the livers of PXB mice on Day 15 after treatment. Residual expression levels (%) of human TFR2 mRNA in the livers of PXB mice treated with different doses—0 (PBS), 5, 10, or 30 mg/kg, of siRNAs XD-65807, XD-65811 or XD-65815 on Day 15 after study drug administration are shown. All % values are adjusted to standard curve and normalized to mean of TFR2 RNA levels in PBS control. Each data point represents the mean percentage of residual human TFR2 expression across the three liver lobes analyzed for each animal. Error bars are standard deviations. Statistical analysis was done using the one-way ANOVA followed by Dunnett's multiple comparison test with significance set for p≤0.05 (GraphPad Prism package). Each treatment group was compared to the PBS control group. ***=p<0.0001.
Figure 2B:
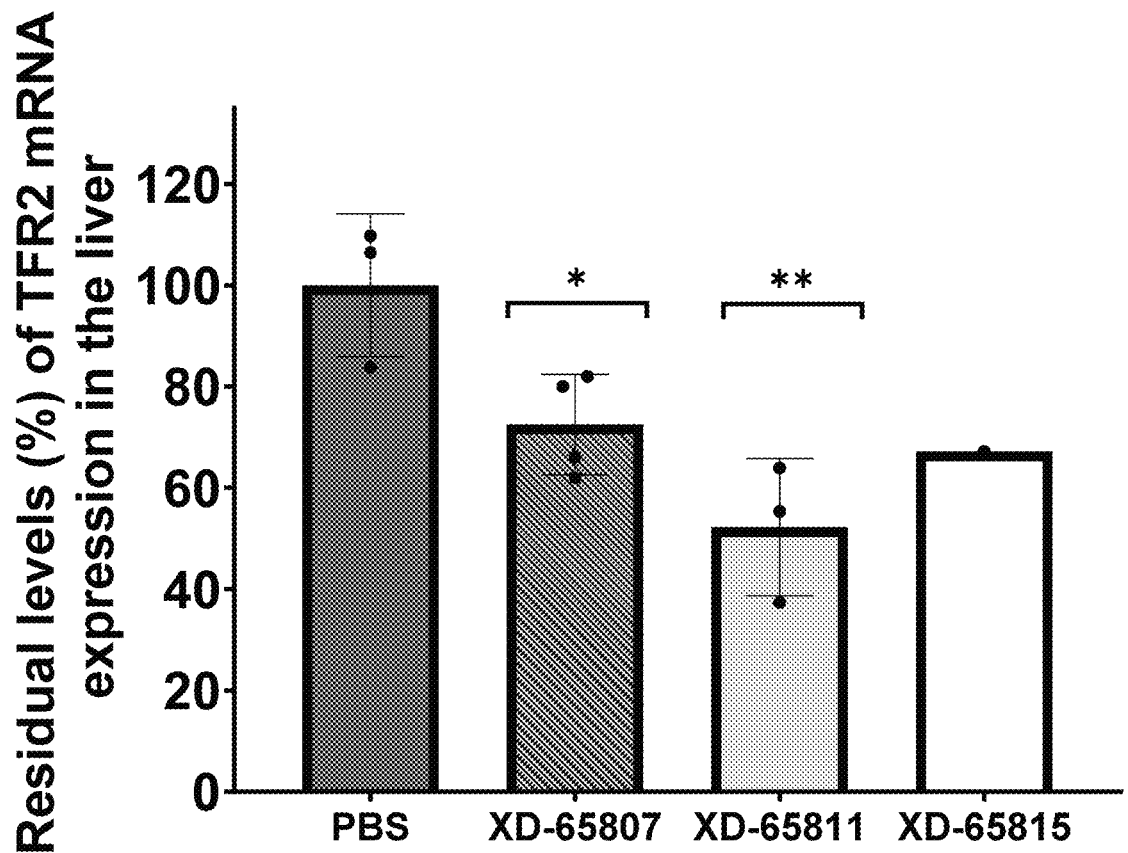
FIG. 2B shows knockdown of human TFR2 mRNA levels in the livers of PXB mice on Day 49 after treatment. Residual expression levels (%) of human TFR2 mRNA in the livers of PXB mice treated with different doses—0 (PBS)

As shown in FIG. 2A, on Day 15, treatment with all the three siRNAs at all three dose levels have statistically significantly ($p<0.0001$) reduced human TFR2 mRNA expression in the liver in a dose-dependent manner. Even the lowest 5 mg/kg doses reduced human TFR2 mRNA expression by 60-70%. The most effective treatment was with siRNA XD-65811, achieving an 86% reduction at 30 mg/kg. siRNA XD65815 was the least effective. By Day 49 (FIG. 2B), for 10 mg/kg dose levels, the knockdown (KD) rebound was observed. The average residual mRNA levels increased from ~25% on Day 15 to ~70-75% on Day 49 for siRNAs XD-65807 and XD-65815, and from ~25% on Day 15 to ~54% on Day 49 for siRNA XD-65811. The TFR2 KD effects of siRNAs XD-65807 and XD-65811 on Day 49 were still statistically significant ($p<0.05$ and $p<0.01$, respectively). Statistical significance of the TFR2 knockdown by siRNA XD-65815 was unevaluable because only a single animal (n=1) remained in this group by the time of the analysis (note that mortality in study groups was not study drug- or dose-dependent and likely stemmed from external factors, i.e., transportation and housing conditions, known to have a high impact on the well-being of the fragile PXB mice). There was minimal intra- and inter-animal variability in TFR2 mRNA expression within all dose groups at all analysis timepoints.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A double-stranded nucleic acid for inhibiting expression of transferrin receptor 2 (TFR2), comprising a sense strand and an antisense strand, wherein the sense strand comprises a sense strand sequence comprising:

5'-(C3)csgsguCfaUfAfCfugucgguuaa 3' (SEQ ID NO: 308) and has three or four GalNAc moieties covalently attached to the 3' end, wherein the antisense strand comprises an antisense strand sequence comprising:

5'-(vinu)sUfsaacCf(3dG)AfCfaguaUfgAfccgsusc-3' (SEQ ID NO: 293) or 5'-(vinu)sUfsaacCf(3dG)aCfaguaUfgAfccgsusc-3' (SEQ ID NO: 297), wherein a lowercase letter indicates a 2'-O-Methyl (2'-OMe) modified RNA nucleotide, an uppercase letter followed by f indicates a 2'-Fluoro (2'-F) modified RNA nucleotide, (C3) indicates a propanol or C3 alkyl moiety connected to the 5' end of the strand via a phosphodiester linkage, s indicates a phosphorothioate linkage between adjacent nucleotides, (vinu) indicates a 5' vinylphosphonate 2'-OMe RNA U nucleotide, and (3dG) indicates a G nucleotide in which ribose has H at the 3' position, and is connected via a 2'-5' bridge to a nucleotide following the G nucleotide.

2. The double-stranded nucleic acid of claim 1, wherein the three or four GalNAc moieties are covalently attached to the 3' end of the sense strand via a triethyleneglycol (TEG) linker.

3. The double-stranded nucleic acid of claim 1, wherein the sense strand sequence consists of SEQ ID NO: 308, and the antisense strand sequence consists of SEQ ID NOs: 293 or 297.

4. The double-stranded nucleic acid of claim 1, wherein the sense strand sequence comprises 5'-(C3)csgsguCfaUfAfCfugucgguuaasLsLsL-3' (SEQ ID NO: 291), wherein a lowercase letter indicates a 2'-O-Methyl (2'-OMe) modified RNA nucleotide, an uppercase letter followed by f indicates a 2'-Fluoro (2'-F) modified RNA nucleotide, (C3) indicates a propanol or C3 alkyl moiety connected to the 5' end of the strand via a phosphodiester linkage, s indicates a phosphorothioate linkage between adjacent nucleotides, and L indicates a monomer of N-acetylgalactosamine (GalNAc) with a TEG linker.

5. A pharmaceutical composition comprising the double-stranded nucleic acid of claim 4, or a pharmaceutically acceptable salt thereof, and one or more of a pharmaceutically acceptable excipient, carrier, or buffer.

6. A method for treating a HAMP-related anemia, comprising: administering to a subject in need thereof, an effective amount of the pharmaceutical composition of claim 5, thereby treating the anemia.

7. The double-stranded nucleic acid of claim 4, wherein the sense strand sequence consists of SEQ ID NO: 291, and the antisense strand sequence consists of SEQ ID NOs: 293 or 297.

8. A pharmaceutical composition comprising the double-stranded nucleic acid of claim 7, or a pharmaceutically acceptable salt thereof, and one or more of a pharmaceutically acceptable excipient, carrier, or buffer.

9. A method for treating a HAMP-related anemia, comprising: administering to a subject in need thereof, an effective amount of the pharmaceutical composition of claim 8, thereby treating the anemia.

* * * * *